United States Patent
Hoshino et al.

(10) Patent No.: US 6,761,635 B2
(45) Date of Patent: Jul. 13, 2004

(54) REMOTE-CONTROL SIGNAL RECEIVER

(75) Inventors: Masanori Hoshino, Tokyo (JP); Koji Hamada, Tokyo (JP)

(73) Assignee: Sony Computer Entertainment Inc. (JP)

(*) Notice: Subject to any disclaimer, the term of this patent is extended or adjusted under 35 U.S.C. 154(b) by 49 days.

(21) Appl. No.: 10/039,478

(22) Filed: Nov. 9, 2001

(65) Prior Publication Data
US 2002/0151362 A1 Oct. 17, 2002

(30) Foreign Application Priority Data

Nov. 10, 2000 (JP) .......................................... 2000-344536
Oct. 26, 2001 (JP) .......................................... 2001-330041

(51) Int. Cl.[7] .............................................. A63F 13/00
(52) U.S. Cl. ............................ 463/39; 463/37; 348/734
(58) Field of Search ............................... 463/36–39, 40, 463/47; 340/825; 348/734, 134; 359/142; 434/351; 455/151.2; 725/133, 141, 153

(56) References Cited

U.S. PATENT DOCUMENTS

| 6,097,520 | A | * | 8/2000 | Kadnier ..................... 348/734 |
| 6,264,559 | B1 | * | 7/2001 | Lawrence et al. ............ 463/40 |
| 6,280,327 | B1 | * | 8/2001 | Leifer et al. .................. 463/39 |
| 6,565,440 | B2 | * | 5/2003 | Hames ........................ 463/39 |
| 6,565,441 | B1 | * | 5/2003 | Hames et al. ................. 463/39 |
| 2003/0027633 | A1 | * | 2/2003 | Hames ........................ 463/39 |

* cited by examiner

Primary Examiner—Jessica Harrison
Assistant Examiner—Aaron Capron
(74) Attorney, Agent, or Firm—Lerner, David, Littenberg, Krumholz & Mentlik, LLP

(57) ABSTRACT

A photo-receiving unit of an entertainment device stores commands sent from a remote controller into a buffer memory. A main unit of the entertainment device incorporates the stored commands at regular intervals (such as once in every vertical synchronization period) and the individual portions of the main unit, or the peripheral devices connected to the main device, are controlled based on the incorporated command. As a result, the user can operate the main unit or peripheral devices with a remote controller not originally meant for the entertainment device.

24 Claims, 18 Drawing Sheets

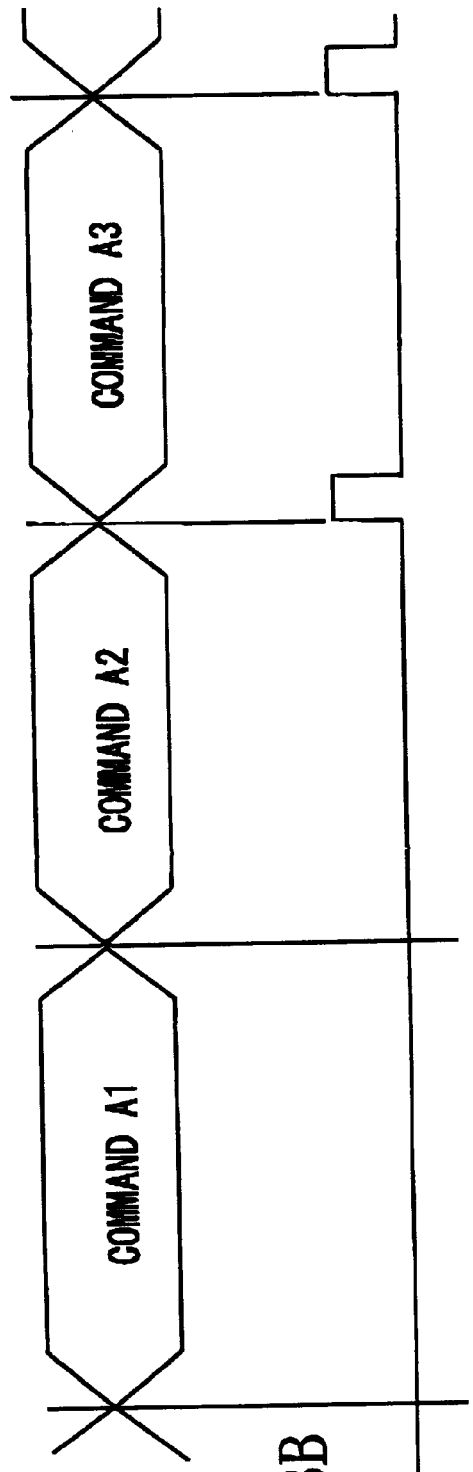
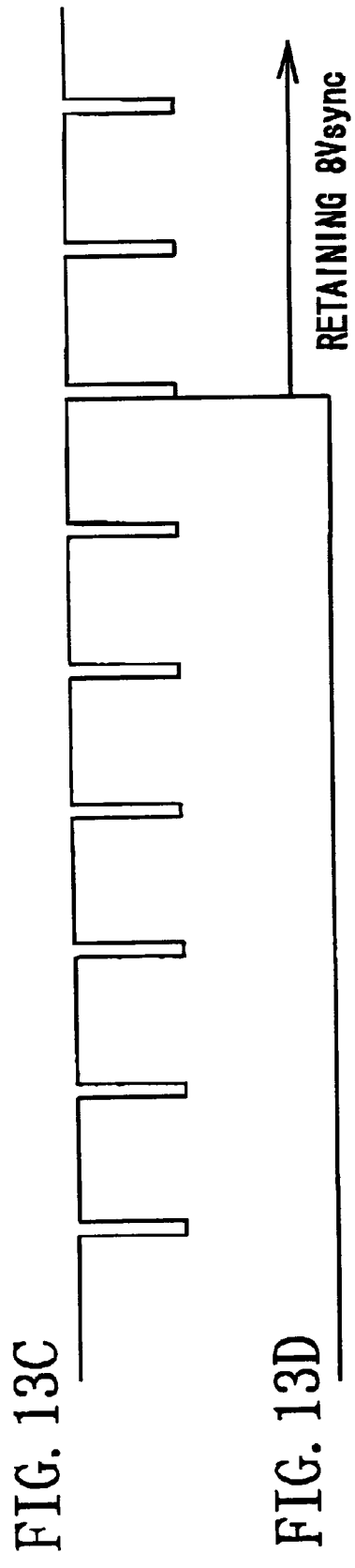
FIG. 13A
FIG. 13B
FIG. 13C
FIG. 13D

REMOTE-CONTROL SIGNAL RECEIVER

This application is related to Japanese Patent Application No. 2000-344536 filed on Nov. 10, 2000 and No. 2001-330041 filed on Oct. 26, 2001, based on which this application claims priority under the Paris Convention and the content of which is incorporated herein by reference.

BACKGROUND OF THE INVENTION

1. Field of the Invention

The present invention relates to a remote-control signal receiver having at least a game execution function for executing video games based on game programs stored in storage media such as CD-ROM, DVD-ROM and semiconductor memory, and an image reproduction function for reproducing image information from storage media having recorded therein image information such as movie; information processing method for remote-control signal; storage medium having recorded therein information processing program for remote-control signal; information processing program; and remote-control device.

2. Description of the Related Art

Today, game programs of video games are generally distributed in a form being stored in optical disks such as CD-ROM or DVD-ROM since such disks can store larger volume of video games which are becoming more advanced and complicated, and can be manufactured at lower costs than semiconductor memories.

A video game machine reads out a game program from an optical disk, displays game scenes and characters on a monitor device, and emits under control effective sounds from speaker units. Movement of the characters or the like displayed on the monitor device can be controlled through a controller by the user.

The user thus can enjoy various types of video games such as RPG (role playing game), AVG (adventure game) and SLG (simulation game).

Video data stored in such CD-ROMs and DVD-ROMs for the video games are generally stored as being processed by compressive decoding using a high-performance compressive decoding technique such as MPEG2. The video game machine is thus provided with a MPEG decoder, by which the compressively decoded video data can be reproduced.

On the other hand, movie DVDs also contain video data as being processed by compressive decoding by such high-performance compressive decoding technique such as MPEG2. Thus the video game machine proposed by the present inventors can reproduce video scenes not only of video games but also of movies with the aid of the MPGE decoder.

Such video game machine proposed by the present inventors has already been distributed widely as an entertainment device in expectation of its versatility for the future since it can reproduce not only video games but other various digital contents such as music CDs and DVDs, and can send/receive digital contents through a communication network such as internet.

The conventional entertainment device has, however, been designed to reproduce music CDs or DVDS, which are optical disks having stored therein data other than video game programs, while being controlled by a controller connected through a cable to the main unit of such entertainment device.

Such controller has provided thereon a "○" button with an embossed ○ marking, a "×" button with an embossed × marking, a "Δ" button with an embossed Δ marking and a "□" button with an embossed □ marking for playing the game. In the reproduction of movie DVDs, the individual buttons are assigned with functions, for example, of menu selection, selection cancel/reproduction stop, menu display and title display, respectively, so that the user could control the reproduction operation on the main unit of the entertainment device by using such buttons. Such conventional entertainment device has thus been suffering from the problems below.

The controller is connected with the main unit of the entertainment device typically through a cable of approx. 2.5 m long. Such length of the cable was defined so as to allow the user to enjoy the video game as being properly distant from a monitor device, which is usually placed close to the entertainment device, and to put back the cable without problem.

While such length of the controller is convenient for enjoying the video game, a problem resides in that the controller is placed far from the user enjoying movies stored in a DVD on such entertainment device, since the movies are usually enjoyed at a position distant further than the length of such cable, which makes it difficult to operate the main unit of such entertainment device.

While the problem seems to be overcome by using a longer cable as long as 3 or 4 m, such longer cable will be inconvenient to put away and will make the user feel annoyed during the play of the video game.

In these days, reproducing devices such as video tape recorders and CD players are widely popularized, where most of which are operable by remote controllers, and every remote controller has similar key arrangement. Thus most of the recent users are supposed to be familiar with operations corresponded to such key arrangement of the remote controllers.

Such key arrangement of the remote controllers is, however, entirely different from that of the controller of the entertainment device designed for video games. Thus, for the case that the DVD for example is reproduced using the controller of the entertainment device, the user should encounter difficulty in operating the entertainment device since the user has to unwillingly struggle with key operation using the keys having an arrangement entirely different from that of the remote controller.

SUMMARY OF THE INVENTION

The present invention is completed to overcome the foregoing problems and an object thereof is to provide a remote-control signal receiver allowing the user to reproduce, for example, DVDs with a sense of handling a remote controller; information processing method for remote-control signal; storage medium having recorded therein information processing program for remote-control signal; information processing program; and remote-control device.

In the present invention, a main unit of an entertainment device is provided with a receiving unit to which operational commands are sent in a wireless manner via a remote control unit. The main unit of the entertainment device will execute action corresponded to the operational command received by the receiving unit. This allows the user to operate the main unit of the entertainment device or external devices connected to such main unit with a sense of using a remote controller.

Other and further objects and features of the present invention will become obvious upon understanding of the illustrative embodiment about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIGS. 13A to 13D are time charts explaining the command corrective operation performed by the microcomputer in the photo-receiving unit when the command from the remote controller is received;

DETAILED DESCRIPTION OF THE PREFERRED EMBODIMENTS

The present invention is successfully applicable to an entertainment device having a game execution function for executing video games based on game programs stored in optical disks such as CD-ROMs and DVD-ROMs, and a video reproduction function for reproducing video information such as movies stored in such optical disks.

Appearance of an Entertainment Device of the Embodiment

Figure 1:
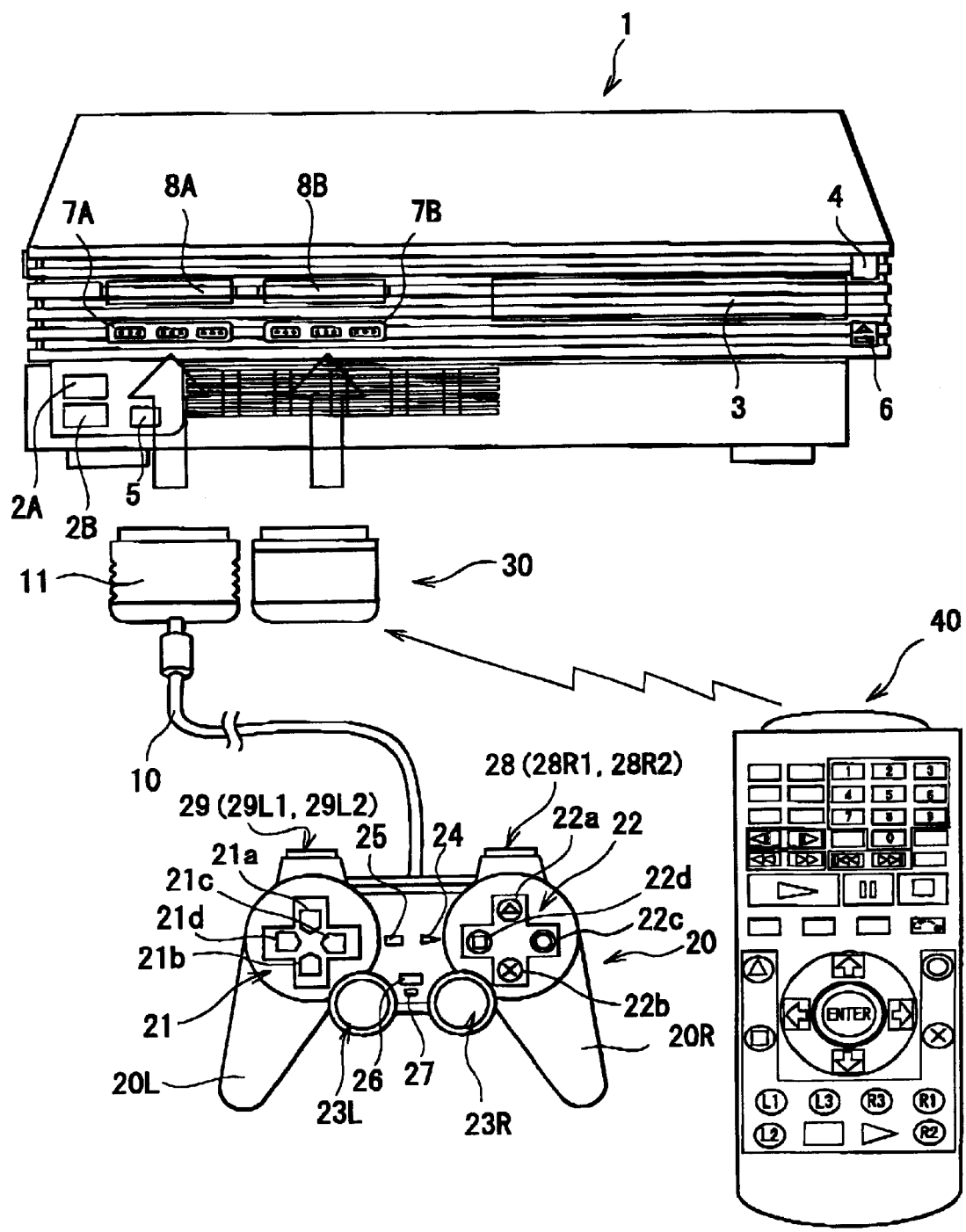
FIG. 1 is a perspective view showing an appearance of an entertainment device of the embodiment of the present invention.

A perspective view of an appearance of an entertainment device according to the present embodiment is shown in FIG. 1. As is known from the figure, the entertainment device of the embodiment comprises a main unit 1 responsible for execution of video games and reproduction of movies, a controller 20 connected to the main unit 1, a photo-receiving unit 30 connected to the main unit 1, and a remote controller 40 for sending commands for video reproduction in a form of infrared signal (or may be RF signal) to such photo-receiving unit 30.

Constitution of the Main Unit 1

The main unit 1 has two USB (Universal Serial Bus) connection terminals 2A and 2B, a tray-type disk loading section 3 on which an optical disk such as CD-ROM or DVD-ROM having recorded therein application programs of video games or multimedia data such as movies is loaded, a reset button 4 for resetting the game, a IEEE 1394 connection terminal 5 capable of supporting a data transmission speed of maximum 400 Mbps, a tray operation button 6 for operating loading and unloading of the tray to or from the optical disk loading section 3, controller plug-in portions 7A and 7B, and memory card insertion portions 8A and 8B.

While not shown in the figure, the main unit 1 also has on the rear plane thereof a power switch and AV terminals used for connecting such main unit 1 to a monitor device and an audio device.

The controller plug-in portions 7A and 7B allow two controllers 20 to be connected to the main unit 1, to thereby allow two users to enjoy various games. In such entertainment device of the embodiment, the photo-receiving unit 30 for optically receiving various commands from the remote controller 40 is connected to either of the controller plug-in portions 7A and 7B, which will be detailed later.

The memory card insertion portions 8A and 8B are designed to allow connection thereto of, for example, memory cards for saving and reading game data, and DVD driver memory cards having stored therein driver programs for reproducing DVDs.

Constitution of the Controller

The controller 20 is connected to either of the controller plug-in portions 7A and 7B of the main unit 1 through a cable 10 of a predetermined length and a connector 11. The controller 20 has two grip ends 20R, 20L so as to allow a player to grip such grip ends 20R, 20L with the right and left hands, respectively, to thereby hold the controller 20.

The controller 20 also has first and second operational portions 21, 22 and analog operational portions 23R, 23L at positions operable by, for example, the individual thumbs while holding the grip ends 20R, 20L with the right and left hands, respectively.

The first operational portion 21 is responsible typically for instructing an advancing direction of the game character, which comprises an upward prompt button 21a for prompting upward direction, a downward prompt button 21b for prompting downward direction, a rightward prompt button 21c for prompting rightward direction, and a leftward prompt button 21d for prompting leftward direction.

The controller 20 can provide instructions not only into upward, downward, rightward and leftward directions but also into oblique directions. For example, pressing the upward prompt button 21a and rightward prompt button 21c at the same time will prompt moving toward upper right direction. Similarly, pressing the downward prompt button 21b and leftward prompt button 21d at the same time will prompt moving toward lower left direction.

The second operational portion 22 comprises a "Δ" button 22a having a "Δ" marking and is responsible typically for prompting menu display, a "×" button 22b having a "×" marking and is responsible for prompting cancel of a selected item, a "○" button 22c having a "○" marking and is responsible typically for prompting confirmation of a selected item, and a "□" button 22d having a "□" marking and is responsible typically for prompting display/hiding of an index or so.

The analog operational portions 23R, 23L are designed to be kept upright (not-inclined state, or in a referential position) when they are not inclined for operation. In contrast in the inclined operation, such analog operational portions 23R, 23L are designed to allow precession which is a rotational motion inclined at a predetermined angle. When the analog operational portions 23R, 23L are inclined for operation while being pressed down, the controller 20 detects a coordinate value on an X-Y coordinate based on the amount and direction of inclination from the referential position, and supplies such coordinate value as an operational output via the controller plug-in portion 7A or 7B to the main unit 1.

The controller 20 is also provided with a start button 24 for prompting the game start, a selection button 25 for selecting predetermined subjects, and a mode selection switch 26 for toggling an analog mode and a digital mode. When the analog mode is selected with the mode selection switch 26, a light emitting diode 27 (LED) is controlled to turn on, and the analog operational portions 23R, 23L are activated. When the digital mode is selected, a light emitting diode 27 (LED) is controlled to turn off, and the analog operational portions 23R, 23L are deactivated.

The controller 20 is still also provided with a right button 28 and a left button 29 at positions operable by, for example, the individual second fingers (or third fingers) while holding the grip ends 20R, 20L with the right and left hands, respectively. The individual buttons 28, 29 comprise first and second right buttons 28R1, 28R2 and first and second left buttons 29L1, 29L2, respectively, aligned side by side in the direction of the thickness of the controller 20.

When a movie stored in a DVD is reproduced, such individual buttons on the controller 20 are assigned with functions corresponded to the reproduction operations, in which in the second operational portion 22, the Δ button 22a becomes available as a button for prompting display of a DVD menu, the × button 22b for prompting cancel of a selected menu and stop of the reproduction, the ○ button 22c for prompting confirmation of a selected menu, and the □ button 22d for prompting display of the title.

Also the start button 24 becomes available as a button for prompting reproduction or pause of movies, the select button 25 for prompting display of the operational panel, the first right button 28R1 of the right button 28 for prompting display of the next chapter, the second right button 28R2 for prompting search by fast reversing, the first left button 29L1 of the left button 29 for prompting display of the previous chapter, and the second left button 29L2 for prompting search by fast forwarding.

The analog operational portion 23R becomes available as a button responsible for prompting sound exchange among stereo, analog and surround, and the analog operational portion 23L for prompting selection of superimposed caption in a native language such as Japanese and other foreign languages such as English.

As has been described in the above, while the entertainment device of the embodiment is thus available of course for reproduction of movies and so forth stored for example in DVDs through operating the controller 20, using the photo-receiving unit 30 and the remote controller 40, which will be described later, is further enables remote control of such reproduction.

Appearance of the Photo-Receiving unit

Figure 2:
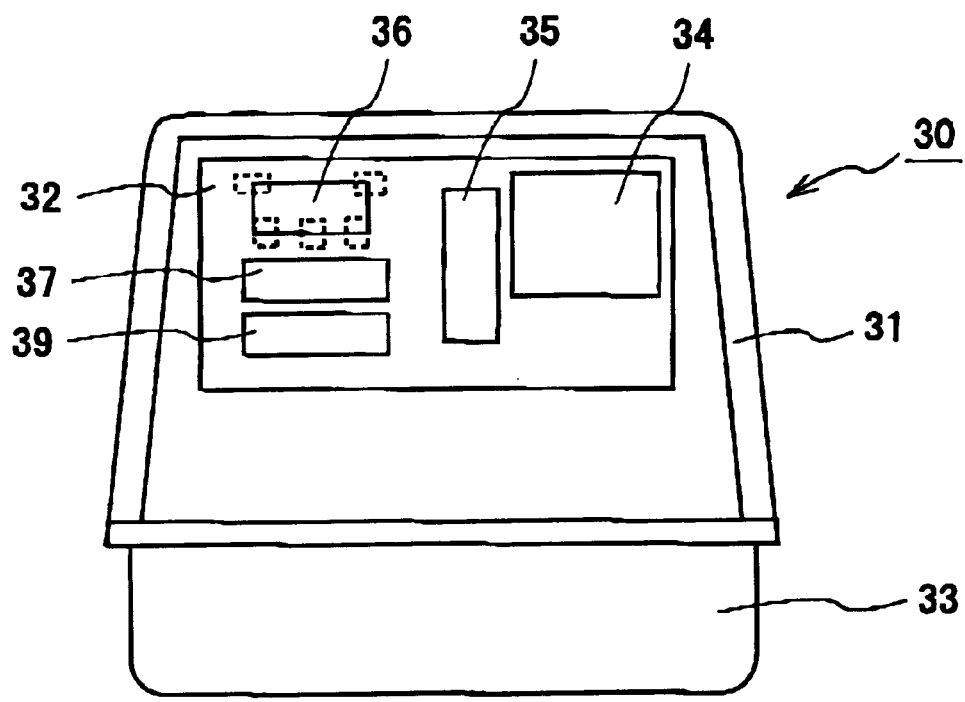
FIG. 2 is a front elevation, partially broken away, showing a photo-receiving unit.
Figure 3:
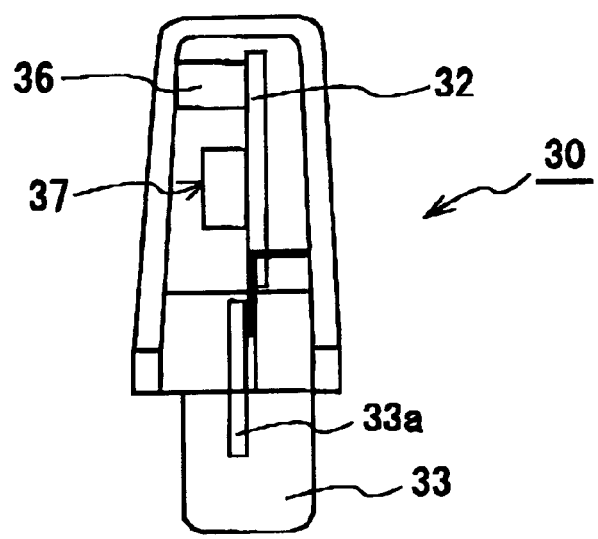
FIG. 3 is a sectional view of the photo-receiving unit.
Figure 4:
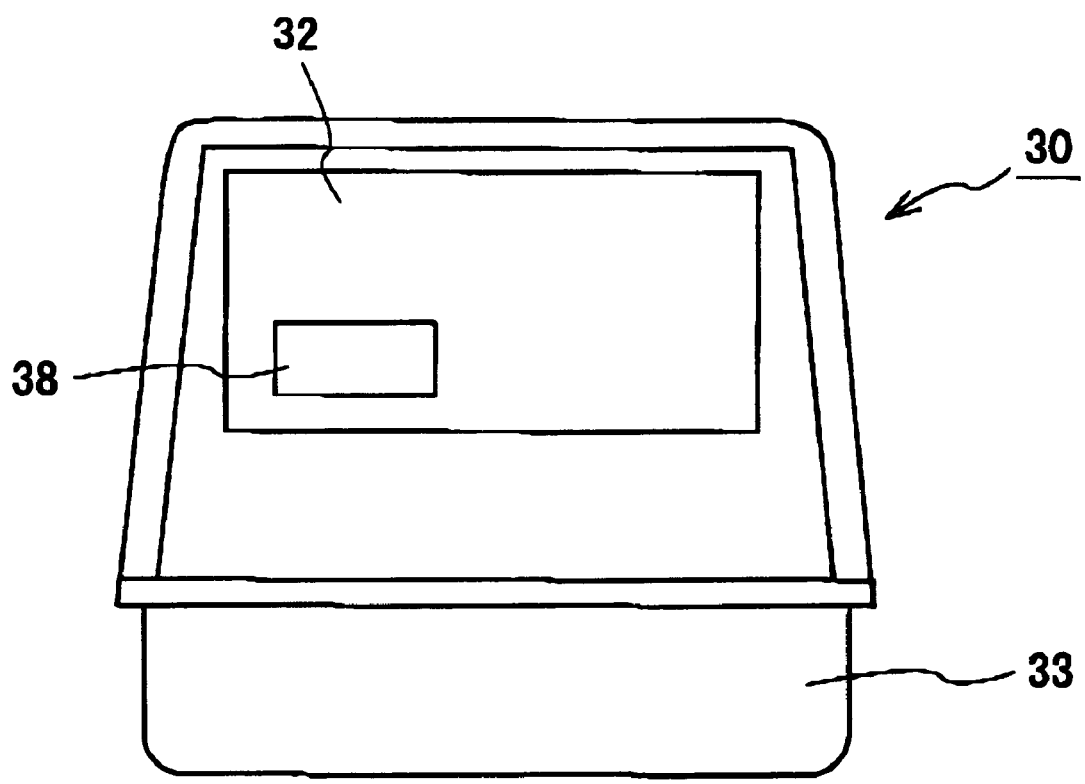
FIG. 4 is a rear elevation, partially broken away, showing the photo-receiving unit.

A front elevation, sectional view and rear elevation of the photo-receiving unit 30 partially broken away were shown in FIGS. 2, 3 and 4, respectively. As is clear from these figures, the photo-receiving unit 30 comprises a main unit 31 in a form of enclosure, a board 32 housed in the main unit 31 and a plug-in terminal board 33 connected to such board 32 and having a portion thereof so as to protrude outwardly from the main unit 31.

The board 32 is provided with a microcomputer 34 for controlling send/receive operation of the photo-receiving unit 30, an oscillator 35 for generating a reference clock of the operation, a photo-receiving element 36 (photo-receiving portion) for receiving commands from the remote controller 40, a regulator 37 for generating a predetermined power source voltage, a reset IC 38 (see FIG. 4 in particular), and a buffer memory 39 for temporally storing data sent from the remote controller 40 and received by the photo-receiving element 36, and also for sending such stored data to the main unit 1 according to a read-out timing of a system clock in the main unit 1.

The board 32 is also provided with a terminal 33a as shown in FIG. 3, with which the photo-receiving unit 30 can be plugged into the main unit 1.

It is now also allowable to provide the photo-receiving unit 30 with light emitting means such as light emitting diodes (LEDs) and allows them to turn on or flash when commands from the remote controller 40 are received.

While the following description will deal with an exemplary case in which the photo-receiving unit 30 is attached to the controller plug-in portion 7A or 7B, it should now be noted that the photo-receiving unit 30 may also be plugged into the memory card insertion portion 8A or 8B, the USB connection terminals 2A or 2B, or the IEEE 1394 connection terminal 5.

While the following description will deal with an exemplary case in which the photo-receiving unit 30 is externally attached to the main unit 1, it should now be noted that the photo-receiving unit 30 may previously be incorporated into the main unit 1.

Appearance of the Remote Controller

Figure 5:
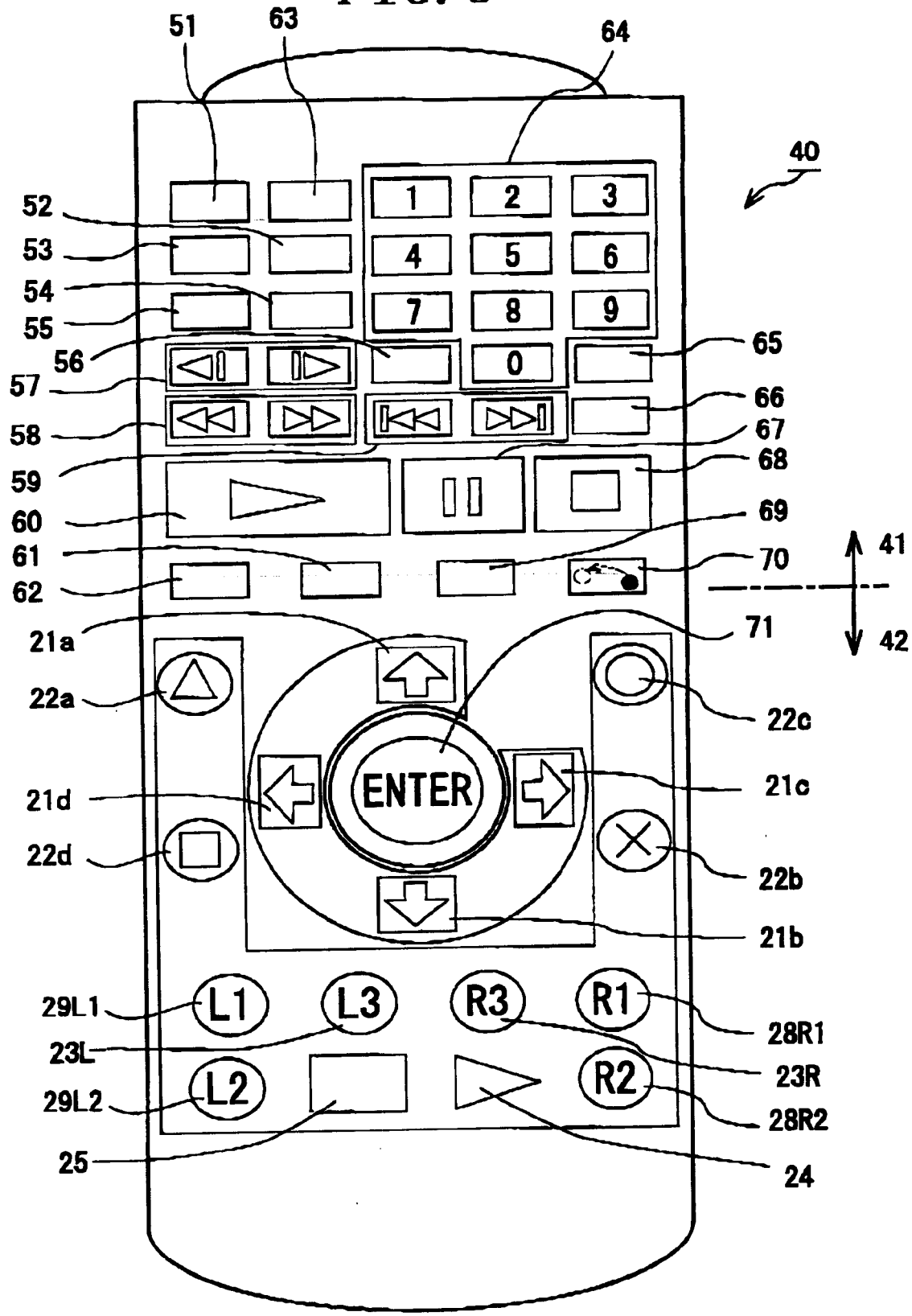
FIG. 5 is a front elevation of a full-type remote controller for effecting reproduction of DVDs loaded on the entertainment device of the embodiment.
Figure 6:
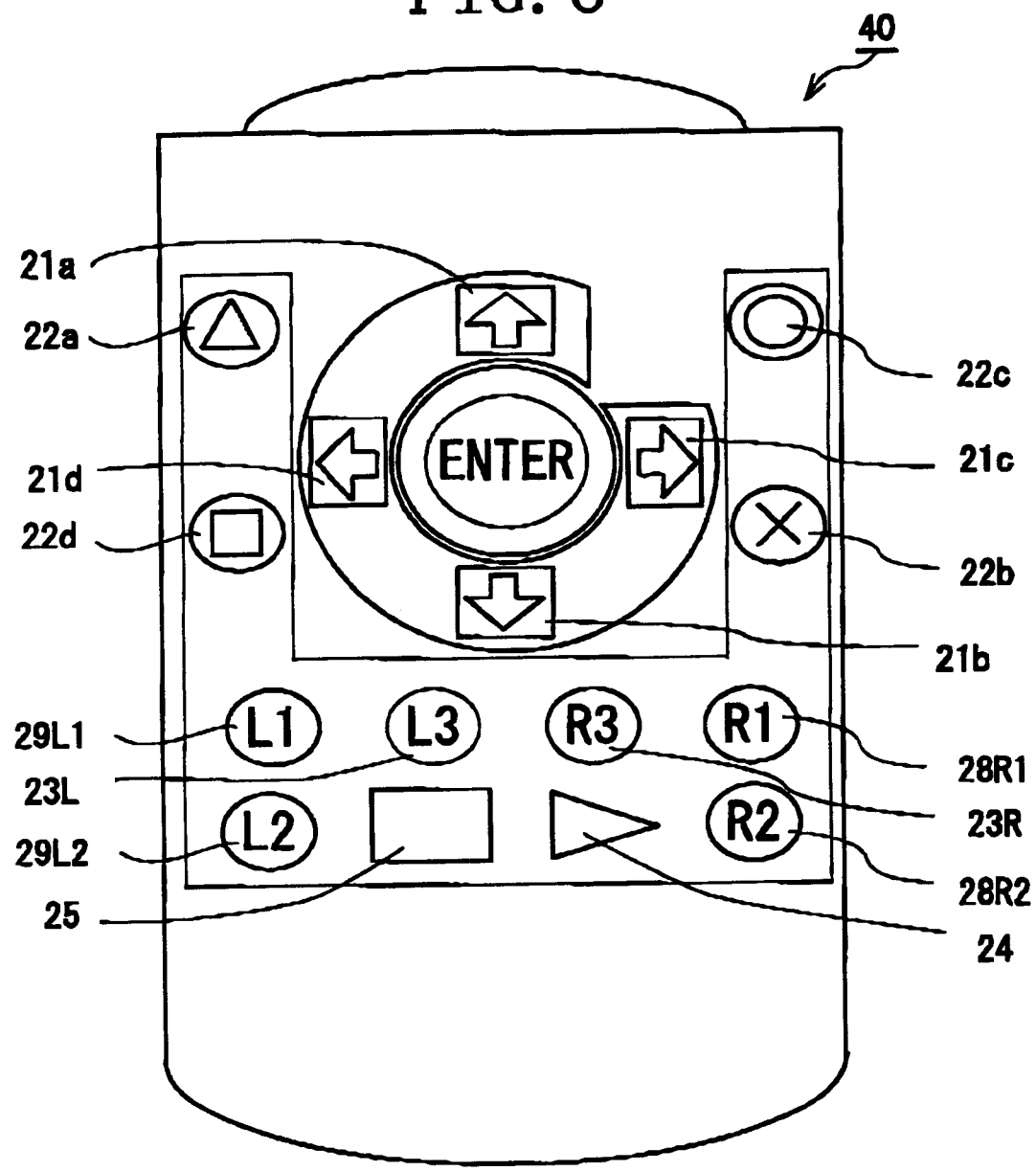
FIG. 6 is a front elevation of a controller-type remote controller for effecting reproduction of DVDs loaded on the entertainment device of the embodiment.

Outer appearances of the remote controllers 40 are shown in FIGS. 5 and 6, where that shown in FIG. 5 is of "full-type" comprising a DVD operational portion 41 provided with various buttons for effecting reproduction of DVDs and a game controller portion 42 provided with various buttons for playing the game; and that shown in FIG. 6 is of "controller-type" having only the game controller portion 42.

In the DVD operational portion 41 of the "full-type" remote controller 40 shown in FIG. 5, there are provided an audio button 51 for switching DVD sounds, a program button 52 for effecting programmed reproduction, an angle button 53 for changing angle of displayed images, a repeat button 54 for effecting repetitive reproduction, a sub-title button 55 for switching superimposed captions of DVD contents, a clear button 56 for canceling a selected numeral, a slow button 57 for effecting slow-motion reproduction while viewing the image, a scan button 58 for searching a desired scene while viewing the image, a preview/next button 59 for returning to the previous scene or advancing to the next scene, and a play button 60 for effecting reproduction.

The DVD operational portion 41 is also provided with a title button 61 for displaying a title menu, a display button 62 for displaying a control menu screen, a shuffle button 63 for effecting shuffled reproduction, numeral buttons 64 for selecting items displayed on the screen, a time button 65 for displaying reproduction time on the screen, an A-B button 66 for repeating only desired scenes, a pause button 67 for prompting temporary stop of the reproduction, a stop button 68 for stopping the reproduction, a DVD menu button 69 for displaying a DVD menu, and a return button 70 for returning to last selected scene.

An enter button 71 for confirming items displayed on the screen is provided on the side of the game controller portion 42.

The game controller portion 42 is provided with the buttons same as those for the foregoing controller 20. So that the individual buttons of the game controller portion 42 shown in FIG. 5 will have same reference numerals as the individual buttons on the controller 20 for the convenience of understanding.

More specifically, the game controller portion 42 has provided thereon an upward prompt button 21*a* for prompting upward direction, a downward prompt button 21*b* for prompting downward direction, a rightward prompt button 21*c* for prompting rightward direction, and a leftward prompt button 21*d* for prompting leftward direction, all of which are placed in a circular arrangement.

The game controller portion 42 also has provided thereon a "Δ" button 22*a* responsible typically for prompting menu display, a "×" button 22*b* responsible typically for prompting cancel of a selected item, a "○" button 22*c* responsible typically for prompting confirmation of a selected item, and a "□" button 22*d* responsible typically for prompting display/hiding of an index or so, analog operational portions 23R, 23L a start button 24 for prompting the game start, a selection button 25 for selecting predetermined subjects, a mode selection switch 26 for toggling between an analog mode and a digital mode, first and second right buttons 28R1, 28R2, and first and second left buttons 29L1, 29L2.

The user can reproduce DVDs on the main unit 1 by operating the individual buttons 51 to 71 on the DVD operational portion 41, and can enjoy games by operating the individual buttons on the game controller portion 42.

Similarly to the foregoing game controller portion 42 of the "full-type" remote controller 40, also the "controller-type" remote controller 40 shown in FIG. 6 has provided thereon an upward prompt button 21*a* for prompting upward direction, a downward prompt button 21*b* for prompting downward direction, a rightward prompt button 21*c* for prompting rightward direction, and a leftward prompt button 21*d* for prompting leftward direction, all of which are placed in a circular arrangement.

The game controller portion 42 also has provided thereon a "Δ" button 22*a* responsible typically for prompting menu display, a "×" button 22*b* responsible typically for prompting cancel of a selected item, a "○" button 22*c* responsible typically for prompting confirmation of a selected item, and a "□" button 22*d* responsible typically for prompting display/hiding of an index or so, analog operational portions 23R, 23L a start button 24 for prompting the game start, a selection button 25 for selecting predetermined subjects, a mode selection switch 26 for toggling between an analog mode and a digital mode, first and second right buttons 28R1, 28R2, and first and second left buttons 29L1, 29L2.

When a movie stored in a DVD is reproduced, such individual buttons on the controller-type remote controller 40 are typically assigned with functions, in which in the second operational portion 22, the Δ button 22*a* becomes available as a button for prompting display of the DVD menu, the × button 22*b* for prompting cancel of a selected menu or stop of the reproduction, the ○ button 22*c* for prompting confirmation of a selected menu, and the □ button 22*d* for prompting display of the title.

Also the start button 24 becomes available as a button for prompting reproduction or pause of movies, the selection button 25 for prompting display of the operational panel, the first right button 28R1 of the right button 28 for prompting display of the next chapter, the second right button 28R2 for prompting search by fast reversing, the first left button 29L1 of the left button 29 for prompting display of the previous chapter, and the second left button 29L2 for prompting search by fast forwarding.

The analog operational portion 23R becomes available as a button responsible for prompting sound exchange among stereo, analog and surround, and the analog operational portion 23L for prompting selection of superimposed caption in a native language such as Japanese and other foreign languages such as English.

Electrical Constitution of the Main unit

Figure 7:
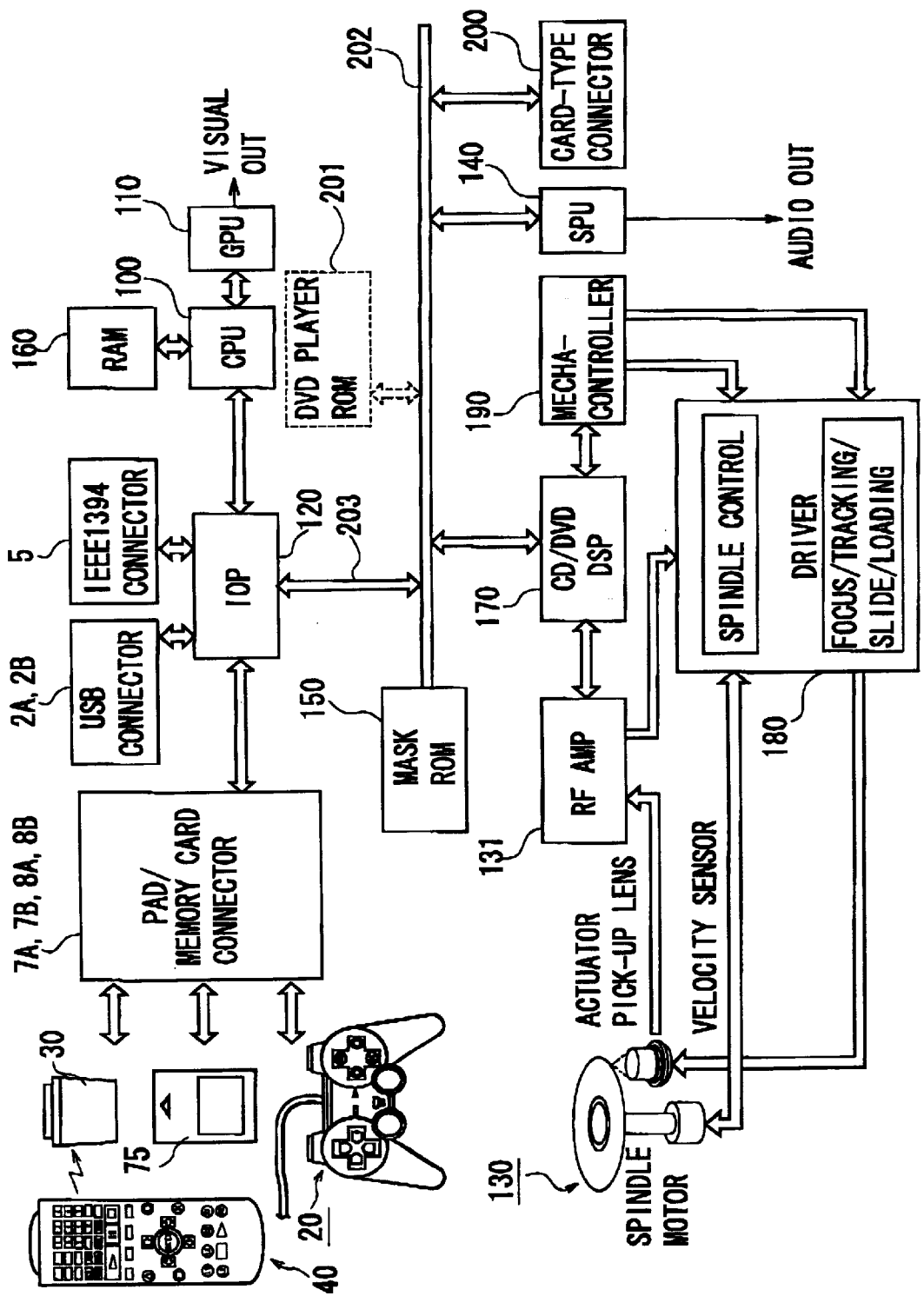
FIG. 7 is a block diagram showing the entertainment device of the embodiment.

FIG. 7 is a block diagram showing an overall electrical constitution of the main unit 1. As is clear from the figure, the main unit 1 comprises a CPU 100, a graphic processor (GPU) 110, an I/O processor (IOP) 120, an optical disk control section 130 for controlling reproduction of CD-ROM, DVD-ROM and so forth, a sound reproduction processor (SPU) 140, a MASK-ROM having stored therein operating system programs to be executed by the CPU 100 and IOP 120, and a RAM 160 acting as a buffer for temporarily storing data read out from a work area of the CPU 100 or an optical disk.

The main unit 1 is also provided with a CD/DVD DSP 170 for reproducing output of CDs or DVDs supplied through an RF amplifier 131 of the optical disk control section 130 after subjecting such output to the output error correction (CIRC processing); a driver 180 and a mechanical controller 190 both of which responsible for rotation control of a spindle motor of the optical disk control section 130, focus/tracking control of an optical pick-up and loading control of a disk tray, and a card-type connector 200 for allowing connection of a communication card or an external hard disk drive or the like.

These components are connected with each other mainly through bus lines 202 and 203 for example.

The CPU 100 is responsible for controlling the entire portion of the main unit 1 by executing the operating system program stored in the MASK-ROM 150.

The MASK-ROM 150 also has stored therein various device IDs for the controller plug-in portions 7A and 7B, memory card insertion portions 8A and 8B, controller 20 to be connected to the card-type connector 200, photo-receiving unit 30, remote controller 40 and memory card 75. While detailed in later, the IOP 120 communicates with various devices such as the controller 20, photo-receiving unit 30 and remote controller 40 based on the device IDs stored in the MASK-ROM 150, to thereby identify the devices connected to the USB connection terminals 2A and 2B, IEEE 1394 terminal 5, controller plug-in portions 7A and 7B, memory card insertion portions 8A and 8B and card-type connector 200.

The IOP 120 controls signal input/output to or from the controller 20, data input/output to or from the memory card 75 storing the game settings or so, and input/output of operational commands of the remote controller 40 received by the photo-receiving unit 30.

The GPU 110 performs drawing as being instructed by the CPU 100, and stores the drawn image into a frame buffer not shown. The GPU 110 also functions as a geometric transfer engine responsible for coordinate transformation or so.

More specifically, for the case that an application program of a game stored in an optical disk is such that using three-dimensional graphics, the GPU 110 functions as a geometric transfer engine first composes a virtual three-dimensional object based on a set of triangular polygons. The GPU 110 then performs various calculations for generating an image obtainable by photographing such three-dimensional object with a virtual camera, which is typically perspective transformation for rendering (calculation of coordinate values of apexes of the individual polygons composing the three-dimensional object projected onto a virtual camera screen).

The GPU 110 then produces, as being instructed by the CPU 100, an image by performing the rendering of such three-dimensional object in the frame buffer using the geometric transfer engine as required, and outputs video signals (visual out) corresponded to such produced image.

The SPU 140 has an ADPCM decoding function for reproducing sound data previously subjected to adaptive predictive coding, a reproduction function for reproducing and outputting audio signals such as effective sounds by reproducing waveform data stored in the sound buffer, and a modulation function for modulating and reproducing waveform data stored in the sound buffer.

As being provided with such functions, the SPU 140 is thus available as a so-called sampling sound source for generating, as being instructed by the CPU 100, audio signals such as music sound and effective sound based on waveform data stored in the sound buffer.

When such main unit 1 is powered on, the CPU 100 and IOP 120 individually read out from the MASK-ROM 150 the operating system programs for the CPU 100 and for the IOP 120, based on which the CPU 100 and IOP 120 operate. This allows the CPU 100 to totally control the individual portions of the main unit 1, and allows the IOP 120 to control input/output of signals among the controller 20, memory card 75 and photo-receiving unit 30.

The CPU 100 performs initialization such as operational confirmation based on the operating system program, and then controls the optical disk control section 130 to thereby execute application programs of video games or the like stored in the optical disk, or reproduce movies or the like stored in the optical disk.

When the video game program is executed, the CPU 100 controls the GPU 110 and SPU 140 according to instructions of the user received through the IOP 120 from the controller 20 or remote controller 40, to thereby control display of game scenes and generation of effective or musical sound.

The same will apply to reproduction of movies, in which the CPU 100 controls the GPU 110 and SPU 140 according to instructions (commands) of the user received through the IOP 120 from the controller 20 or remote controller 40, to thereby control display of movie scenes and generation of effective or musical sound reproduced from the optical disk.

Operation in the Embodiment

DVD Drive

Reproduction of a DVD on the entertainment device of the present embodiment requires a software of a DVD driver. The DVD driver is stored in movie disks or music disks together with movie information or music information. Once a DVD storing movie or the like is loaded by the user on the main unit 1, the IOP 120 reads out such DVD driver stored in the DVD, and stores under control such DVD driver into the RAM card 160 (memory card 75 also allowable) shown in FIG. 7. In the reproduction mode of the DVD, the IOP 120 controls the reproduction of the DVD based on such DVD driver stored in the RAM 160 (or memory card 75).

While the DVD driver may be susceptible to future modification of the standards, the entertainment device of the present embodiment is designed so as to store the DVD driver in the DVD together with movie information or music information, and to allow the user to use such DVD driver by reproduction, so that the entertainment device can flexibly be adoptive to the future modification in the DVD standards or the like, and can ensure the reproduction of image or sound stored in the DVD by using an always-new DVD driver.

It is now also allowable to distribute to the user the DVD driver as being recorded in a storage medium such as CD-ROM or memory card 75.

It is still also allowable that the DVD driver may be stored in a DVD player ROM 201 which typically comprises a semiconductor memory and is previously provided within the main unit 1 as shown in a block indicated with dashed line in FIG. 7.

Providing the DVD driver as being stored in CD-ROMs or memory cards 75 is disadvantageous in terms of costs of the storage media, whereas providing it as being stored in semiconductor memories or the like previously within the main unit 1 will successfully reduce the cost required for the storage media for distributing such DVD driver.

Connection Portions for the Photo-Receiving Unit

With such entertainment device of the present embodiment, the user can reproduce DVDS through remote control of the main unit 1 using the photo-receiving unit 30 and remote controller 40.

In such DVD reproduction through the remote control of the main unit 1 using the photo-receiving unit 30 and remote controller 40, the user first plugs the photo-receiving unit 30 into the controller plug-in portion 7A or 7B of the main unit 1.

While the photo-receiving unit 30 may be plugged into other interface, besides the controller plug-in portion 7A or 7B, such as the USB connection terminals 2A and 2B, IEEE 1394 terminal 5 or memory card insertion portions 8A or 8B, such plugging-in into the controller plug-in portion 7A or 7B ensures direct connection of the photo-receiving unit 30 to a game control line within the main unit 1.

When a game operation is conducted through the remote controller 40, game operational commands received by the photo-receiving unit 30 can directly be incorporated into the main unit 1 without being routed through any specific lines or circuits. This is advantageous in reducing the cost of the entertainment device since it is no more necessary to provide such specific lines or circuits for the game operational commands received by the photo-receiving unit 30.

Device ID

The interfaces of the main unit 1 of the entertainment device are available for connection with various devices such as the forgoing controller 20, photo-receiving unit 30 and memory card 75, where it is necessary for the main unit 1 to identify the devices connected thereto in order to ensure the operation of such main unit 1 corresponded to the individual devices.

Thus the individual devices are assigned with unique device IDs by types thereof. All of such individual device IDs are stored in the MASK-ROM 150 in the main unit 1. When the main unit 1 is powered on, the IOP 120 in such main unit 1 reads out the device IDs stored in the MASK-ROM 150, and communicates with the individual devices connected to the individual interfaces, to thereby identify and recognize the devices connected to the individual interfaces.

More specifically, when the main power source is turned on, the IOP 120 reads out the device IDs stored in the MASK-ROM 150, and send the device IDs serially to each device connected to the individual interfaces.

Each device compares the device IDs sent from the IOP 120 with the assigned device ID, and, upon agreement of the both, returns agreement data which indicates agreement of the both IDs.

Returning of the agreement data from the device means that the device ID, which make the agreement data return, is the ID for the device connected to the main unit 1. Thus the IOP 120 specifies and recognizes the device connected to the individual interfaces based on the device ID the agreement data is returned.

Similarly, when the photo-receiving unit 30 is connected to the main unit 1, the microcomputer 34 returns to the CPU 100 a device ID assigned to such photo-receiving unit 30 in response to a query from the CPU 100. This allows the main unit 1 to recognize the connection of the photo-receiving unit 30.

Device ID Stored in Storage Medium

While the device IDs of the individual devices are previously stored in the MASK-ROM 150 in the main unit 1, it is a common experience that various new devices are developed after the marketing of such devices in order to expand thereof. Since some of such new devices are not even developed before the launch of the entertainment device, so that it is quite natural that device IDs of such new devices cannot be stored in the MASK-ROM 150.

Thus in the entertainment device of the present embodiment, the device IDs of the new devices are stored in a storage medium such as CD-ROM, DVD-ROM and memory card 75 of new video games, movies and music, which are launched after the launch of the entertainment device.

More specifically referring to the present embodiment, the photo-receiving unit 30 and remote controller 40 correspond to such new devices. The CPU 100 of the main unit 1 thus, upon reproducing a DVD, recognizes such new devices after obtaining the device IDs of the photo-receiving unit 30 and remote controller 40. This allows the entertainment system to adapt to various new devices which are to be developed and launched in the future.

Wireless Communication Operation

The entertainment device of the present embodiment can principally operate in four following modes of:

1. "controller emulation mode" in which the video game is operated using the remote controller 40;
2. "DVD operation mode" in which movies for example stored in a DVD-ROM or the like is reproduced using the remote controller 40;
3. "first analytical mode" in which commands received from a remote controller other than the remote controller 40 are directly incorporated without compression; and
4. "second analytical mode" in which commands received from a remote controller other than the remote controller 40 are incorporated after being compressed.

The entertainment device operates in "controller emulation mode" and "DVD operation mode", when the set optical disk is the DVDs for a video game and for reproducing video information such as movies and music, respectively.

"first analytical mode" and "second analytical mode" are selected randomly by a player and the entertainment device operates in accordance with the selected mode.

Here, "first analytical mode" or "second analytical mode" can be designed so as to be selected automatically by the entertainment device depending on the data length of the received command.

Controller Emulation Mode

Judging that the set optical disc is the DVDs for a video game, this entertainment operates in "controller emulation mode". In "controller emulation mode", the entertainment device incorporates the command recorded in the buffer memory 39 of the photo-receiving unit 30 as the command correspond to the operation made on the individual button in the game controller portion 42 of the remote controller 40.

Figure 8:
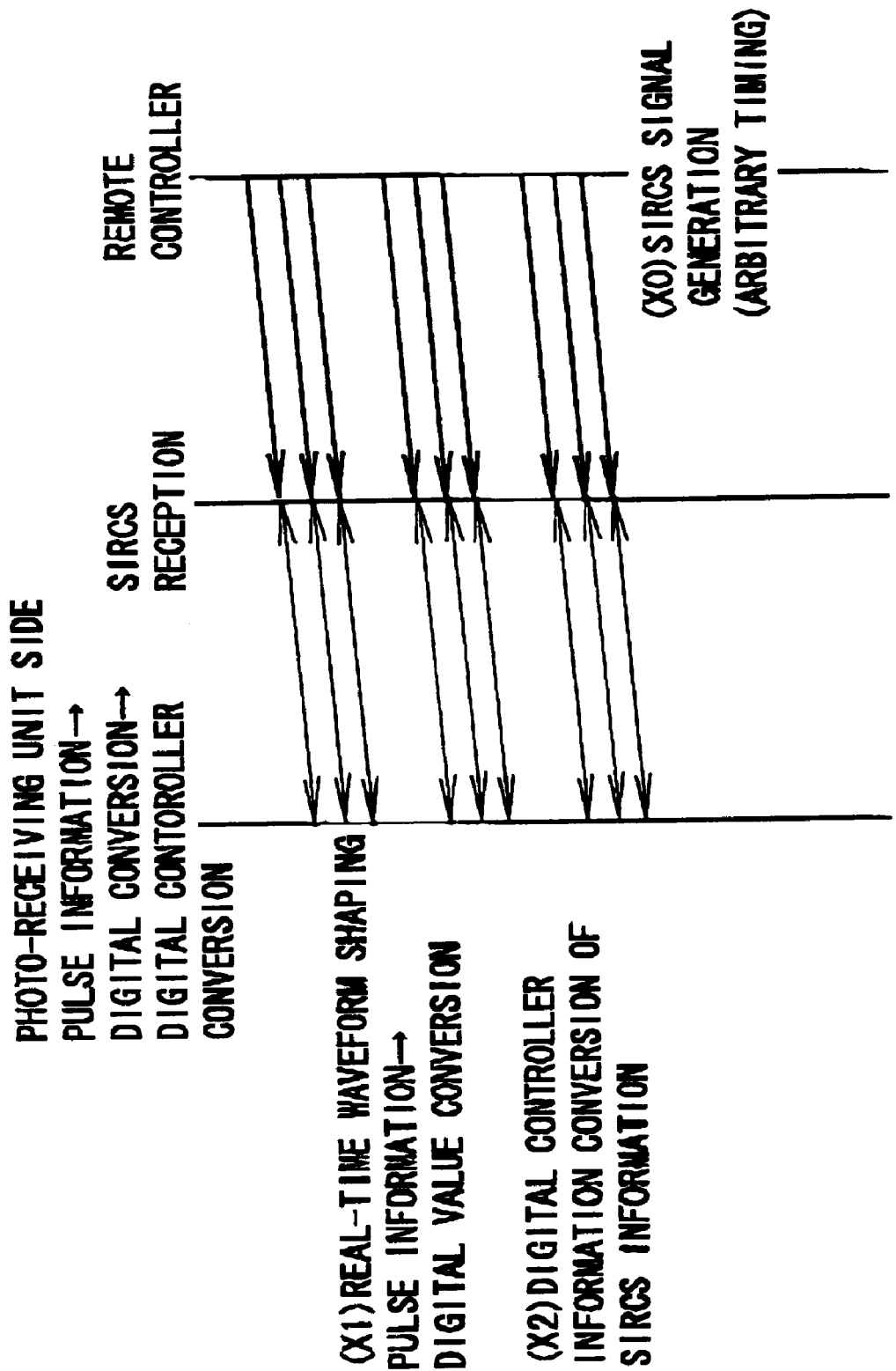
FIG. 8 is a time arrow chart showing a flow of command send/receive operation and signal processing between the remote controller and a photo-receiving unit during the controller emulation mode.

FIG. 8 is a time arrow chart showing a flow of command send/receive operation and signal processing between the remote controller 40 and a photo-receiving unit 30 during the controller emulation mode.

As shown in FIG. 8, when the game operation on the main unit 1 is effected through the remote controller 40, the user operates the game controller portion 42, and a command corresponded to such operation is sent to the photo-receiving unit 30 based on an arbitrary timing.

In such exemplary case, the sending of the command from the remote controller 40 to the photo-receiving unit 30 is effected typically according to the SIRCS (Standard Code for Infrared Remote Control System) format using infrared signal, while other photo signals or RF signals also allowable.

The standards of the SIRCS format are available in some varieties of the bit length of infrared signal, which are exemplified as 12 bits, 15 bits and 20 bits. The photo-receiving unit 30 supports reception of infrared signals having any of such bit lengths.

Specifically, when an infrared signal of 20-bit length is sent from the remote controller 40 to the photo-receiving unit 30, the first 13 bits are sent as a category code (a device ID of the device sending such infrared signal), and the successive 7 bits as a button code (a code assigned to each button in the game controller portion 42).

The microcomputer 34 of the photo-receiving unit 30 generates pulse information by real-time waveform shaping, and digitizes the pulse information by sampling it according to a sampling clock of a predetermined frequency. The microcomputer 34 then converts the digitized SIRCS signals into digital controller signals having the same signal form with the command signal from the controller 20 in the line connection, and temporarily stores such digital controller signals into the buffer memory 39 (see FIG. 2) provided within the photo-receiving unit 30.

Incorporation of Digital Controller Signals

Figure 9:
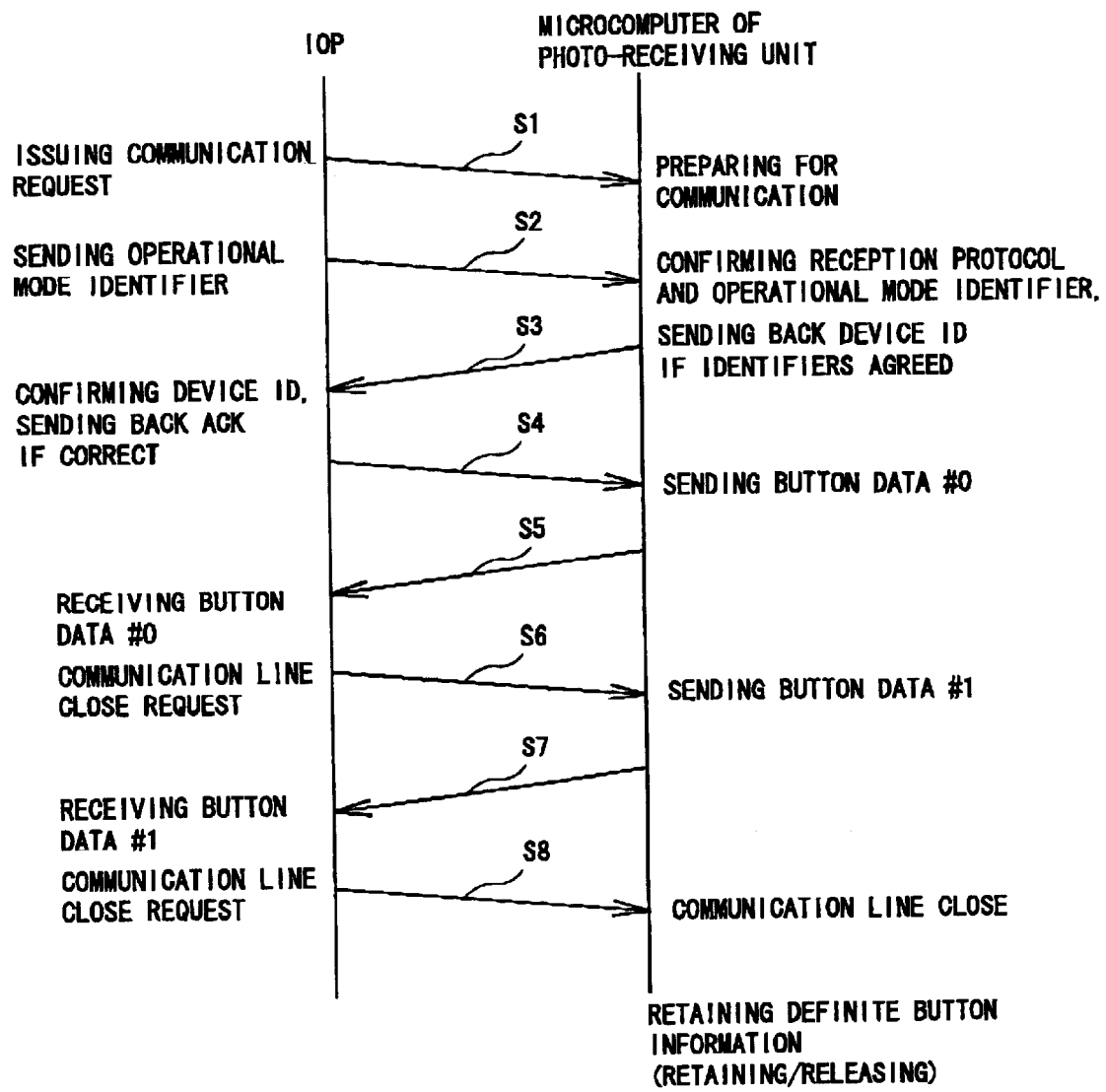
FIG. 9 is a time arrow chart showing a flow of command send/receive operation and signal processing between the photo receiving unit and the main unit of the entertainment device during the controller emulation mode.

FIG. 9 is a time arrow chart showing a flow of incorporation of digital controller signals stored in the buffer memory 39 into the main unit 1.

In such entertainment device of the present embodiment, the IOP 120 of the main unit 1 is typically designed so as to issue a communication request to the microcomputer 34 of the photo-receiving unit 30 at a regular interval such as once for every vertical synchronization period ($V_{sync}$).

Step S1 shown in FIG. 9 indicates the communication request directed from the IOP 120 to the microcomputer 34 of the photo-receiving unit 30. Upon reception of such communication request, the microcomputer 34 of the photo-receiving unit 30 starts preparation for the succeeding communication with the IOP 120.

Next in step S2, the IOP 120 serially sends to the microcomputer 34 of the photo-receiving unit 30 the individual device IDs for the devices such as the photo-receiving unit 30 and remote controller 40, the device IDs are read out from the MASK-ROM 150 or a storage medium such as DVD and memory card 75.

The microcomputer 34 of the photo-receiving unit 30 serially compares such serially sent device IDs with the device ID of the remote controller 40, and returns to the IOP 120, in step S3, a device ID of the photo-receiving unit 30 upon detection of agreement with the both.

After the device ID of the photo-receiving unit 30 is returned, the IOP 120 compares such returned device ID with a device ID of the photo-receiving unit 30 read out from a storage medium such as the MASK-ROM 150, DVD or memory card 75, and then sends, in step S4, to the microcomputer 34 of the photo-receiving unit 30 an acknowledge data (ACK) upon detection of agreement of the both.

Upon reception of the acknowledge data (ACK), the microcomputer 34 of the photo-receiving unit 30 then sends, in step S5, to the IOP 120 a digital controller signal stored in the buffer memory 39 (which is herein a button data, and more specifically button data #0, corresponded to the button operation made on the game controller portion 42 of the remote controller 40). Upon reception of such button data, the IOP 120 incorporates such data into the main unit 1 as an operational signal for the first operational portion 21 or the second operational portion 22 of the controller 20 previously explained referring to FIG. 1.

The IOP 120 monitors whether a predetermined period, such as a single vertical synchronization period ($V_{sync}=\frac{1}{60}$ sec), has elapsed after the point of time the communication request was issued in step S1, and sends in step S6 a dummy data to the microcomputer 34 of the photo-receiving unit 30 if the predetermined period has not elapsed.

Upon reception of such dummy data, the microcomputer 34 of the photo-receiving unit 30 sends in step S7 the digital controller signal stored next to the button data #0 in the buffer memory 39 (button data #1 in this case) to the IOP 120. Upon reception of such button data, the IOP 120 incorporates such data as an operational signal of the first operational portion 21 or the second operational portion 22 of the controller 20 as described in the above. Based on such button data incorporated into the main unit 1, the CPU 100 controls, for example, the display of the video game characters.

It should now be noted while the microcomputer 34 of the photo-receiving unit 30 was described as such that sending the digital controller signal stored in the buffer memory 39 to the main unit 1 as being triggered by the dummy data sent from the IOP 120, this is only one example of the communication protocol.

Such send/receive operation continues up to the point of time a predetermined time period elapses, which is typically a single vertical synchronization period ($V_{sync}$). When the IOP 120 detects that the certain time period has elapsed after the point of time when the communication request was issued, the IOP 120 then in step S8 supplies a communication line close request signal to the microcomputer 34 of the photo-receiving unit 30. Upon reception of such communication line close request signal, the microcomputer 34 of the photo-receiving unit 30 closes its communication line with the IOP 120. This completes one communication process between the microcomputer 34 of the photo-receiving unit 30 and the IOP 120 of the main unit 1.

As described in the above, the entertainment device of the present embodiment operates in "controller emulation mode" in judging that the set optical disk is the DVDs for a video game, and incorporates at a regular interval such as once for every vertical synchronization period ($V_{sync}$) the command of the remote controller 40 which is recorded in the buffer memory 39 as the button data of the game controller portion 42. Then CPU 100 controls the display of, for example, video game characters based on such incorporated button data. This allows the user to perform remote control of video games or the like executed on the main unit 1 by operating the game controller portion 42 of the remote controller 40.

DVD Operational Mode

Judging that the set optical disc is the DVD-ROM for reproducing video information such as movies and music, this entertainment, operates in "DVD operational mode". In "DVD operational mode", the entertainment device incorporates the command recorded in the buffer memory 39 of the photo-receiving unit 30 as the command correspond to the operation made on the individual button in the DVD operational portion 41 of the remote controller 40.

Figure 10:
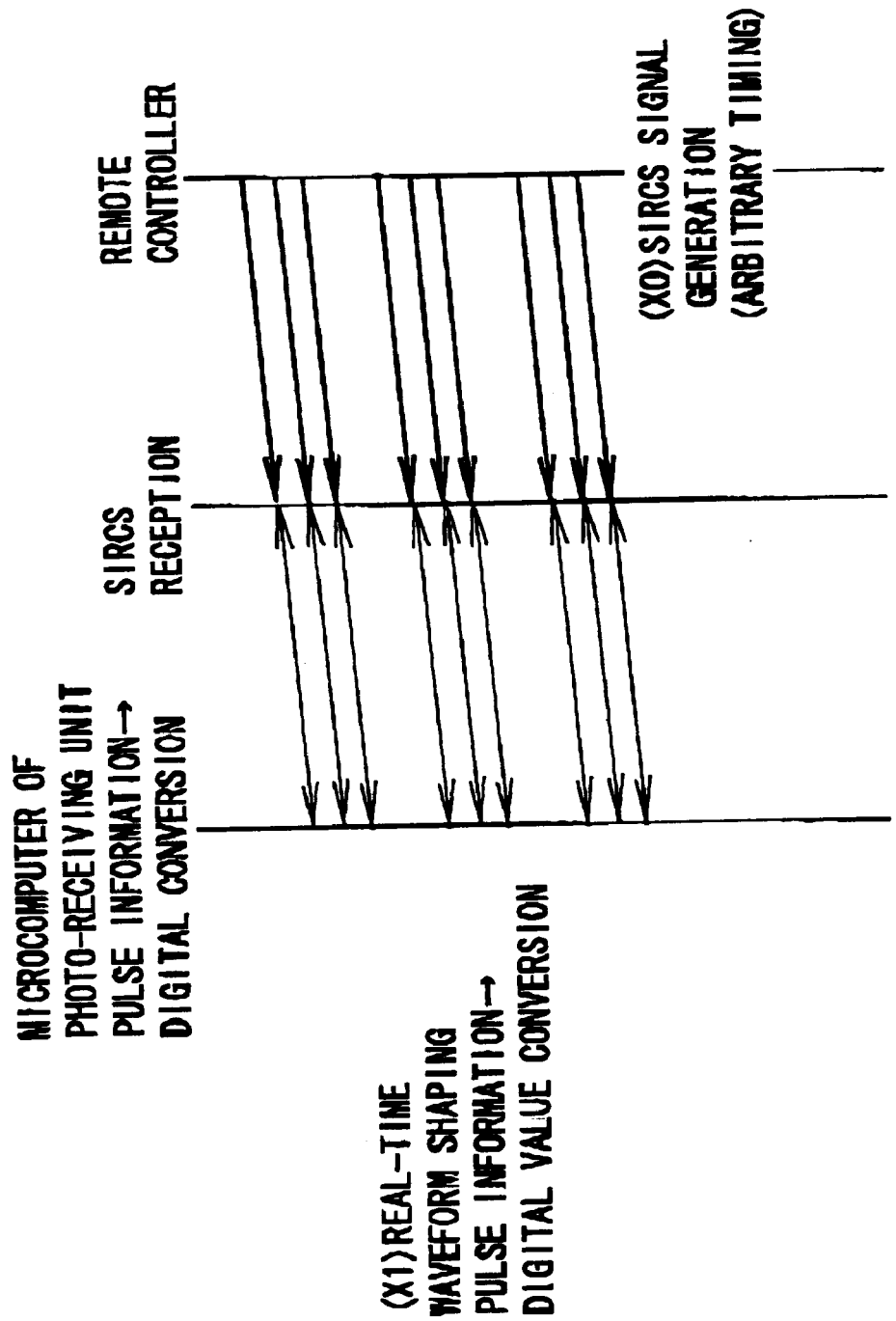
FIG. 10 is a time arrow chart showing a flow of command send/receive operation and signal processing between the remote controller and a photo-receiving unit during the SIRCS mode.

FIG. 10 is a time arrow chart showing a flow of command send/receive operation and signal processing between the remote controller 40 and the photo-receiving unit 30 during the "DVD operational mode".

As shown in FIG. 10, when the movies or the like stored in a DVD-ROM loaded on the main unit 1 is reproduced by operating the remote controller 40, the DVD operational portion 41 is operated by the user, and a command corresponded to such operation is sent to the photo-receiving unit 30 based on an arbitrary timing.

The command (SIRCS signal) during the DVD reproduction operation through the remote controller 40 is received by the photo-receiving unit 30. In response to such infrared signal (SIRCS signal), the microcomputer 34 of the photo-receiving unit 30 generates pulse information by real-time waveform shaping, and digitizes the pulse information by sampling it according to a sampling clock of a predetermined frequency. The microcomputer 34 then temporarily stores such digitized SIRCS signal into the buffer memory 39 provided within the photo-receiving unit 30.

Incorporation of DVD Operation Signals

Figure 11:
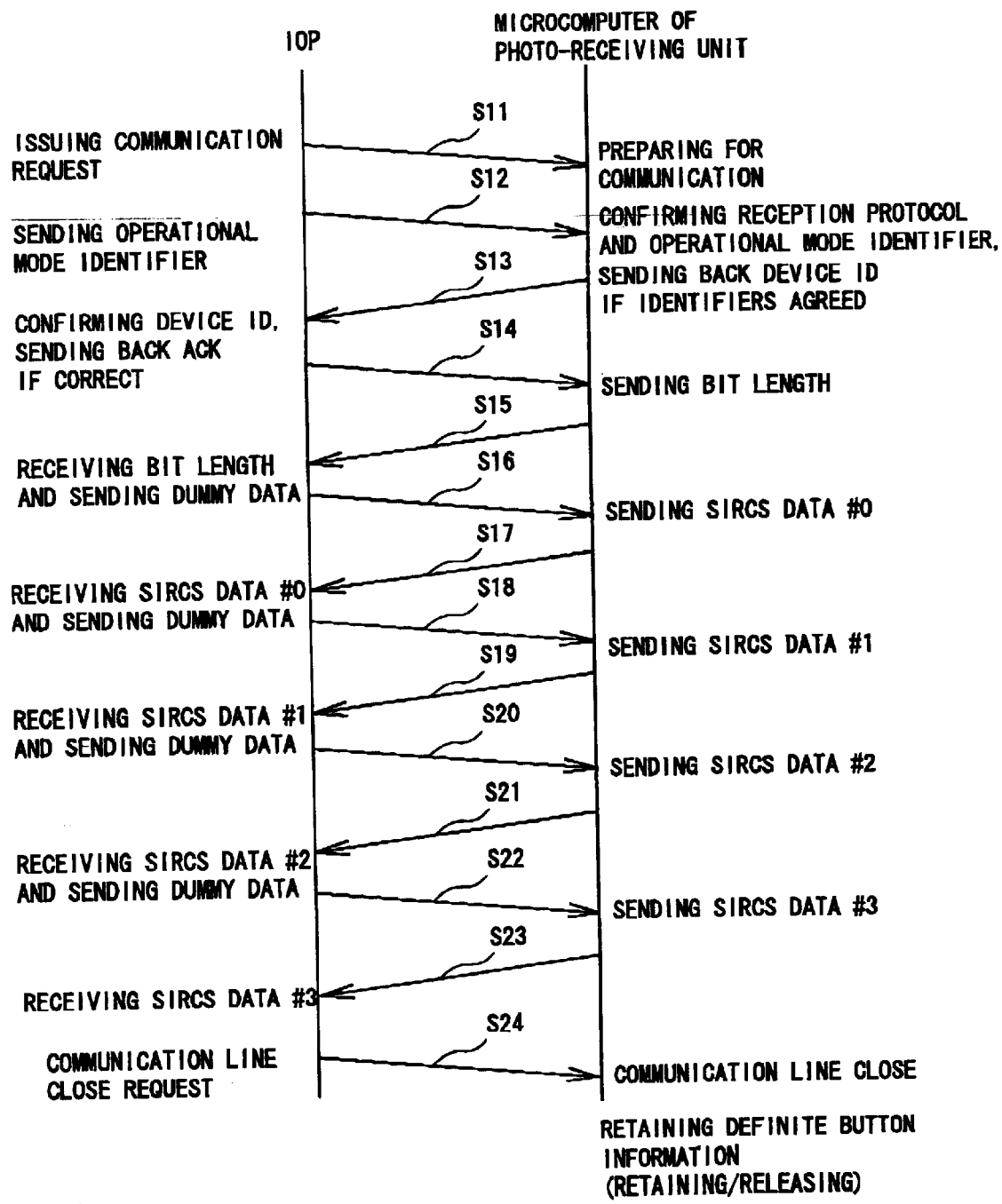
FIG. 11 is a time arrow chart showing a flow of command send/receive operation and signal processing between the photo-receiving unit and the main unit of the entertainment device during the SIRCS mode.

FIG. 11 is a time arrow chart showing a flow of incorporation of DVD operation signals stored in the buffer memory 39 into to main unit 1.

Step S11 in FIG. 11 shows that a communication request is directed from the IOP 120 to the microcomputer 34 of the photo-receiving unit 30 at a regular interval such as once for every vertical synchronization period ($V_{sync}$). Upon reception of such communication request, the microcomputer 34 of the photo-receiving unit 30 starts preparation for the succeeding communication with the IOP 120.

Next in step S12, the IOP 120 serially sends to the microcomputer 34 of the photo-receiving unit 30 the individual device IDs for the devices such as the photo-receiving unit 30 and remote controller 40, the device IDs are read out from the MASK-ROM 150 or a storage medium such as DVD and memory card 75.

The microcomputer 34 of the photo-receiving unit 30 serially compares such serially sent device IDs with a device ID of the photo-receiving unit 30, and returns to the IOP 120, in step S13, a device ID of the photo-receiving unit 30 upon detection of agreement with the both.

After the device ID of the photo-receiving unit 30 is returned, the IOP 120 compares such returned device ID with a device ID of the photo-receiving unit 30 read out from a storage medium such as the MASK-ROM 150, DVD or memory card 75, and then sends, in step S14, to the microcomputer 34 of the photo-receiving unit 30 an acknowledge data (ACK) upon detection of agreement of the both.

Upon reception of the acknowledge data (ACK), the microcomputer 34 of the photo-receiving unit 30 then detects, in step S15, a bit length of the DVD operational signal stored in the buffer memory 39, and then sends to the IOP 120 a data for expressing such bit length.

Upon reception of such data expressing the bit length, the IOP 120 transfers such data to the CPU 100, and sends in step S16 a predetermined dummy data to the microcomputer 34 of the photo-receiving unit 30.

The CPU 100 identifies, through receiving from the IOP 120 such data expressing the bit length, the bit length of the DVD operational signal to be incorporated into the photo-receiving unit 30, and performs practical signal processing of the DVD operational signal corresponding to such identified bit length when the DVD operational signal is actually incorporated into the main unit 1.

Upon reception of such dummy data from the IOP 120, the microcomputer 34 of the photo-receiving unit 30 sends, in step S17, a DVD operational signal stored in the buffer memory 39 (which is herein an SIRCS data corresponded to the button operation on the DVD operational portion 41 of the remote controller 40, and more specifically button data #0) to the IOP 120.

In the "DVD Operational mode", the IOP 120 incorporates the SIRCS signal as DVD operational signal, and sends it to the CPU 100.

The IOP 120 monitors whether a predetermined period, such as a single vertical synchronization period ($V_{sync}=1/60$ sec), has elapsed after the point of time the communication request was issued in step S11, and continues incorporation of the SIRCS data (DVD operational signal) read out from the buffer memory 39 of the photo-receiving unit 30 as shown in steps S17 to S23 up to the point of time the predetermined period elapses.

After the predetermined time period corresponded to a single communication period has elapsed, the IOP 120 then in step S24 supplies a communication line close request signal to the microcomputer 34 of the photo-receiving unit 30. Upon reception of such communication line close request signal, the microcomputer 34 of the photo-receiving unit 30 closes its communication line with the IOP 120. This completes one communication process between the microcomputer 34 of the photo-receiving unit 30 and the IOP 120 of the main unit 1.

As described in the above, in the entertainment device of the present embodiment, when the set optical disk is the DVDs for the video information, a command from the remote controller 40 is incorporated as a DVD operational signal. Then CPU 100 controls the reproduction of the DVD based on such incorporated DVD operational signal. This allows the user to perform remote control of DVD reproduction operation or so executed on the main unit 1 by operating the DVD operational portion 41 of the remote controller 40.

Maintenance of Command Continuity

When the upward prompt button 21a is continuously operated in the progress of a video game, the game scene should be scrolled upward continuously and smoothly. The same will apply to the DVD reproduction, and the displayed scene should fast forwarded or fast reversed continuously and smoothly by continuously operating the scan button 58, for example.

However when communication failure occurs between the remote controller 40 and the photo-receiving unit 30, which is typified by a case that a part of the command which should continuously be received by the photo-receiving unit 30 was omitted, in such continuous operation of the remote controller 40, control on the main unit side of scrolling, fast forwarding or fast reversing is only attainable in an intermittent manner despite the continuous operation by the user.

Thus in the entertainment device of the present embodiment, a predetermined number of commands received by the photo-receiving unit 30 are compared with each other, and when several commands come into agreement, such agreed commands are continuously supplied over a predetermined time period from the buffer memory 39 to the main unit 1, to thereby ensure identity of the commands read out from the buffer memory 39, and to thereby maintain the identity of the commands, fast forwarding or fast reversing effected on the main unit side.

Now on the main unit side, the commands stored in the buffer memory 39 of the photo-receiving unit 30 are incorporated at regular intervals, where the incorporation of the commands from the buffer memory 39 is effected within a period such that allowing displayed image to maintain the continuity, typically within a vertical synchronization period (horizontal synchronization period also allowable). Thus the continuity of the displayed image is not adversely affected even if the commands are intermittently processed in the main unit 1.

More specifically in the entertainment device of the present embodiment, three identical commands, where each of which is an SIRCS signal sent from the remote controller 40 to the photo-receiving unit 30, are continuously sent each time the individual buttons on the remote controller 40 are operated.

Figure 12:
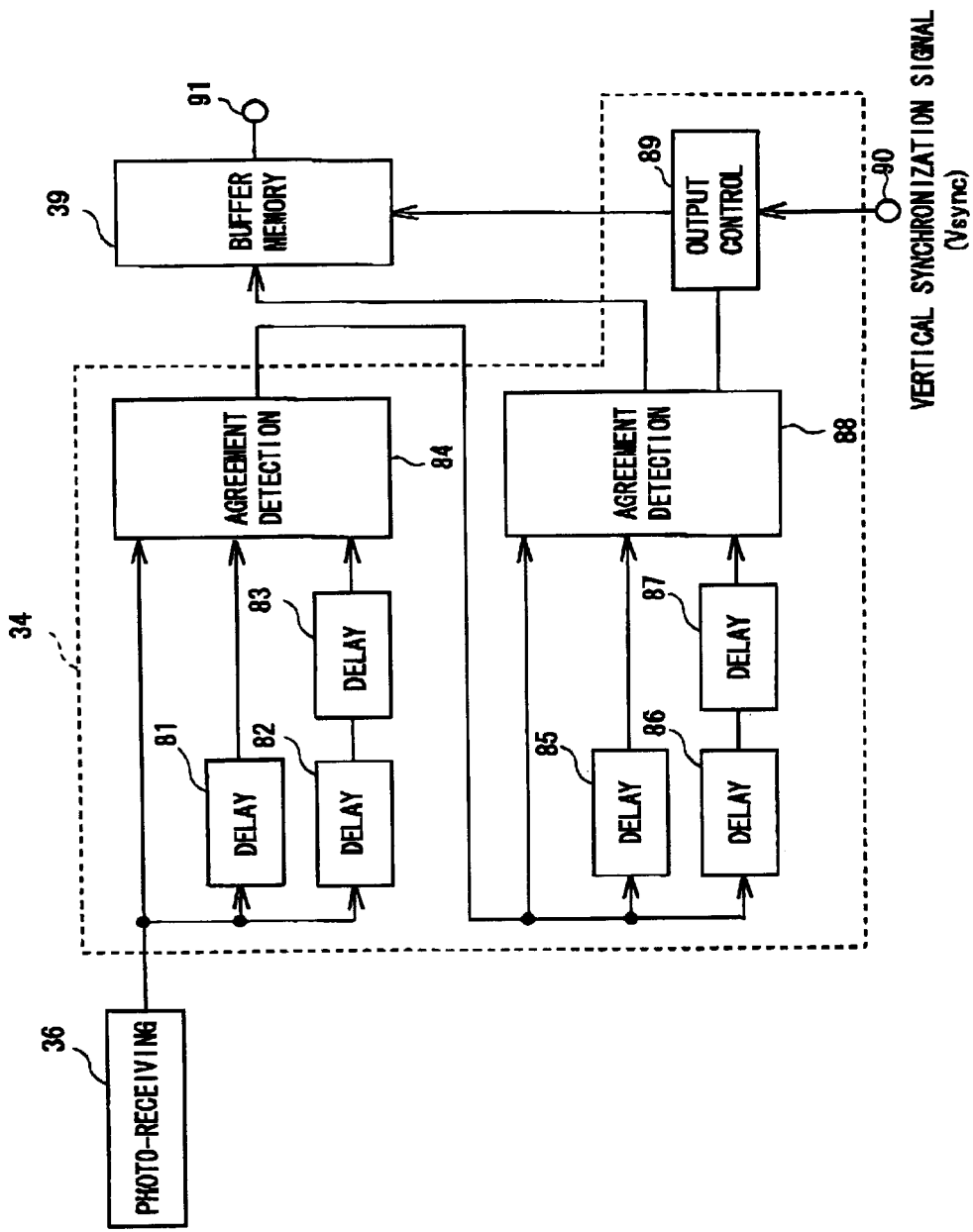
FIG. 12 is a functional block diagram corresponding to command corrective operation performed by a microcomputer in the photo-receiving unit when the command from the remote controller is received.

FIG. 12 is a functional block diagram of the microcomputer 34 in such case, where the microcomputer 34 is functionally composed of a delay circuit 81 for delaying each command, received by the photo-receiving element 36 in the photo-receiving unit 30, by one data length of such command; and delay circuits 82 and 83 for delaying each command, received by the photo-receiving element 36, by two data lengths of such command.

The microcomputer 34 further functionally comprises an agreement detection section 84 which compares commands delayed by one command data length by the delay circuit 81 and commands delayed by two command data lengths by the delay circuits 82 and 83, and outputs, if the two or more commands agreed, such commands as those expressing that the reception was successful, and outputs, if the two or more commands did not agree, a dummy command assuming the reception failed.

The microcomputer 34 further functionally comprises a delay circuit 85 which delays the commands for expressing the successful reception or dummy command expressing the failed reception by one data length of such commands; and delay circuits 86 and 87 which delay the commands for expressing the successful reception or dummy command expressing the failed reception by two data lengths of such commands.

The microcomputer 34 further functionally comprises an agreement detection section 88 which respectively compares commands expressing the successful reception directly supplied from the agreement detection section 84; the commands delayed by one command length by the delay circuit 81 expressing the successful reception or the dummy command expressing the failed reception; and the commands delayed by two command data lengths by the delay circuits 82 and 83 expressing the successful reception or the dummy command expressing the failed reception; and outputs, if the two or more commands expressing the successful reception agreed, such agreement detection output and supplies such commands for expressing the successful reception to the buffer memory 39.

The microcomputer 34 starts counting of the vertical synchronization signal ($V_{sync}$) based on a timing on which the agreement detection output is supplied from the agreement detection section 88, and controls commands output from the buffer memory 39 over typically 8 vertical synchronization periods so that identical commands are output from the buffer memory 39, but performs, when the agreement detection output was not supplied from the agreement detection section 88 within such 8 vertical synchronization periods, buffer flushing for clearing all commands stored in the buffer memory 39.

In the constitution shown in FIG. 12, when any button on the remote controller 40 is operated, the remote controller 40 typically sends three identical commands in a continuous manner, which are received by the photo-receiving unit 30. Three these commands are directly supplied to the agreement detection section 84, and supplied thereto after being delayed by one command data length by the delay circuit 81, and supplied thereto after being delayed by two command data lengths by the delay circuits 82 and 83.

The agreement detection section 84 compares three commands which were sent corresponding a single button operation on the remote controller 40, and outputs, when two or more of such commands agreed, such commands as those expressing the successful reception, but outputs, when two or more of such commands did not agree, a dummy command expressing the failed reception.

Such commands for expressing the successful reception or the dummy command are directly supplied to the agreement detection section 88, and supplied thereto after being delayed by one command data length by the delay circuit 85, and supplied thereto after being delayed by two command data lengths by the delay circuits 86 and 87.

The agreement detection section 88 compares three commands (i.e., the commands expressing the successful reception or the dummy command), and outputs, when two or more of such commands agreed, such agreed commands to the buffer memory 39, and at the same time supplies an agreement detection output expressing the agreement of two or more commands to the output control section 89.

FIG. 13A shows exemplary commands supplied to the agreement detection section 88, and FIG. 13B shows a timing whereby the agreement detection output is supplied from the agreement detection section 88. The individual commands A1 to A3 shown in FIG. 13A represent commands for expressing the successful reception, where as shown in FIG. 13B, the agreement detection output is supplied from the agreement detection section 88 based on a timing whereby agreement between the commands A1 and A2, between the commands A2 and A3, or between the commands A2 and A3 is detected.

The output control section 89 to which such agreement detection output will be supplied is previously supplied with vertical synchronization signal ($V_{sync}$) as shown in FIG. 13C through an input terminal 90, and starts counting of the vertical synchronization signal ($V_{sync}$) based on a timing whereby the agreement detection output is supplied, and controls commands output from the buffer memory 39 over typically 8 vertical synchronization periods so that the agreement-detected commands are continuously output from the buffer memory 39 as shown in FIG. 13D. When the agreement detection output was again supplied within the same 8 vertical synchronization periods, the output control section 89 starts re-counting of the 8 vertical synchronization periods based on the timing whereby such agreement detection output was supplied, and controls the buffer memory 39 so that the agreement-detected commands are continuously output therefrom again. On the other hand, when the agreement detection output was not supplied within such 8 vertical synchronization period, the output control section 89 controls the buffer memory 39 so as to clear all commands stored therein.

In other words in such exemplary case, once the agreement of the commands is detected, a period during which such agreement-detected commands are continuously output is ensured as long as 8 vertical synchronization periods; and if another agreement of the commands is detected again in such 8 vertical synchronization periods, another period during which such another agreement-detected commands are continuously output starts at a point of time the agreement was detected and lasts as long as again 8 vertical synchronization period. On the other hand, when the agreement detection output was not detected within such 8 vertical synchronization periods, the output control section 89 controls the buffer memory 39 so as to clear all commands stored therein.

Figure 14:
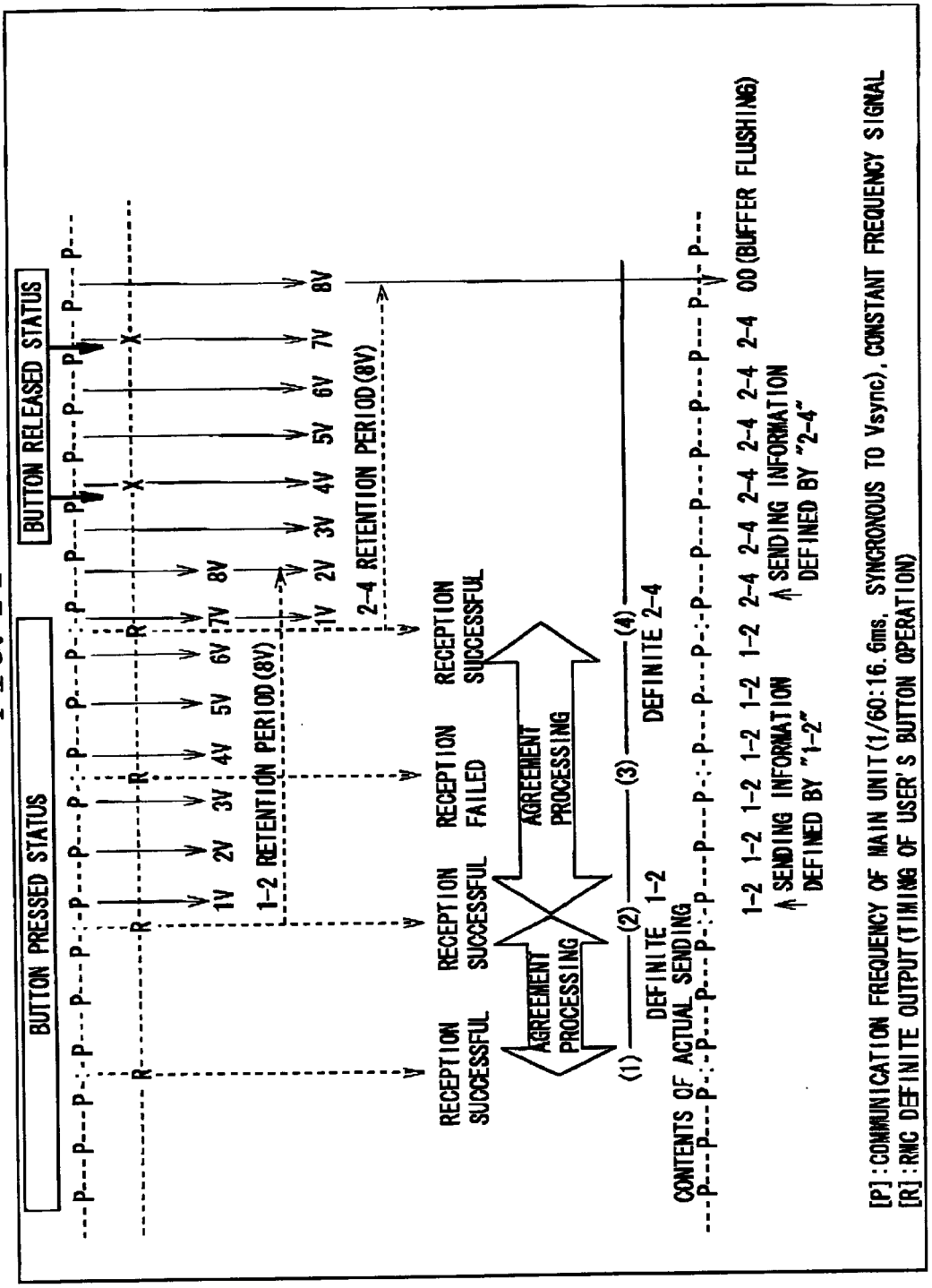
FIG. 14 is a schematic diagram for explaining the command corrective operation performed by the microcomputer in the photo-receiving unit when the command from the remote controller is received.

FIG. 14 is a schematic diagram illustrating such operation. In the figure, reference character "P", represents a timing whereby the main unit 1 incorporates a command from the buffer memory 39 of the photo-receiving unit 30 for every vertical synchronization period, and reference character "R" represents a timing whereby the user operates a desired button on the remote controller 40 (button pressed status).

In such case, operation of a desired button on the remote controller 40 is repeated four times by the user, in which the commands sent by the first, second and fourth button operations were successfully received by the photo-receiving unit 30 (i.e., it was detected that, of three commands sent by every button operation, two or more commands agreed), and the command sent by the third button operation resulted in communication failure (i.e., it was detected that, of three commands sent by every button operation, two or more commands did not agree).

Operation of such output control section 89 will be explained referring to the above example. Upon detection of agreement between the command corresponded to the first successful button operation and the command corresponded to the second successful button operation, the output control section 89 starts counting of the vertical synchronization signal, and controls the buffer memory 39 so as to continuously output such agreement-detected commands as definite commands (definite 1-2) over 8 vertical synchronization period.

The definite command (definite 1-2) is continuously output from the buffer memory 39 over 8 vertical synchronization periods as indicated as "1-2 retention period (8 V)" in FIG. 14, and if another definite command occurs within such "1-2 retention period (8 V)", the output control section 89 restarts the counting of the vertical synchronization signal at the point of time such another definite command occurred, and switches the definite commands continuously output from the buffer-memory 39 to such other definite command.

That is, since it is practiced that the agreement detection section 88 detects agreement of two of three commands, so that in the above exemplary case, the commands sent during the second and third button operations are compared, and the commands sent during the second and fourth button operation are also compared after the definite command (definite 1-2) is generated. Of these, the command sent during the third button operation is a dummy command expressing the failed reception, so that the agreement detection output is supplied from the agreement detection section 88 to the output control section 89 when the commands sent during the second and fourth button operations are compared.

The output control section 89 then controls the buffer memory 39 so as to continuously output such agreement-detected command as a definite command (definite 2-4) over 8 vertical synchronization period at the point of time that the agreement detection output for the commands sent during the second and fourth button operations was supplied.

This result in that, as shown in FIG. 14, the definite command (definite 1-2) is output from the buffer memory 39 typically over a duration of 6 vertical synchronization period from the first retention period (indicated in FIG. 14 as 1-2, 1-2, 1-2, 1-2, 1-2, 1-2), and the definite command (definite 1-2) is output from the buffer memory 39 in the seventh to eighth vertical synchronization periods in such first retention period (indicated in FIG. 14 as 2-4, 2-4, 2-4, 2-4, 2-4, 2-4, 2-4).

If such 8 vertical period elapsed while any buttons on the remote controller 40 being remained unoperated by the user (button released status), the output control section 89 controls the buffer memory 39 so as to clear (flush) all commands stored therein (indicated as "00" in FIG. 14).

As described in the above, when agreement of the two of three commands received by the photo-receiving unit 30 is detected, continuous output of such agreement-detected commands for a predetermined period from the buffer memory 39 can successfully compensate an omitted command even if communication failure accidentally occurred between the remote controller 40 and the photo-receiving unit 30, to thereby ensure continuity of the commands. Based on such continuity-ensured command, controls for scrolling, controls for fast forwarding, fast reversing and so forth executed on the main unit 1 can retain the continuity.

Analytical Operation of Spatial Transmission Format of Other Remote Controllers

While the above description was made assuming that the remote controller 40 is specialized for the entertainment device of the present embodiment, such entertainment device also supports other remote controllers using spatial transmission formats other than the SIRCS format applied to the foregoing remote controller 40.

The entertainment device has a "first analytical mode" whereby all commands having any spatial transmission formats other than the SIRCS format are incorporated without selection and analyzed to be used, and a "second analytical mode" whereby the commands having any spatial transmission formats other than the SIRCS format are incorporated after being culled and analyzed to be used.

"first analytical mode" and "second analytical mode" are selected randomly by a player and the entertainment device operates depending on the mode selected.

Here, "first analytical mode" or "second analytical mode" can be designed so as to be selected automatically by the entertainment device depending on the data length of the received command.

First Analytical Mode

Figure 15:
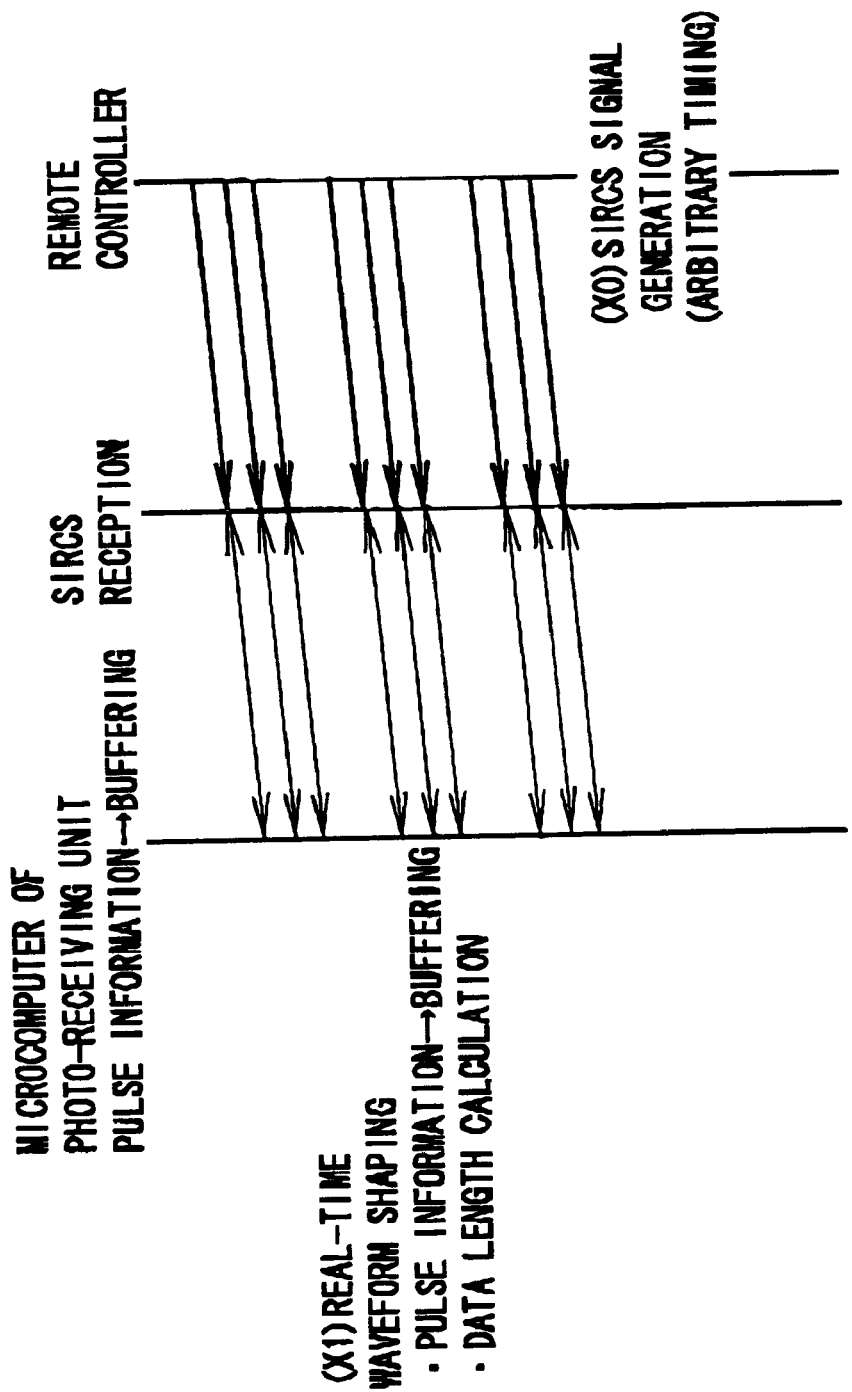
FIG. 15 is a time arrow chart showing a flow of command send/receive operation and signal processing between the remote controller and the photo-receiving unit during first analytical mode.

FIG. 15 is a time arrow chart showing command send/receive operation and signal processing between the other remote controller and the microcomputer 34 of the photo-receiving unit 30 during the first analytical mode.

As shown in FIG. 15, when the button on the other remote controller is operated by the user, infrared signal corresponded to such button operation is sent synchronous to the button operation from such other remote controller to the photo-receiving unit 30.

The photo-receiving unit 30 generates a pulse information corresponded to such received infrared signal by real-time waveform shaping of such signal. In this case, as the "first analytical mode" whereby all commands having any spatial transmission formats other than the SIRCS format are incorporated and analyzed to be used is selected by a player, the photo-receiving unit 30 stores all of such pulse information in the buffer memory 39 without subjecting such pulse information to culling (compression), and calculates the data length of the pulse information, and analyzes the spatial transmission format applied to the other remote controller.

More specifically, in such exemplary case, the spatial transmission format information corresponded to a plurality of other remote controllers is stored typically in a ROM of the photo-receiving unit 30. So that the microcomputer 34 of the photo-receiving unit 30 first discriminates whether the spatial transmission format of the command received from the remote controller is the SIRCS format or not based typically on header information of such command, and if not, then detects the spatial transmission format of the command sent from the other remote controller based on such plurality of spatial transmission format information stored in the ROM.

Such command having the spatial transmission format of other remote controller is converted into a command having the SIRCS format which is supported by the main unit 1 (format conversion), and is again stored in the buffer memory 39. Such command stored in the buffer memory 39 is intermittently incorporated into the main unit 1 as described below.

It should now be noted that the following explanation will deal with a case that the spatial transmission format of the command which is already stored in the buffer memory 39 is detected, and that the command after being subjected to format conversion depending on such detection result is again stored in the buffer memory 39, where it is also allowable to detect the spatial transmission format of the command before being stored in the buffer memory 39, and then to control the storage of such command into the buffer memory 39 after subjecting such command to the format conversion depending of the detection result.

The following explanation will also deal with a case that the format conversion of the command sent from the other remote controller is performed by the microcomputer 34 of the photo-receiving unit 30, where such format conversion may also be performed by the main unit 1.

Figure 16:
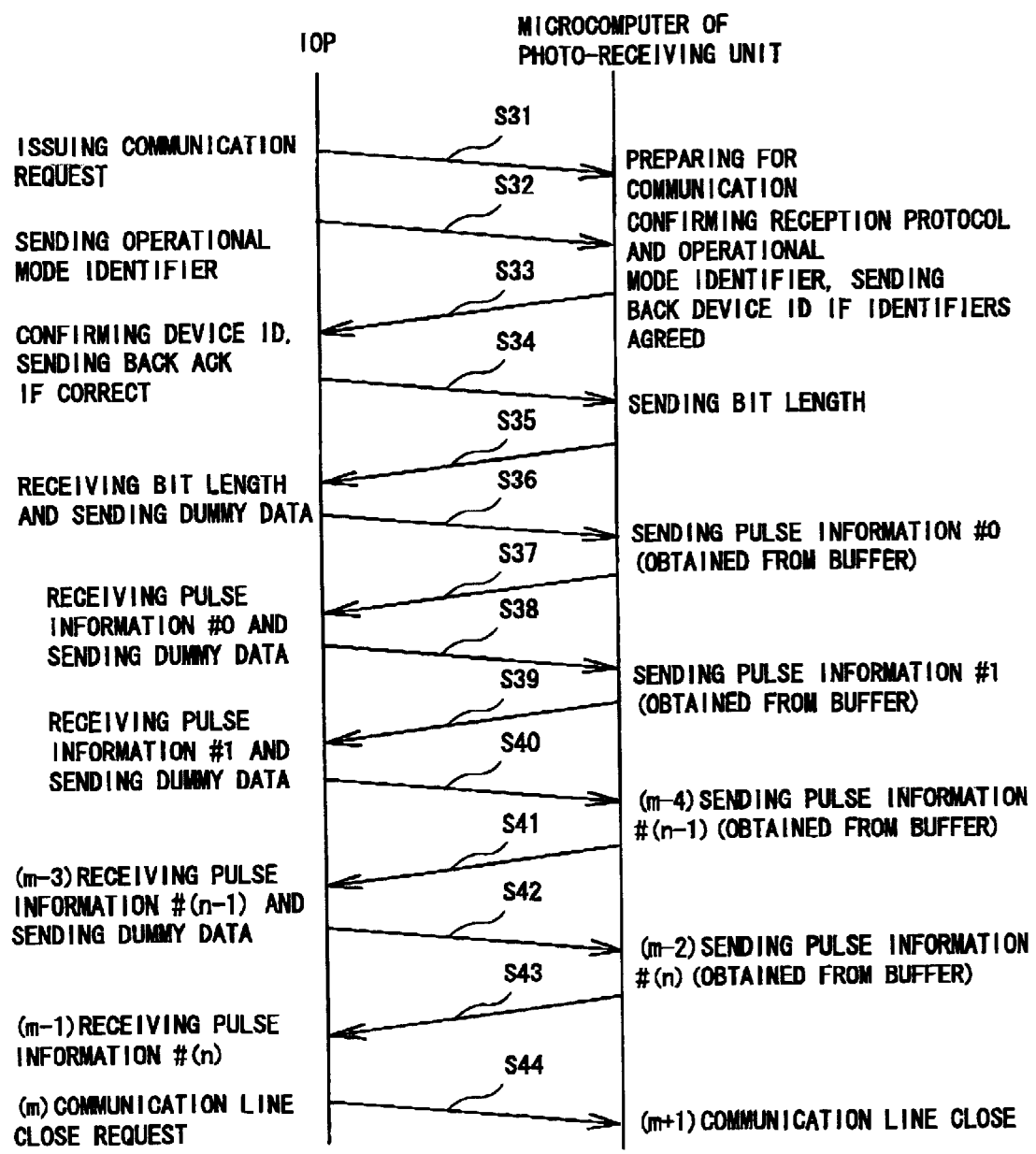
FIG. 16 is a time arrow chart showing a flow of command send/receive operation and signal processing between the photo-receiving unit and the main unit of the entertainment device during first analytical mode.

Next paragraphs will describe, referring to FIG. 16, a process flow in which the command sent from the other remote controller, after being subjected to the format conversion and stored in the buffer memory 39 of the photo-receiving unit 30, is incorporated into the main unit 1.

First in step S31 in the time arrow chart shown in FIG. 16, a communication request is issued by the IOP 120 of the main unit 1 to the microcomputer 34 of the photo-receiving unit 30 at regular intervals such as one vertical synchronization period ($V_{sync}$). Upon reception of such communication request, the microcomputer 34 of the photo-receiving unit 30 starts preparation for the succeeding communication with the IOP 120.

Next in step S32, the IOP 120 serially sends to the microcomputer 34 of the photo-receiving unit 30 the individual device IDs for the devices such as the photo-receiving unit 30 and remote controller 40, the device IDs are read out from the MASK-ROM 150 or a storage medium such as DVD and memory card 75.

The microcomputer 34 of the photo-receiving unit 30 serially compares such serially sent device IDs with the device ID of the remote controller 40, and returns to the IOP 120, in step S33, a device ID of the photo-receiving unit 30 upon detection of agreement with the both.

Upon returning of the device ID of the photo-receiving unit 30, the IOP 120 then compares such returned device ID with the device ID of the photo-receiving unit 30 read out from a storage medium such as MASK-ROM 150, DVD or memory card 75, and sends in step S34 an acknowledge data (ACK) to the microcomputer 34 of the photo-receiving unit 30 when the agreement of the both was confirmed.

Upon reception of the acknowledge data (ACK), the microcomputer 34 of the photo-receiving unit 30 detects in step S35 the bit length of the command sent from the other remote controller stored in the buffer memory 39, and then sends a data expressing such bit length to the IOP 120.

Upon reception of such data expressing the bit length, the IOP 120 sends in step S36 a predetermined dummy data to the microcomputer 34 of the photo-receiving unit 30.

The CPU 100 recognizes the bit length of the command from the other controller to be incorporated during future communication with the photo-receiving unit 30 by receiving from the IOP 120 such data expressing the bit length, and controls the main unit 1 or the peripheral devices connected thereto corresponding to such recognized bit length when the command from the other remote controller (format-converted command) is actually incorporated into the main unit 1.

In such communication protocol, the microcomputer 34 of the photo-receiving unit 30 sends the command stored in the buffer memory 39 as being triggered by the dummy data sent from the IOP 120, which should be noted as merely one example.

Upon reception of such dummy data from IOP 120, the microcomputer 34 of the photo-receiving unit 30 then in step S37 sends the command from the other remote controller (illustrated in FIG. 16 as pulse information #0 in this case) stored in the buffer memory 39 to the IOP 120.

The IOP 120 receives the command read out from the buffer memory 39 as the command of "first analytical mode", and then sends such command to the CPU 100.

The CPU 100 performs data processing of such command based on the previously-recognized bit length to thereby effect control instructed by the command. This allows the main unit 1 and the peripheral devices thereof to be remote-controlled through the other remote controller.

The IOP 120 monitors whether a predetermined period, such as a single vertical synchronization period ($V_{sync}=\frac{1}{60}$ sec), has elapsed after the point of time the communication request was issued in the foregoing step S31, and continues incorporation of the commands of the other remote controller read out from the buffer memory 39 of the photo-receiving unit 30 until such predetermined time period elapses as shown in steps S37 to S43.

When the certain time period elapsed after the point of time the communication request was issued, the IOP 120 then in step S44 supplies a communication line close request signal to the microcomputer 34 of the photo-receiving unit 30. Upon reception of such communication line close request signal, the microcomputer 34 of the photo-receiving unit 30 closes its communication line with the IOP 120. This completes one communication process between the microcomputer 34 of the photo-receiving unit 30 and the IOP 120 of the main unit 1.

As described in the above in such entertainment device of the present embodiment, all commands from the other remote controller are incorporated without culling (compression), and the format of such commands from the other remote controller is converted to a format supportable by the main unit 1 and is then stored in the buffer memory 39 of the photo-receiving unit 30. the IOP 120 of the main unit 1 then accesses such buffer memory 39 at a regular interval to thereby incorporate the command stored therein, and the CPU 100 controls operation of the main unit 1 or the peripheral devices connected thereto. This allows the user to remote-control the main unit 1 through the other remote controller.

Second Analytical Mode

Next paragraphs describe the "second analytical mode" whereby the commands having a spatial transmission format other than the SIRCS format are incorporated as being culled, and analyzed to be used.

Figure 17:
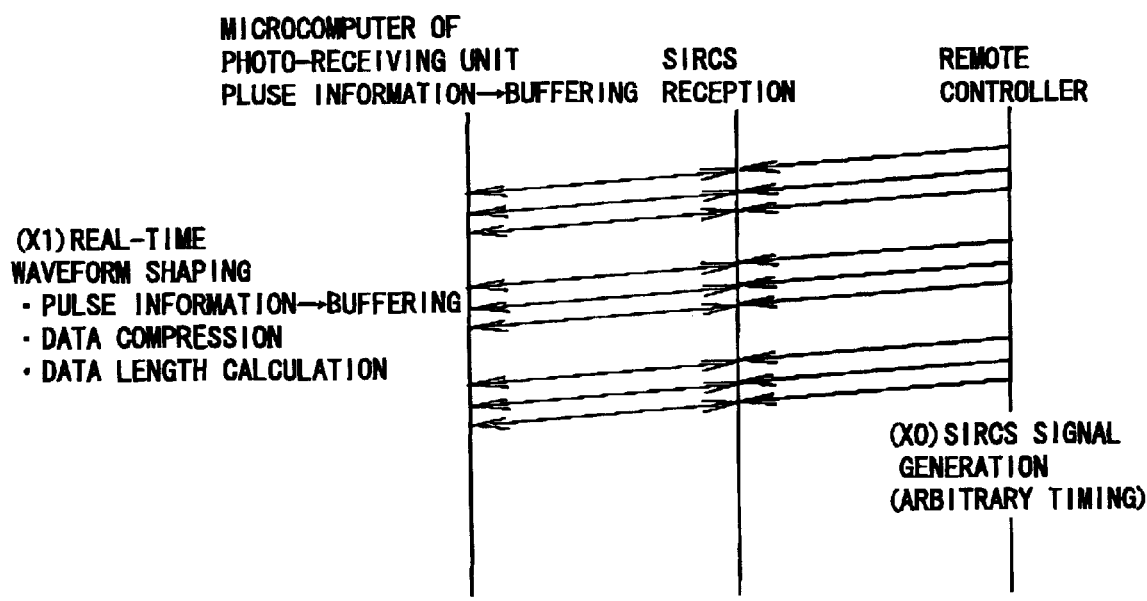
FIG. 17 is a time arrow chart showing a flow of command send/receive operation and signal processing between the remote controller and the photo-receiving unit during a second analytical mode.

FIG. 17 is a time arrow chart showing command send/receive operation and signal processing between the other remote controller and the microcomputer 34 of the photo-receiving unit 30 during the second analytical mode.

As shown in FIG. 17, when the button on the other remote controller is operated by the user, infrared signal corresponded to such button operation is sent synchronous to the button operation from such other remote controller to the photo-receiving unit 30.

The photo-receiving unit 30 generates a pulse information corresponded to such received infrared signal by real-time waveform shaping of such signal. In this case, as the "second analytical mode" whereby the commands having any spatial transmission formats other than the SIRCS format are incorporated after being culled and analyzed to be used is selected by a player, the photo-receiving unit 30 culls (compresses) such pulse information synchronous to a predetermined clock, such as vertical synchronization signal and system clock of the main unit 1, and then intermittently stores such culled information into the buffer memory 39.

Figures 18A, 18B, 18C:
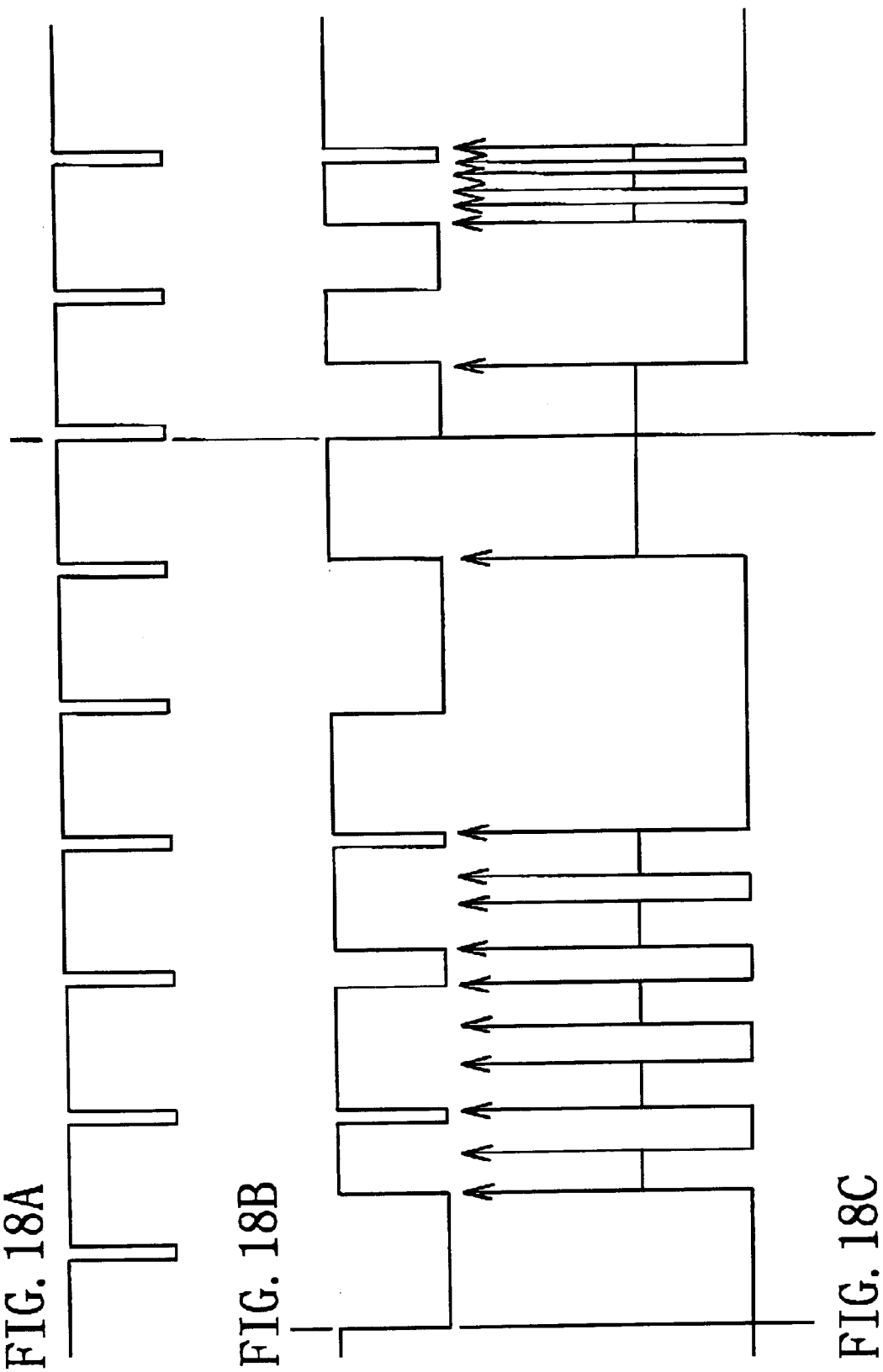
FIGS. 18A to 18C are timing charts explaining command culling (compression) during a second analytical mode.

FIGS. 18A to 18C shows timing chart expressing such culling. FIG. 18A shows a vertical synchronization signal exemplarily used as a clock in the culling, FIG. 18C shows commands received from the other remote controller received by the photo-receiving unit 30, and FIG. 18B shows commands from the other remote controller stored in the buffer memory 39 after being culled based on the vertical synchronization signal (see FIG. 18A).

As is clear from FIGS. 18A to 18C, upon receiving the commands from the other remote controller, the microcomputer 34 of the photo-receiving unit 30 first fetches such command at the point of time the vertical synchronization signal rises up.

When the latched command was found to be of low level, the microcomputer 34 then maintains such low level until the point of time the next edge of the command rises up. On the contrary, when the command latched at the point of time the command rises up was found to be of high level, the microcomputer 34 maintains such high level until the edge of the command falls down.

Thus as shown in FIG. 8B, the command is successfully culled in a manner synchronous to the signal processing timing in the main unit 1 without seriously ruin the signal form of the received command.

The microcomputer 34 then calculates the data length of the command from the other remote controller stored after being culled in the buffer memory 39 of the photo-receiving unit 30, and analyzes the spatial transmission format applied to the other remote controller.

More specifically, in such exemplary case, the spatial transmission format information corresponded to a plurality of other remote controllers is stored typically in a ROM of the photo-receiving unit 30. So that the microcomputer 34 of the photo-receiving unit 30 first discriminates whether the spatial transmission format of the command is the SIRCS format or not based typically on header information of such command, and if not, then detects the spatial transmission format of the command sent from the other remote controller based on such plurality of spatial transmission format information stored in the ROM.

Such command having the spatial transmission format of the other remote controller is converted into a command having the SIRCS format which is supported by the main unit 1 (format conversion), and is again stored in the buffer memory 39. Such command stored in the buffer memory 39 is intermittently incorporated into the main unit 1 as described below.

Such command having the spatial transmission format of other remote controller is converted into a command having the SIRCS format which is supported by the main unit 1 (format conversion) and is again stored in the buffer memory 39. Such command stored in the buffer memory 39 is intermittently incorporated into the main unit 1 as described below.

It should now be noted that the above explanation dealt with a case that the commands already stored in the buffer memory 39 after being culled are subjected to the format conversion and again stored in the buffer memory 39, where it is also allowable to subject the commands from the other remote controller to the culling and format transformation before being stored in the buffer memory 39 and then store the command in the buffer memory 39 under control.

While the above description dealt with the exemplary case in which the format conversion of the commands from the other remote controller was performed by the microcomputer 34 of the photo-receiving unit 30, such format conversion may be performed by the main unit 1.

Figure 19:
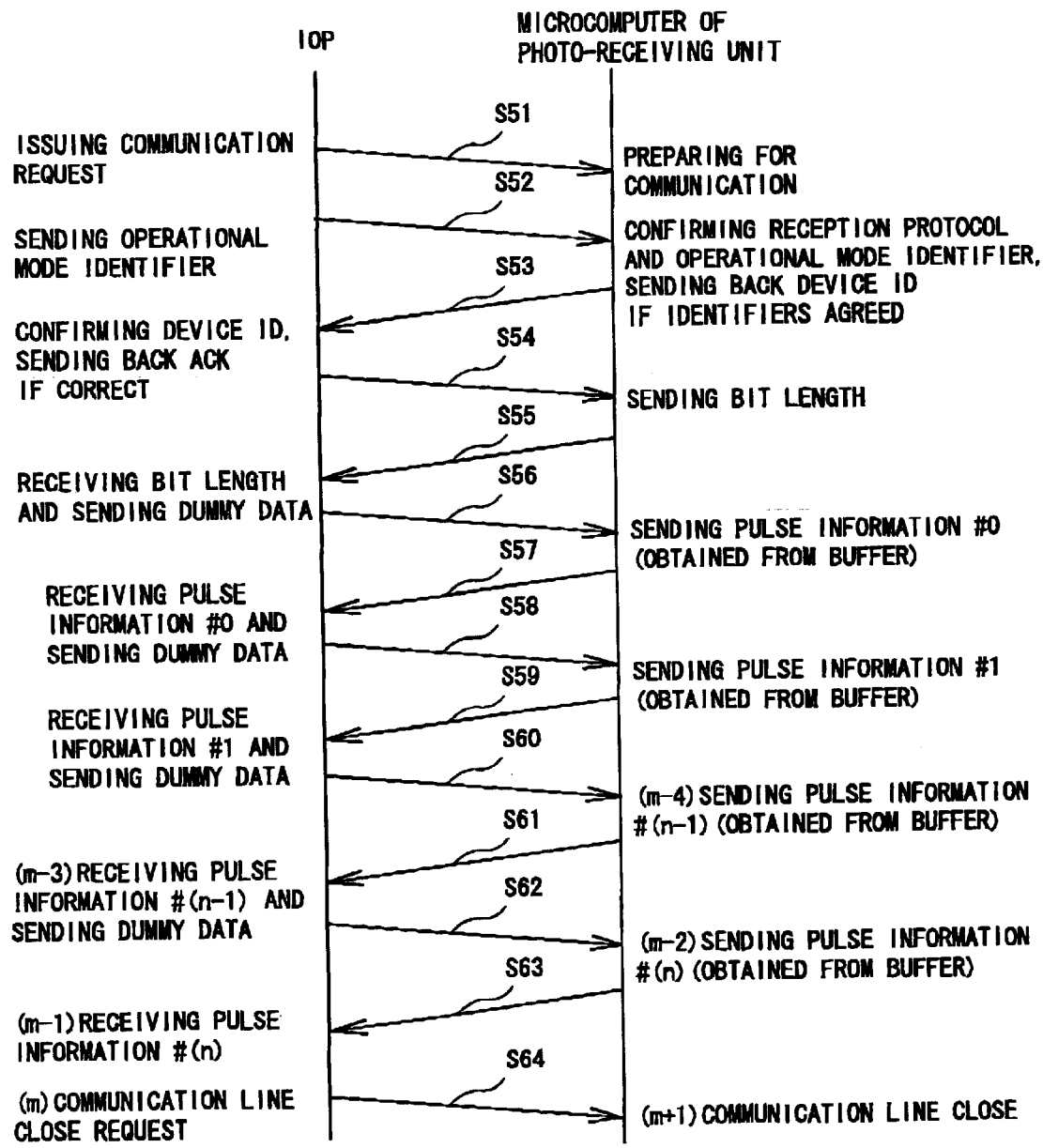
FIG. 19 is a time arrow chart showing a flow of command send/receive operation and signal processing between the photo-receiving unit and the main unit of the entertainment device during the second analytical mode.

Next paragraphs will describe, referring to a time arrow chart in FIG. 19, a process flow in which the command sent from the other remote controller, after being subjected to the format conversion and stored in the buffer memory 39 of the photo-receiving unit 30, is incorporated into the main unit 1.

First in step S51 in the time arrow chart shown in FIG. 19, a communication request is issued by the IOP 120 of the main unit 1 to the microcomputer 34 of the photo-receiving unit 30 at a regular interval such as one vertical synchronization period ($V_{sync}$). Upon reception of such communicating lest the microcomputer 34 of the photo-receiving unit 30 starts preparation for the succeeding communication with the IOP 120.

Next in step S52, the IOP 120 serially sends to the microcomputer 34 of the photo-receiving unit 30 the individual device IDs for the devices such as the photo-receiving unit 30 and remote controller 40, the device IDs are read out from the MASK-ROM 150 or a storage medium such as DVD and memory card 75.

The microcomputer 34 of the photo-receiving unit 30 serially compares such serially sent device IDs with the device ID of the remote controller 40, and returns to the IOP 120, in step S53, a device ID of the photo-receiving unit 30 upon detection of agreement with the both.

After the device ID of the photo-receiving unit 30 is returned, the IOP 120 compares such returned device ID with a device ID of the photo-receiving unit 30 read out from a storage medium such as the MASK-ROM 150, DVD or memory card 75, and then sends, in step S54, to the microcomputer 34 of the photo-receiving unit 30 an acknowledge data (ACK) upon detection of agreement of the both.

Upon reception of the acknowledge data (ACK), the microcomputer 34 of the photo-receiving unit 30 detects in step S55 the bit length of the command sent from the other remote controller stored in the buffer memory 39, and then sends a data expressing such bit length to the IOP 120.

Upon reception of such data expressing the bit length, the IOP 120 sends in step S56 a predetermined dummy data to the microcomputer 34 of the photo-receiving unit 30.

The CPU 100 recognizes the bit length of the command from the other remote controller to be incorporated during future communication with the photo-receiving unit 30 by receiving from the IOP 120 such data expressing the bit length, and controls the main unit 1 or the peripheral devices connected thereto corresponding to such recognized bit length when the command from the other remote controller (format-converted command) is actually incorporated into the main unit 1.

In such communication protocol, the microcomputer 34 of the photo-receiving unit 30 sends the command stored in the buffer memory 39 as being triggered by the dummy data sent from the IOP 120, which should be noted as merely one example.

Upon reception of such dummy data from IOP 120, the microcomputer 34 of the photo-receiving unit 30 then in step S57 sends the command from the other remote controller (illustrated in FIG. 19 as pulse information #0 in this case) stored in the buffer memory 39 to the IOP 120.

The IOP 120 receives the command read out from the buffer memory 39 as the command of "second analytical mode", and then sends such command to the CPU 100. The CPU 100 performs data processing of such command based on the previously-recognized bit length to thereby effect control instructed by the command. This allows the main unit 1 and the peripheral devices thereof to be remote-controlled through the other remote controller.

The IOP 120 monitors whether a predetermined period, such as a single vertical synchronization period ($V_{sync}=\frac{1}{60}$ sec), has elapsed after the point of time the communication request was issued in the foregoing step S51, and continues incorporation of the commands of the other remote controller read out from the buffer memory 39 of the photo-receiving unit 30 until such predetermined time period elapses as shown in steps S57 to S63.

When the certain time period corresponded to one communication period elapsed, the IOP 120 then in step S64 supplies a communication line close request signal to the microcomputer 34 of the photo-receiving unit 30. Upon reception of such communication line close request signal, the microcomputer 34 of the photo-receiving unit 30 closes its communication line with the IOP 120. This completes one communication process between the microcomputer 34 of the photo-receiving unit 30 and the IOP 120 of the main unit 1.

As described in the above in such entertainment device of the present embodiment, the commands from the other remote controller are properly culled based for example on a clock such as the vertical synchronization signal used by the main unit 1, and the format of such commands from the other remote controller is converted to a format supportable by the main unit 1 and is then stored in the buffer memory 39 of the photo-receiving unit 30. the IOP 120 of the main unit 1 then accesses such buffer memory 39 at a regular interval to thereby incorporate the command stored therein, and the CPU 100 controls operation of the main unit 1 or the peripheral devices connected thereto. This allows the user to remote-control the main unit 1 through the other remote controller.

While the description for the above embodiment dealt with the case in which a DVD is reproduced using the photo-receiving unit 30 and remote controller 40, it is also allowable to remote-control other apparatuses, such as reproducing music CDs or operating an air conditioners, using the photo-receiving unit 30.

In such case, the user can use his or her familiar remote controller of a CD player device or an air conditioner at his or her own home, and the main unit 1 controls such CD player device or the air conditioner while analyzing the foregoing spatial transmission format.

It is thus to be understood that, by attaching the photo-receiving unit 30 to the entertainment device of the present embodiment and by reading with the main unit 1 the individual commands of the remote controllers handled by the user, it is made possible not only to reproduce (or record) any storage media loaded onto the entertainment device of the present embodiment, but also to operate every kind of electronic appliances externally connected to such entertainment system.

The embodiment described in the above is only part of the examples of the present invention. It is therefore to be understood that the present invention may be practiced in any modifications depending on the design or the like otherwise than as specifically described herein without departing from the scope and the technical spirit thereof.

What is claimed is:

1. A remote-control signal receiver for connection to an entertainment device having a plurality of functions that includes a video game execution function, said remote-control signal receiver comprising:

connection means for providing a connection to a main unit of the entertainment device;

reception means for receiving at least one remote-control signal sent from a remote-control means, the at least one remote-control signal including a plurality of operational commands and being associated with a specific operation of the remote-control means; and signal processing means for supplying the received remote-control signal to the main unit of the entertainment device, said signal processing means including:

first delay means for delaying at least one of the plurality of operational commands of the received remote-control signal, first agreement detection means for comparing the delayed operational command and at least a further one of the plurality of operational commands of the at least one received remote-control signal and for generating a first detection command based on the comparison, the first detection command being a reception successful command when the at least one delayed operational command agrees with the further operational command, thereby indicating that the received remote-control signal was received correctly, and the first detection command being a dummy command when the at least one delayed operational command does not agree with the further operational command, second delay means for delaying at least the first detection command received from said first agreement detection means, second agreement detection means for comparing the delayed first detection command received from said second delay means and at least a further first detection command received from either said second delay means or said first agreement detection means, the further first detection command indicating that another remote-control signal sent by the remote-control means was received correctly, said second agreement detection means generating a second detection command and an agreement detection signal when the delayed first detection command agrees with the further first detection command, thereby indicating a repeat of a same operation of the remote-control means, storage means for storing the second detection command, and output control means for commencing a predetermined interval upon receipt of the agreement detection signal from said second agreement detection means and for instructing said storage means to continuously output the second detection command for the predetermined interval.

2. The remote-control signal receiver according to claim 1, wherein said connection means is connected to the main unit of the entertainment device through a controller connection terminal provided on the main unit.

3. The remote-control signal receiver according to claim 1, wherein said reception means receives at least one infrared signal from the remote-control means as the at least one remote-control signal.

4. The remote-control signal receiver according to claim 1, wherein said first delay means delays the at least one operational command for a first interval and delays the further operational command for a second interval, and said first agreement detection means compares the at least one operational command and the further operational command.

5. The remote-control signal receiver according to claim 1, wherein the further operational command is not delayed, and said first agreement detection means compares the delayed operational command received from said first delay means and the further operational command.

6. The remote-control signal receiver according to claim 1, wherein said second delay means delays the first detection command for a first interval and delays the further first detection command for a second interval, and said second agreement detection means compares the delayed first detection command and the further first detection command.

7. The remote-control signal receiver according to claim 1, wherein the further first detection command is received from said first agreement detection means without being delayed, and said second agreement detection means compares the delayed first detection command and the further first detection command.

8. The remote-control signal receiver according to claim 1, wherein said output control means terminates the predetermined interval and commences another predetermined interval upon receipt of a further agreement detection signal from said second agreement detection means, and said output control means then instructs said storage means to continuously output another detection command corresponding to the further agreement detection signal for the another predetermined interval.

9. The remote-control signal receiver according to claim 8, wherein the receipt of the further agreement detection signal from said second agreement detection means indicates a further repeat of the same operation of the remote-control means, and the another detection command is identical to the second detection command.

10. A remote-control signal receiver for connection to an entertainment device having a plurality of functions that include a video game execution function, said remote-control signal receiver comprising:
  connection means for providing a connection to a main unit of the entertainment device;
  reception means for receiving at least one remote-control signal sent from a remote-control means, the at least one remote-control signal including a plurality of operational commands and being associated with a specific operation of the remote-control means;
  format information storage means for storing format information that includes a plurality of remote-control signal formats;
  determination means for determining a format of the received remote-control signal based on the stored format information;
  format conversion means for converting the format of the received remote-control signal into a format supportable by the entertainment device; and
  signal processing means for supplying the at least one converted remote-control signal to the entertainment device, said signal processing means including:
    first delay means for delaying at least one of the plurality of operational commands of the at least one converted remote-control signal,
    first agreement detection means for comparing the delayed operational command and at least a further one of the plurality of operational commands of the at least one converted remote-control signal and for generating a first detection command based on the comparison, the first detection command being a reception successful command when the delayed operational command agrees with the further operational command, thereby indicating a repeat of a same operation of the remote-control means, and the first detection command being a dummy command when the delayed operational command does not agree with the further operational command,
    second delay means for delaying at least the first detection command received from said first agreement detection means,
    second agreement detection means for comparing the delayed first detection command received from said second delay means and at least a further first detection command received from either said second delay means or said first agreement detection means, the further first detection command corresponding to another remote-control signal sent by the remote-control means, said second agreement detection means generating a second detection command and an agreement detection signal when the delayed first detection command agrees with the further detection command,
    command storage means for storing the second detection command, and
    output control means for commencing a predetermined interval upon receipt of the agreement detection signal from said second agreement detection means and for instructing said command storage means to continuously output the second detection command for the predetermined interval.

11. The remote-control signal receiver according to claim 10, further comprising compression means for culling portions of the received remote-control signal to compress the information volume of the remote-control signal.

12. The remote-control signal receiver according to claim 10, wherein said format conversion means converts the format of the at least one remote-control signal to a format of commands generated by a controller wired to the main unit when the main unit operates as a video game machine, and wherein said format conversion means converts the format of the at least one remote-control signal into a format of commands for controlling reproduction of audio and/or video content when the main unit operates as a content player.

13. A method of providing a remote-control signal to a remote control signal receiver of an entertainment device having a plurality of functions that include a video game execution function, said method comprising: providing a connection from the remote-control signal receiver to a main unit of the entertainment device;
  receiving at least one remote-control signal at the remote control signal receiver from a remote-control means, the at least one remote-control signal including a plurality of operational commands and being associated with a specific operation of the remote control means;
  delaying at least one operational command of the plurality of operational commands of the received remote-control signal;
  comparing the delayed operational command and at least a further one of the plurality of operational commands of the received remote-control signal, and generating a first detection command based on the comparison, the first detection command being a reception successful command when the delayed operational command agrees with the further operational command, thereby indicating that the at least one remote-control signal was received correctly, the first detection command being a dummy command when the at least one delayed operational command does not agree with the further operational command;
  delaying at least the first detection command;
  comparing the delayed first detection command and at least a further first detection command, the further first detection command indicating that another remote-control signal sent by the remote-control means was received correctly, and generating a second detection command and an agreement detection signal when the delayed first detection command agrees with the further first detection command, thereby indicating a repeat of a same operation of the remote-control means;
  storing the second detection command;
  commencing a predetermined time period upon receipt of the agreement detection signal; and
  continuously outputting the second detection command for the predetermined time period.

14. The method according to claim 13, wherein the at least one operational command is delayed for a first interval, the further operational command is delayed for a second interval, and the at least one operational command and the further operational command are compared.

15. The method according to claim 13, wherein the further operational command is not delayed, and the at least one delayed operational command and the further operational command are compared.

16. The method according to claim 13, wherein the first detection command is delayed for a first interval, the further first detection command is delayed for a second interval, and the delayed first detection command and the further first detection command are compared.

17. The method according to claim 13, wherein the further first detection command is not delayed, and the delayed first detection command and the further first detection command are compared.

18. The method according to claim 13, further comprising terminating the predetermined time period and commencing another predetermined time period upon receipt of a further agreement detection signal, and then continuously outputting another detection command corresponding to the further agreement detection signal for the another predetermined time period.

19. The method according to claim 18, wherein the receipt of the further agreement detection signal indicates a further repeat of the same operation of the remote-control means, and the another detection command is identical to the second detection command.

20. A method according to of providing a remote-control signal to a remote control signal receiver of an entertainment device having a plurality of functions that include a video game execution function, said method comprising: providing a connection from the remote-control signal receiver to a main unit of the entertainment device;

receiving at least one remote-control signal at the remote-control signal receiver from a remote-control means, the at least one remote-control signal including a plurality of operational commands and being associated with a specific operation of the remote control means;

determining a format of the at least one received remote-control signal based on stored format information that includes a plurality of remote-control signal formats;

converting the format of the at least one received remote-control signal into a format supportable by the entertainment device supplying the at least one converted remote-control signal to the entertainment device;

delaying at least one of the plurality of operational commands of the at least one converted remote-control signal;

comparing the delayed operational command and at least a further one of the plurality of operational commands of the at least one converted remote-control signal, and generating a first detection command based on the comparison, the first detection command being a reception successful command when the at least one delayed operational command agrees with the further operational command, and the first detection command being a dummy command when the at least one delayed operational command does not agree with the further operational command;

delaying at least the first detection command;

comparing the delayed first detection command and at least a further first detection command, the further first detection command corresponding to another remote-control signal sent by the remote-control means, and generating a second detection command and an agreement detection signal when the delayed first detection command agrees with the further detection command;

storing the second detection command;

commencing a predetermined time period upon receipt of the agreement detection signal; and continuously outputting the second detection command for the predetermined time period.

21. The method according to claim 20, further comprising culling portions of the received remote-control signal to compress the information volume of the received commands.

22. The method according to claim 20, wherein the format of the at least one received remote-control signal is converted to a format of commands generated by a controller wired to the entertainment device when the entertainment device operates as a video game machine, and the format of the at least one received remote-control signal is converted into a format of commands for controlling reproduction of audio and/or video content when the entertainment device operates as a player.

23. A computer-readable storage medium having recorded therein instructions for providing a remote-control signal a remote control signal receiver of to an entertainment device having a plurality of functions that include a video game execution function, said instructions comprising: providing a connection from the remote-control signal receiver to a main unit of the entertainment device;

receiving at least one remote-control at the remote-control signal receiver signal from a remote-control means, the at least one remote-control signal including a plurality of operational commands and being associated with a specific operation of the remote control means;

delaying at least one operational command of the plurality of operational commands of the received remote-control signal;

comparing the delayed operational command and at least a further one of the plurality of operational commands of the received remote-control signal, and generating a first detection command based on the comparison, the first detection command being a reception successful command when the delayed operational command agrees with the further operational command, thereby indicating that the at least one remote-control signal was received correctly, the first detection command being a dummy command when the at least one delayed operational command does not agree with the further operational command;

delaying at least the first detection command;

comparing the delayed first detection command and at least a further first detection command, the further first detection command indicating that another remote-control signal sent by the remote-control means was received correctly, and generating a second detection command and an agreement detection signal when the delayed first detection command agrees with the further first detection command, thereby indicating a repeat of a same operation of the remote-control means;

storing the second detection command;

commencing a predetermined time period upon receipt of the agreement detection signal; and continuously outputting the second detection command for the predetermined time period.

24. A system, comprising:

an entertainment device; and a remote-control signal receiver connected to the entertainment device;

said entertainment device having a plurality of functions that include a video game execution function, including:

detection means for detecting a type of information stored in a storage medium disposed within said entertainment device, and selection means for selecting one of a plurality of operating modes based on the type of information detected by said detection means, the selected operating mode being a video game player when the type of information stored in the storage medium is video game information, and the selected operating mode being a content player when the type of information stored in the storage medium is audio and/or video information;

said remote-control signal receiver including:
- connection means for providing a connection to a main unit of said entertainment device;
- reception means for receiving at least one remote-control signal sent from a remote-control means, the at least one remote-control signal including a plurality of operational commands and being associated with a specific operation of the remote-control means; and
- signal processing means for supplying the received remote-control signal to the main unit of said entertainment device, said signal processing means including:
  - first delay means for delaying at least one of the plurality of operational commands of the received remote-control signal,
  - first agreement detection means for comparing the delayed operational command and at least a further one of the plurality of operational commands of the at least one received remote-control signal and for generating a first detection command based on the comparison, the first detection command being a reception successful command when the at least one delayed operational command agrees with the further operational command, thereby indicating that the received remote-control signal was received correctly, and the first detection command being a dummy command when the at least one delayed operational command does not agree with the further operational command,
  - second delay means for delaying at least the first detection command received from said first agreement detection means,
  - second agreement detection means for comparing the delayed first detection command received from said second delay means and at least a further first detection command received from either said second delay means or said first agreement detection means, the further first detection command indicating that another remote-control signal sent by the remote-control means was received correctly, said second agreement detection means generating a second detection command and an agreement detection signal when the delayed first detection command agrees with the further first detection command, thereby indicating a repeat of a same operation of the remote-control means,
  - storage means for storing the second detection command, and
  - output control means for commencing a predetermined interval upon receipt of the agreement detection signal from said second agreement detection means and for instructing said storage means to continuously output the second detection command for the predetermined interval.

* * * * *

UNITED STATES PATENT AND TRADEMARK OFFICE
CERTIFICATE OF CORRECTION

PATENT NO. : 6,761,635 B2
DATED : July 13, 2004
INVENTOR(S) : Masanori Hoshino and Koji Hamada It is certified that error appears in the above-identified patent and that said Letters Patent is hereby corrected as shown below:

Column 1, line 1 to column 25, line 30, delete the specification, and substitute therefor the enclosed specification.

Column 25,
Line 34, "includes" should read -- include --.

Column 28,
Line 10, "remote control" should read -- remote-include --.

Column 29,
Line 13, cancel "according to".
Line 14, "remote control" should read -- remote-control --.
Line 30, after "device", insert -- ; --.

Column 30,
Line 8, after "signal", insert -- to --.
Line 9, cancel the word "to".
Line 14, after "remote-control" (first occurrence), insert -- signal --.
Line 15, cancel the word "signal" (second occurrence).

Signed and Sealed this

Twenty-second Day of March, 2005

JON W. DUDAS
*Director of the United States Patent and Trademark Office*

UNITED STATES PATENT AND TRADEMARK OFFICE
CERTIFICATE OF CORRECTION

PATENT NO.        : 6,761,635 B2
APPLICATION NO. : 10/039478
DATED             : July 13, 2004
INVENTOR(S)       : Masanori Hoshino and Koji Hamada It is certified that error appears in the above-identified patent and that said Letters Patent is hereby corrected as shown below:

Delete the specification Columns 1-32 and substitute therefor the attached specification Columns 1-30.

This certificate supersedes Certificate of Correction issued March 22, 2005.

Signed and Sealed this

Seventeenth Day of October, 2006

JON W. DUDAS
*Director of the United States Patent and Trademark Office*

Page 2 of 16

REMOTE-CONTROL SIGNAL RECEIVER

This application claims priority from Japanese Patent Application No. 2000-344536 filed on Nov. 10, 2000 and No. 2001-330041 filed on Oct. 26, 2001, the disclosures of which are hereby incorporated by reference herein.

BACKGROUND OF THE INVENTION

The present invention relates to a remote-control signal receiver having at least a game execution function for executing video games based on game programs stored in storage media such as a CD-ROM, DVD-ROM or semiconductor memory, and an image reproduction function for reproducing image information from storage media having recorded therein image information such as a movie; an information processing method for a remote-control signal; a storage medium having recorded therein an information processing program for a remote-control signal; an information processing program; and a remote-control device.

Today, game programs of video games are generally distributed in a form being stored in optical disks such as a CD-ROM or a DVD-ROM since such disks can store larger volume of video games, which are becoming more advanced and complicated, and can be manufactured at lower costs than semiconductor memories.

A video game machine reads out a game program from an optical disk, displays game scenes and characters on a monitor device, and emits, under control, effective sounds from speaker units. Movement of the characters or the like displayed on the monitor device can be controlled by the user through a controller.

Thus, the user can enjoy various types of video games such as an RPG (role playing game), an AVG (adventure game) and an SLG (simulation game).

Video data stored in such CD-ROMs and DVD-ROMs for the video games are generally encoded using a high-performance compressive decoding technique such as MPEG2. The video game machine is provided with an MPEG2 decoder, by which the video data can be reproduced.

On the other hand, movie DVDs also contain video data encoded by such high-performance compressive techniques such as MPEG2. Thus, the video game machine proposed by the present inventors can reproduce video scenes not only of video games but also of movies with the aid of the MPGE2 decoder.

Such a video game machine proposed by the present inventors has already been distributed widely as an entertainment device in expectation of its versatility for the future. In particular, it can play not only video games but also other digital content such as music CDs and DVDs, and can also send/receive digital content through a communication network such as the internet.

However, the conventional entertainment device has been designed to play music CDs or movie DVDs while being controlled by a controller connected through a cable to the main unit of such entertainment device.

Such a controller has provided thereon a "○" button with an embossed ○ marking, a "x" button with an embossed x marking, a "△" button with an embossed △ marking and a "□" button with an embossed □ marking for playing the game. In the reproduction of movie DVDs, the individual buttons are assigned with functions, for example, of menu selection, selection cancel/reproduction stop, menu display and title display, respectively, so that the user could use such buttons to control the reproduction operation on the main unit of the entertainment device. Such conventional entertainment device has been suffering from the problems discussed below.

The controller is connected with the main unit of the entertainment device typically through a cable approx. 2.5 m long. Such a length of cable was defined so as to allow the user to enjoy the video game while being properly distant from a monitor device, which is usually placed close to the entertainment device, and to be able to easily put the cable back without problem.

While such length of cable is convenient for enjoying the video game, a problem resides in that the controller is placed far from the user enjoying movie DVDs on the entertainment device. This is because movies are usually enjoyed from a distance that is further than the length of such cable, which, therefore, makes it difficult to operate the main unit of such entertainment device while viewing a movie DVD.

While the problem seems to be overcome by using a cable as long as 3 or 4 m, such a longer cable will be inconvenient to put away and will make the user feel annoyed during the play of the video game.

In these days, reproducing devices such as video tape recorders and CD players are widely popularized, most of them being operable by remote controllers, and every remote controller has similar key arrangement. Thus, most users are familiar with the key arrangement of the remote controllers.

However, the key arrangement of the remote controllers is entirely different from that of the controller of the entertainment device designed for video games. Thus, for the case that the DVD, for example, is played using the controller of the entertainment device, the user should encounter difficulty in operating the entertainment device since the user has to unwillingly struggle with key operation using the keys having an entirely different arrangement from that of the remote controller.

SUMMARY OF THE INVENTION

The present invention is completed to overcome the foregoing problems and an object thereof is to provide a remote-control signal receiver allowing the user to reproduce, for example, DVDs with a sense of handling a remote controller; an information processing method for a remote-control signal; a storage medium having recorded therein an information processing program for a remote-control signal; an information processing program; and a remote-control device.

In the present invention, a main unit of an entertainment device is provided with a receiving unit to which operational commands are sent in a wireless manner via a remote control unit. The main unit of the entertainment device will execute an action corresponding to the operational command received by the receiving unit. This allows the user to operate the main unit of the entertainment device, or external devices connected to such main unit, with a sense of using a remote controller.

Other and further objects and features of the present invention will become obvious upon understanding of the illustrative embodiment about to be described in connection with the accompanying drawings or will be indicated in the appended claims, and various advantages not referred to herein will occur to one skilled in the art upon employment of the invention in practice.

BRIEF DESCRIPTION OF THE DRAWINGS

FIG. 1 is a perspective view showing an appearance of an entertainment device of an embodiment of the present invention;

FIG. 2 is a front elevation view, partially broken away, showing a photo-receiving unit;

FIG. 3 is a sectional view of the photo-receiving unit;

FIG. 4 is a rear elevation view, partially broken away, showing the photo-receiving unit;

FIG. 5 is a front elevation view of a full-type remote controller for effecting reproduction of DVDs loaded on the entertainment device of the embodiment;

FIG. 6 is a front elevation view of a controller-type remote controller for effecting reproduction of DVDs loaded on the entertainment device of the embodiment;

FIG. 7 is a block diagram showing the entertainment device of the embodiment;

FIG. 8 is a time arrow chart showing a flow of command send/receive operations and signal processing between the remote controller and a photo-receiving unit during the controller emulation mode;

FIG. 9 is a time arrow chart showing a flow of command send/receive operations and signal processing between the photo-receiving unit and the main unit of the entertainment device during the controller emulation mode;

FIG. 10 is a time arrow chart showing a flow of command send/receive operations and signal processing between the remote controller and a photo-receiving unit during the SIRCS mode;

FIG. 11 is a time arrow chart showing a flow of command send/receive operations and signal processing between the photo-receiving unit and the main unit of the entertainment device during the SIRCS mode;

FIG. 12 is a functional block diagram corresponding to a command corrective operation performed by a microcomputer in the photo-receiving unit when the command from the remote controller is received;

FIGS. 13A to 13D are time charts explaining the command corrective operation performed by the microcomputer in the photo-receiving unit when the command from the remote controller is received;

FIG. 14 is a schematic diagram for explaining the command corrective operation performed by the microcomputer in the photo-receiving unit when the command from the remote controller is received;

FIG. 15 is a time arrow chart showing a flow of command send/receive operations and signal processing between the remote controller and the photo-receiving unit during a first analytical mode;

FIG. 16 is a time arrow chart showing a flow of command send/receive operations and signal processing between the photo-receiving unit and the main unit of the entertainment device during the first analytical mode;

FIG. 17 is a time arrow chart showing a flow of command send/receive operations and signal processing between the remote controller and the photo-receiving unit during a second analytical mode;

FIGS. 18A to 18C are timing charts explaining command culling (compression) during a second analytical mode; and FIG. 19 is a time arrow chart showing a flow of command send/receive operations and signal processing between the photo-receiving unit and the main unit of the entertainment device during the second analytical mode.

DETAILED DESCRIPTION

The present invention is successfully applicable to an entertainment device having a game execution function for executing video games based on game programs stored in optical disks such as CD-ROMs and DVD-ROMs, and a video reproduction function for reproducing video information such as movies stored in such optical disks.

Appearance of an Entertainment Device of the Embodiment

A perspective view of an appearance of an entertainment device according to the present embodiment is shown in FIG. 1. As is known from the figure, the entertainment device of the embodiment comprises a main unit 1 responsible for execution of video games and reproduction of movies, a controller 20 connected to the main unit 1, a photo-receiving unit 30 connected to the main unit 1, and a remote controller 40 for sending commands for video reproduction in a form of an infrared signal (or maybe an RF signal) to the photo-receiving unit 30.

Constitution of the Main Unit 1

The main unit 1 has two USB (Universal Serial Bus) connection terminals 2A and 2B, a tray-type disk loading section 3 on which an optical disk such as CD-ROM or DVD-ROM (having recorded therein application programs of video games or multimedia data such as movies) is loaded, a reset button 4 for resetting the game, a IEEE 1394 connection terminal 5 capable of supporting a maximum data transmission speed of 400 Mbps, a tray operation button 6 for loading and unloading of the tray to or from the optical disk loading section 3, controller plug-in portions 7A and 7B, and memory card insertion portions 8A and 8B.

While not shown in the figure, the main unit 1 also has on the rear plane thereof a power switch and AV terminals used for connecting such main unit 1 to a monitor device and an audio device.

The controller plug-in portions 7A and 7B allow two controllers 20 to be connected to the main unit 1, to thereby allow two users to enjoy various games. In the entertainment device of the embodiment, the photo-receiving unit 30 for optically receiving various commands from the remote controller 40 is connected to either of the controller plug-in portions 7A and 7B, which will be detailed later.

The memory card insertion portions 8A and 8B are designed to allow connection thereto of, for example, memory cards for saving and reading game data, and DVD driver memory cards having stored therein driver programs for reproducing DVDs.

Constitution of the Controller

The controller 20 is connected to either of the controller plug-in portions 7A and 7B of the main unit 1 through a cable 10 of a predetermined length and a connector 11. The controller 20 has two grip ends 20R, 20L so as to allow a player to grip such grip ends 20R, 20L with the right and left hands, respectively, to thereby hold the controller 20.

The controller 20 also has first and second operational portions 21, 22 and analog operational portions 23R, 23L at positions operable by, for example, the individual thumbs while holding the grip ends 20R, 20L with the right and left hands, respectively.

The first operational portion 21 is responsible typically for instructing an advancing direction of the game character, which comprises an upward prompt button 21a for prompting upward direction, a downward prompt button 21b for prompting downward direction, a rightward prompt button 21c for prompting rightward direction, and a leftward prompt button 21d for prompting leftward direction.

The controller 20 can provide instructions not only into upward, downward, rightward and leftward directions but also into oblique directions. For example, pressing the upward prompt button 21a and rightward prompt button 21c at the same time will prompt moving toward upper right direction. Similarly, pressing the downward prompt button 21b and leftward prompt button 21d at the same time will prompt moving toward the lower left direction.

The second operational portion 22 comprises a "Δ" button 22a having a "Δ" marking, which is responsible typically for prompting for a menu display, a "x" button 22b having a "x" marking, which is responsible for prompting for a canceling of a selected item, a "○" button 22c having a "○" marking; which is responsible typically for prompting for a confirmation of a selected item, and a "□" button 22d having a "□" marking, which is responsible typically for prompting for a display/hiding of an index or so.

The analog operational portions 23R, 23L are designed to be kept upright (a not-inclined state, or in a referential position) when they are not inclined for operation. In contrast in the inclined operation, such analog operational portions 23R, 23L are designed to allow precession, which is a rotational motion inclined at a predetermined angle. When the analog operational portions 23R, 23L are inclined for operation while being pressed down, the controller 20 detects a coordinate value on an X-Y coordinate based on the amount and direction of inclination from the referential position, and supplies such coordinate value as an operational output via the controller plug-in portion 7A or 7B to the main unit 1.

The controller 20 is also provided with a start button 24 for prompting the game start, a selection button 25 for selecting predetermined subjects, and a mode selection switch 26 for toggling an analog mode and a digital mode. When the analog mode is selected with the mode selection switch 26, a light emitting diode 27 (LED) is controlled to turn on, and the analog operational portions 23R, 23L are activated. When the digital mode is selected, a light emitting diode 27 (LED) is controlled to turn off, and the analog operational portions 23R, 23L are deactivated.

The controller 20 is also provided with a right button 28 and a left button 29 at positions operable by, for example, the individual second fingers (or third fingers) while holding the grip ends 20R, 20L with the right and left hands, respectively. The individual buttons 28, 29 comprise first and second right buttons 28R1, 28R2 and first and second left buttons 29L1, 29L2, respectively, aligned side by side in the direction of the thickness of the controller 20.

When a movie stored in a DVD is reproduced, such individual buttons on the controller 20 are assigned with functions corresponding to the reproduction operations, in which in the second operational portion 22, the Δ button 22a becomes available as a button for prompting-display of a DVD menu, the x button 22b for prompting for the canceling of a selected menu and for stoping the reproduction, the ○ button 22c for prompting for a confirmation of a selected menu, and the □ button 22d for prompting for the display of the title.

Also, the start button 24 becomes available as a button for prompting for the reproduction or pause of movies, the select button 25 for prompting for the display of the operational panel, the first right button 28R1 of the right button 28 for prompting for the display of the next chapter, the second right button 28R2 for prompting for a search by fast reversing, the first left button 29L1 of the left button 29 for prompting for the display of the previous chapter, and the second left button 29L2 for prompting for a search by fast forwarding.

The analog operational portion 23R becomes available as a button for prompting for a sound exchange among stereo, analog and surround, and the analog operational portion 23L for prompting selection of a superimposed caption in a native language, such as Japanese and other foreign languages such as English.

As has been described in the above, while the entertainment device of the embodiment is thus available of course for reproduction of movies and so forth stored for example in DVDs through operating the controller 20, use of the photo-receiving unit 30 and the remote controller 40, which will be described later, further enables remote control of such reproduction.

Appearance of the Photo-Receiving Unit

A front elevation, sectional and rear elevation views of the photo-receiving unit 30 partially broken away are shown in FIGS. 2, 3 and 4, respectively. As is clear from these figures, the photo-receiving unit 30 comprises a main unit 31 in the form of an enclosure, a board 32 housed in the main unit 31 and a plug-in terminal board 33 connected to such board 32 and having a portion thereof so as to protrude outwardly from the main unit 31.

The board 32 is provided with a microcomputer 34 for controlling the send/receive operation of the photo-receiving unit 30, an oscillator 35 for generating a reference clock for the operation, a photo-receiving element 36 (photo-receiving portion) for receiving commands from the remote controller 40, a regulator 37 for generating a predetermined power source voltage, a reset IC 38 (see FIG. 4 in particular), and a buffer memory 39 for temporally storing data sent from the remote controller 40 and also for sending such stored data to the main unit 1 according to a read-out timing of a system clock in the main unit 1.

The board 32 is also provided with a terminal 33a as shown in FIG. 3, with which the photo-receiving unit 30 can be plugged into the main unit 1.

It is now also allowable to provide the photo-receiving unit 30 with light emitting means such as light emitting diodes (LEDs) and allows them to turn on, or flash, when commands from the remote controller 40 are received.

While the following description will deal with an exemplary case in which the photo-receiving unit 30 is attached to the controller plug-in portion 7A or 7B, it should also be noted that the photo-receiving unit 30 may also be plugged into the memory card insertion portion 8A or 8B, the USB connection terminals 2A or 2B, or the IEEE 1394 connection terminal 5.

While the following description will deal with an exemplary case in which the photo-receiving unit 30 is externally attached to the main unit 1, it should also be noted that the photo-receiving unit 30 may previously be incorporated into the main unit 1.

Appearance of the Remote Controller

Outer appearances of the remote controllers 40 are shown in FIGS. 5 and 6, where that shown in FIG. 5 is of "full-type" comprising a DVD operational portion 41 provided with various buttons for effecting reproduction of DVDs and a game controller portion 42 provided with various buttons for playing the game; and that shown in FIG. 6 is of "controller-type" having only the game controller portion 42.

In the DVD operational portion 41 of the "full-type" remote controller 40 shown in FIG. 5, there are provided an audio button 51 for switching DVD sounds, a program button 52 for effecting programmed reproduction, an angle button 53 for changing an angle of displayed images, a repeat button 54 for effecting repetitive reproduction, a sub-title button 55 for switching superimposed captions of DVD contents, a clear button 56 for canceling a selected numeral, a slow button 57 for effecting slow-motion reproduction while viewing the image, a scan button 58 for searching a desired scene while viewing the image, a preview/next button 59 for returning to the previous scene or advancing to the next scene, and a play button 60 for effecting reproduction.

The DVD operational portion 41 is also provided with a title button 61 for displaying a title menu, a display button 62 for displaying a control menu screen, a shuffle button 63 for effecting shuffled reproduction, numeral buttons 64 for selecting items displayed on the screen, a time button 65 for displaying reproduction time on the screen, an A-B button 66 for repeating only desired scenes, a pause button 67 for prompting temporary stop of the reproduction, a stop button 68 for stopping the reproduction, a DVD menu button 69 for displaying a DVD menu, and a return button 70 for returning to the last selected scene.

An enter button 71 for confirming items displayed on the screen is provided on the side of the game controller portion 42.

The game controller portion 42 is provided with the same buttons as those for the foregoing controller 20. As such, the individual buttons of the game controller portion 42 shown in FIG. 5 will have the same reference numerals as the individual buttons on the controller 20 for the convenience of understanding.

More specifically, the game controller portion 42 has provided thereon an upward prompt button 21a for prompting upward direction, a downward prompt button 21b for prompting downward direction, a rightward prompt button 21c for prompting rightward direction, and a leftward prompt button 21d for prompting leftward direction, all of which are placed in a circular arrangement.

The game controller portion 42 also has provided thereon a "Δ" button 22a responsible typically for prompting for a menu display, a "x" button 22b responsible typically for prompting for the canceling of a selected item, a "○" button 22c responsible typically for prompting for the confirmation of a selected item, and a "□" button 22d responsible typically for prompting for a display/hiding of an index or so, analog operational portions 23R, 23L, a start button 24 for prompting for the game start, a selection button 25 for selecting predetermined subjects, a mode selection switch 26 for toggling between an analog mode and a digital mode, first and second right buttons 28R1, 28R2, and first and second left buttons 29L1, 29L2.

The user can reproduce DVDs on the main unit 1 by operating the individual buttons 51 to 71 on the DVD operational portion 41, and can enjoy games by operating the individual buttons on the game controller portion 42.

In a similar fashion to the foregoing game controller portion 42 of the "full-type" remote controller 40, the "controller-type" remote controller 40 shown in FIG. 6 also has provided thereon an upward prompt button 21a for prompting upward direction, a downward prompt button 21b for prompting downward direction, a rightward prompt button 21c for prompting rightward direction, and a leftward prompt button 21d for prompting leftward direction, all of which are placed in a circular arrangement.

The game controller portion 42 also has provided thereon a "Δ" button 22a responsible typically for prompting for a menu display, a "x" button 22b responsible typically for prompting for the canceling of a selected item, a "○" button 22c responsible typically for prompting for the confirmation of a selected item, and a "□" button 22d responsible typically for prompting display/hiding of an index or so, analog operational portions 23R, 23L, a start button 24 for prompting for the game start, a selection button 25 for selecting predetermined subjects, a mode selection switch 26 for toggling between an analog mode and a digital mode, first and second right buttons 28R1, 28R2, and first and second left buttons 29L1, 29L2.

When a movie stored in a DVD is reproduced, such individual buttons on the controller-type remote controller 40 are typically assigned with functions, in which, in the second operational portion 22, the Δ button 22a becomes available as a button for prompting for the display of the DVD menu, the xbutton 22b for prompting for the canceling of a selected menu or for stopping the reproduction, the ○ button 22c for prompting for a confirmation of a selected menu, and the □ button 22d for prompting for the display of the title.

Also the start button 24 becomes available as a button for prompting for the playing, or pausing, movies, the selection button 25 for prompting for the display of the operational panel, the first right button 28R1 of the right button 28 for prompting for the display of the next chapter, the second right button 28R2 for prompting for a search by fast reversing, the first left button 29L1 of the left button 29 for prompting for the display of the previous chapter, and the second left button 29L2 for prompting for a search by fast forwarding.

The analog operational portion 23R becomes available as a button responsible for prompting for the sound exchange among stereo, analog and surround, and the analog operational portion 23L for prompting for a selection of a superimposed caption in a native language such as Japanese and other foreign languages such as English.

Electrical Constitution of the Main Unit

FIG. 7 is a block diagram showing an overall electrical constitution of the main unit 1. As is clear from the figure, the main unit 1 comprises a CPU 100, a graphic processor (GPU) 110, an I/O processor (IOP) 120, an optical disk control section 130 for controlling the reproduction of CD-ROM, DVD-ROM and so forth, a sound reproduction processor (SPU) 140, a MASK-ROM having stored therein operating system programs to be executed by the CPU 100 and IOP 120, and a RAM 160 for acting as a buffer for temporarily storing data read out from a work area of the CPU 100 or an optical disk.

The main unit 1 is also provided with a CD/DVD DSP 170 for reproducing the output of CDs or DVDs supplied through an RF amplifier 131 of the optical disk control section 130 after subjecting such output to the output error correction (CIRC processing); a driver 180 and a mechanical controller 190, both of which responsible for rotation control of a spindle motor of the optical disk control section 130, focus/tracking control of an optical pick-up and loading control of a disk tray; and a card-type connector 200 for allowing connection of a communication card or an external hard disk drive or the like.

These components are illustratively connected with each other mainly through bus lines 202 and 203.

The CPU 100 is responsible for controlling the entire portion of the main unit 1 by executing the operating system program stored in the MASK-ROM 150.

The MASK-ROM 150 also has stored therein various device IDs for the controller plug-in portions 7A and 7B, memory card insertion portions 8A and 8B, controller 20 to be connected to the card-type connector 200, photo-receiving unit 30, remote controller 40 and memory card 75. While described later, the IOP 120 communicates with various devices such as the controller 20, photo-receiving unit 30 and remote controller 40 based on the device IDs stored in the MASK-ROM 150, to thereby identify the devices connected to the USB connection terminals 2A and 2B, IEEE 1394 terminal 5, controller plug-in portions 7A and 7B, memory card insertion portions 8A and 8B and card-type connector 200.

The IOP 120 controls signal input/output to, or from, the controller 20; data input/output to, or from, the memory card 75 storing the game settings or so; and input/output of operational commands of the remote controller 40 received by the photo-receiving unit 30.

The GPU 110 performs drawing as being instructed by the CPU 100, and stores the drawn image into a frame buffer (not shown). The GPU 110 also functions as a geometric transfer engine responsible for coordinate transformation or so.

More specifically, for the case that an application program of a game stored in an optical disk uses three-dimensional graphics, the GPU 110 functions as a geometric transfer engine and first composes a virtual three-dimensional object based on a set of triangular polygons. The GPU 110 then performs various calculations for generating an image obtainable by photographing such three-dimensional object with a virtual camera, which is typically a perspective transformation for rendering (calculation of coordinate values of apexes of the individual polygons composing the three-dimensional object projected onto a virtual camera screen).

The GPU 110 then produces, as being instructed by the CPU 100, an image by performing the rendering of the three-dimensional object in the frame buffer using the geometric transfer engine as required, and outputs video signals (visual out) corresponding to the produced image.

The SPU 140 has an ADPCM decoding function for reproducing sound data previously subjected to adaptive predictive coding, a reproduction function for reproducing and outputting audio signals such as effective sounds by reproducing waveform data stored in the sound buffer, and a modulation function for modulating and reproducing waveform data stored in the sound buffer.

As a result of being provided with such functions, the SPU 140 is thus available as a so-called sampling sound source for generating (under instruction by the CPU 100) audio signals such as music sound and effective sound based on waveform data stored in the sound buffer.

When such main unit 1 is powered on, the CPU 100 and IOP 120 individually read out from the MASK-ROM 150 the operating system programs on which they operate. This allows the CPU 100 to totally control the individual portions of the main unit 1, and allows the IOP 120 to control the input/output of signals among the controller 20, memory card 75 and photo-receiving unit 30.

The CPU 100 performs initialization (such as operational confirmation based on the operating system program) and then controls the optical disk control section 130 to execute application programs of video games or the like stored in the optical disk, or reproduce movies or the like stored in the optical disk.

When the video game program is executed, the CPU 100 controls the GPU 110 and SPU 140 according to instructions of the user received through the IOP 120 from the controller 20 or remote controller 40, to thereby control display of game scenes and generation of effective or musical sound.

The same will apply to reproduction of movies, in which the CPU 100 controls the GPU 110 and SPU 140 according to instructions (commands) of the user received through the IOP 120 from the controller 20 or remote controller 40, to thereby control display of movie scenes and generation of effective or musical sound reproduced from the optical disk.

Operation in the Embodiment

DVD Drive

Reproduction of a DVD on the entertainment device of the present embodiment requires a DVD software driver. The DVD driver is stored in movie disks or music disks together with movie information or music information. Once a DVD movie or the like is loaded by the user on the main unit 1, the IOP 120 reads out such DVD driver stored in the DVD, and stores the DVD driver into the RAM card 160 (memory card 75 also allowable) shown in FIG. 7. In the reproduction mode of the DVD, the IOP 120 controls the reproduction of the DVD based on stored DVD driver (in RAM 160 or memory card 75).

Since the DVD driver may be susceptible to change as a result of future modification of the related standards, the storage of the DVD driver along with movie information or music information on the DVD provides a flexible mechanism to ensure the user is always using the latest DVD driver.

It should also be noted that the DVD driver may be provided to the user in a storage medium such as a CD-ROM or memory card 75.

It is also still possible that the DVD driver may be stored in a DVD player ROM 201, which typically comprises a semiconductor memory, and is previously provided within the main unit 1 as shown by the dashed line block in FIG. 7.

Providing the DVD driver in CD-ROMs or memory cards 75 is disadvantageous in terms of costs of the storage media, whereas providing it in semiconductor memories or the like, previously within the main unit 1, will reduce the cost required for the storage media for distributing the DVD driver.

Connection Portions for the Photo-Receiving Unit

With such entertainment device of the present embodiment, the user can reproduce DVDs through remote control of the main unit 1 using the photo-receiving unit 30 and remote controller 40.

In this case, the user first plugs the photo-receiving unit 30 into the controller plug-in portion 7A or 7B of the main unit 1.

While the photo-receiving unit 30 may be plugged into other interfaces (such as the USB connection terminals 2A and 2B, IEEE 1394 terminal 5 or memory card insertion portions 8A or 8B) using controller plug-in portion 7A or 7B ensures direct connection of the photo-receiving unit 30 to a game control line within the main unit 1.

When a game operation is conducted through the remote controller 40, game operational commands received by the photo-receiving unit 30 can directly be incorporated into the main unit 1 without being routed through any specific lines or circuits. This is advantageous in reducing the cost of the entertainment device since it is not necessary to provide such specific lines or circuits.

Device ID

The interfaces of the main unit 1 of the entertainment device are available for connection with various devices such as the foregoing controller 20, photo-receiving unit 30 and memory card 75. It is necessary for the main unit 1 to identify the devices connected thereto in order to ensure the operation of such main unit 1 corresponds to the individual devices.

Thus, the individual devices are assigned with unique device IDs by types thereof. All of such individual device IDs are stored in the MASK-ROM 150 in the main unit 1. When the main unit 1 is powered on, the IOP 120 reads out the device IDs stored in the MASK-ROM 150, and communicates with the individual devices connected to the individual interfaces, to thereby identify and recognize the devices connected to the individual interfaces.

More specifically, when the main power source is turned on, the IOP 120 reads out the device IDs stored in the MASK-ROM 150, and sends the device IDs serially to each device connected to the individual interfaces.

Each device compares the device IDs sent from the IOP 120 with the assigned device ID, and, upon agreement of both, returns agreement data, which indicates the agreement of the IDs.

The return of the agreement data from the device means that the device ID is the ID for the device connected to the main unit 1. Thus the IOP 120 specifies and recognizes the device connected to the individual interfaces based on the returned agreement data.

Similarly, when the photo-receiving unit 30 is connected to the main unit 1, the microcomputer 34 returns to the CPU 100 a device ID assigned to such photo-receiving unit 30 in response to a query from the CPU 100. This allows the main unit 1 to recognize the connection of the photo-receiving unit 30.

Device ID Stored in Storage Medium

While the device IDs of the individual devices are previously stored in the MASK-ROM 150 in the main unit 1, it is a common experience that various new devices are developed after the marketing of such devices. Indeed, some new devices are not even developed before the launch of the entertainment device, so that it is quite natural that the device IDs of these new devices cannot be stored in the MASK-ROM 150.

Thus in the entertainment device of the present embodiment, the device IDs of the new devices are stored in a storage medium such as CD-ROM, DVD-ROM and memory card 75 of new video games, movies and music.

More specifically referring to the present embodiment, the photo-receiving unit 30 and remote controller 40 correspond to such new devices. The CPU 100 of the main unit 1 thus, upon reproducing a DVD, recognizes such new devices after obtaining the device IDs of the photo-receiving unit 30 and remote controller 40. This allows the entertainment system to adapt to various new devices that are developed and launched in the future.

Wireless Communication Operation

The entertainment device of the present embodiment can principally operate in the four following modes:

1. "controller emulation mode" in which the video game is operated using the remote controller 40;
2. "DVD operation mode" in which movies (for example stored in a DVD-ROM or the like) are reproduced using the remote controller 40;
3. "first analytical mode" in which commands received from a remote controller other than the remote controller 40 are directly incorporated without compression; and
4. "second analytical mode" in which commands received from a remote controller other than the remote controller 40 are incorporated after being compressed.

The entertainment device operates in "controller emulation mode" and "DVD operation mode", for a video game and for reproducing video information such as movies and music, respectively.

In contrast, the "first analytical mode" and "second analytical mode" are selected randomly by a player and the entertainment device operates in accordance with the selected mode.

Here, the "first analytical mode" or "second analytical mode" can be designed so as to be selected automatically by the entertainment device depending on the data length of the received command.

Controller Emulation Mode

After determining that an optical disc is a DVD for a video game, the entertainment device operates in "controller emulation mode". In "controller emulation mode", the entertainment device incorporates the command recorded in the buffer memory 39 of the photo-receiving unit 30 as the command corresponding to the operation made on the individual button in the game controller portion 42 of the remote controller 40.

FIG. 8 is a time arrow chart showing a flow of command send/receive operations and signal processing between the remote controller 40 and a photo-receiving unit 30 during the controller emulation mode.

As shown in FIG. 8, when the game operation on the main unit 1 is effected through the remote controller 40, the user operates the game controller portion 42, and a command corresponded to such operation is sent to the photo-receiving unit 30 based on an arbitrary timing.

In such exemplary case, the sending of the command from the remote controller 40 to the photo-receiving unit 30 is effected typically according to the SIRCS (Standard Code for Infrared Remote Control System) format using an infrared signal (other photo signals or RF signals are also allowable).

The standards of the SIRCS format cover different bit lengths of the infrared signal, which are exemplified as 12 bits, 15 bits and 20 bits. The photo-receiving unit 30 supports reception of infrared signals having any of these bit lengths.

Specifically, when an infrared signal of 20-bit length is sent from the remote controller 40 to the photo-receiving unit 30, the first 13 bits are sent as a category code (a device ID of the device sending the infrared signal), and the successive 7 bits as a button code (a code assigned to each button in the game controller portion 42).

The microcomputer 34 of the photo-receiving unit 30 generates pulse information by real-time waveform shaping, and digitizes the pulse information by sampling it according to a sampling clock of a predetermined frequency. The microcomputer 34 then converts the digitized SIRCS signals into digital controller signals having the same signal form with the command signal from the controller 20 in the line connection, and temporarily stores such digital controller signals into the buffer memory 39 (see FIG. 2) provided within the photo-receiving unit 30.

Incorporation of Digital Controller Signals

FIG. 9 is a time arrow chart showing a flow of digital controller signals stored in the buffer memory 39 into the main unit 1.

In the entertainment device of the present embodiment, the IOP 120 of the main unit 1 is typically designed so as to issue a communication request to the microcomputer 34 of the photo-receiving unit 30 at a regular interval such as once for every vertical synchronization period ($V_{sync}$).

Step S1 shown in FIG. 9 indicates the communication request directed from the IOP 120 to the microcomputer 34 of the photo-receiving unit 30. Upon reception of such communication request, the microcomputer 34 of the photo-receiving unit 30 starts preparation for the succeeding communication with the IOP 120.

Next in step S2, the IOP 120 serially sends to the microcomputer 34 of the photo-receiving unit 30 the individual device IDs for the devices such as the photo-receiving unit 30 and remote controller 40, the device IDs are read out from the MASK-ROM 150 or a storage medium such as DVD and memory card 75.

The microcomputer 34 of the photo-receiving unit 30 serially compares the received device IDs with the device ID of the remote controller 40, and, upon agreement of the IDs, returns to the IOP 120, in step S3, a device ID of the photo-receiving unit 30.

After the device ID of the photo-receiving unit 30 is returned, the IOP 120 compares this returned device ID with a device ID of the photo-receiving unit 30 read out from a storage medium such as the MASK-ROM 150, DVD or memory card 75. If there is agreement, IOP 120 then sends, in step S4, to the microcomputer 34 of the photo-receiving unit 30 an acknowledge data (ACK).

Upon reception of the acknowledge data (ACK), the microcomputer 34 of the photo-receiving unit 30 then sends, in step S5, to the IOP 120 a digital controller signal stored in the buffer memory 39 (which is herein button data, and more specifically button data #0, corresponding to the button operation made on the game controller portion 42 of the remote controller 40). Upon reception of such button data, the IOP 120 incorporates such data into the main unit 1 as an operational signal for the first operational portion 21 or the second operational portion 22 of the controller 20 previously explained with reference to FIG. 1.

The IOP 120 monitors whether a predetermined period, such as a single vertical synchronization period ($V_{sync}=\frac{1}{60}$ sec), has elapsed since the communication request was issued in step S1, and sends in step S6 dummy data to the microcomputer 34 of the photo-receiving unit 30 if the predetermined period has not elapsed.

Upon reception of such dummy data, the microcomputer 34 of the photo-receiving unit 30 sends in step S7 the digital controller signal stored next to the button data #0 in the buffer memory 39 (button data #1 in this case) to the IOP 120. Upon reception of such button data, the IOP 120 incorporates such data as an operational signal of the first operational portion 21 or the second operational portion 22 of the controller 20 as described above. Based on such button data incorporated into the main unit 1, the CPU 100 controls, for example, the display of the video game characters.

It should be noted that while the microcomputer 34 of the photo-receiving unit 30 was described as sending the digital controller signal stored in the buffer memory 39 to the main unit 1 after being triggered by the dummy data sent from the IOP 120, this is only one example of the communication protocol.

Such send/receive operations continue until a predetermined time period elapses, which is typically a single vertical synchronization period ($V_{sync}$). When the IOP 120 detects that the certain time period has elapsed, the IOP 120 then in step S8 supplies a communication line close request signal to the microcomputer 34 of the photo-receiving unit 30. Upon reception of the communication line close request signal, the microcomputer 34 of the photo-receiving unit 30 closes its communication line with the IOP 120. This completes one communication process between the microcomputer 34 of the photo-receiving unit 30 and the IOP 120 of the main unit 1.

As described in the above, the entertainment device of the present embodiment operates in "controller emulation mode" after determining that the optical disk is the DVD for a video game. In addition, at a regular interval (such as once for every vertical synchronization period ($V_{sync}$)) the command of the remote controller 40 (which is recorded in the buffer memory 39) is incorporated as the button data of the game controller portion 42. Then CPU 100 controls the display of, for example, video game characters based on such incorporated button data. This allows the user to perform remote control of video games or the like executed on the main unit 1 by operating the game controller portion 42 of the remote controller 40.

DVD Operational Mode

When the optical disc is a DVD-ROM for reproducing video information such as movies and music, the entertainment device operates in "DVD operational mode". In "DVD operational mode", the entertainment device incorporates the command recorded in the buffer memory 39 of the photo-receiving unit 30 as the command corresponding to the operation made on the individual button in the DVD operational portion 41 of the remote controller 40.

FIG. 10 is a time arrow chart showing a flow of command send/receive operations and signal processing between the remote controller 40 and the photo-receiving unit 30 during the "DVD operational mode".

As shown in FIG. 10, when movies or the like that are stored in a DVD-ROM loaded on the main unit 1 are reproduced by operating the remote controller 40, the DVD operational portion 41 is operated by the user, and a command corresponded to such operation is sent to the photo-receiving unit 30 based on an arbitrary timing.

The command (SIRCS signal) from the remote controller 40 is received by the photo-receiving unit 30. In response to such infrared signal (SIRCS signal), the microcomputer 34 of the photo-receiving unit 30 generates pulse information by real-time waveform shaping, and digitizes the pulse information by sampling it according to a sampling clock of a predetermined frequency. The microcomputer 34 then temporarily stores such digitized SIRCS signal into the buffer memory 39.

Incorporation of DVD Operation Signals

FIG. 11 is a time arrow chart showing incorporation of DVD operation signals stored in the buffer memory 39 into main unit 1.

Step S11 in FIG. 11 shows that a communication request is directed from the IOP 120 to the microcomputer 34 of the photo-receiving unit 30 at a regular interval such as once for every vertical synchronization period ($V_{sync}$). Upon reception of such communication request, the microcomputer 34 of the photo-receiving unit 30 starts preparation for the succeeding communication with the IOP 120.

Next in step S12, the IOP 120 serially sends to the microcomputer 34 of the photo-receiving unit 30 the individual device IDs for the devices such as the photo-receiving unit 30 and remote controller 40. These device IDs are read out from the MASK-ROM 150 or a storage medium such as DVD and memory card 75.

The microcomputer 34 of the photo-receiving unit 30 serially compares such serially sent device IDs with a device ID of the photo-receiving unit 30, and, if there is agreement, returns to the IOP 120, in step S13, a device ID of the photo-receiving unit 30.

After the device ID of the photo-receiving unit 30 is returned, the IOP 120 compares such returned device ID with a device ID of the photo-receiving unit 30 read out from a storage medium such as the MASK-ROM 150, DVD or memory card 75, and, if there is agreement, sends, in step S14, to the microcomputer 34 of the photo-receiving unit 30 an acknowledge data (ACK).

Upon reception of the acknowledge data (ACK), the microcomputer 34 of the photo-receiving unit 30 then detects, in step S15, a bit length of the DVD operational signal stored in the buffer memory 39, and then sends to the IOP 120 a data for expressing such bit length.

Upon reception of such data expressing the bit length, the IOP 120 transfers such data to the CPU 100, and sends in step S16 predetermined dummy data to the microcomputer 34 of the photo-receiving unit 30.

The CPU 100 identifies, through receiving from the IOP 120 such data expressing the bit length, the bit length of the DVD operational signal to be incorporated into the photo-receiving unit 30. The CPU then performs practical signal processing of the DVD operational signal corresponding to such identified bit length when the DVD operational signal is actually incorporated into the main unit 1.

Upon reception of such dummy data from the IOP 120, the microcomputer 34 of the photo-receiving unit 30 sends, in step S17, a DVD operational signal stored in the buffer memory 39 (which is herein SIRCS data corresponding to the button operation on the DVD operational portion 41 of the remote controller 40, and more specifically button data #0) to the IOP 120.

In the "DVD Operational mode", the IOP 120 incorporates the SIRCS signal as a DVD operational signal, and sends it to the CPU 100.

The IOP 120 monitors for whether a predetermined period, such as a single vertical synchronization period ($V_{sync}=\frac{1}{60}$ sec), has elapsed after the point of time the communication request was issued in step S11. IIOP 120 continues incorporation of the SIRCS data (DVD operational signal) read out from the buffer memory 39 of the photo-receiving unit 30.

After the predetermined time period has elapsed, the IOP 120 then, in step S24, supplies a communication line close request signal to the microcomputer 34 of the photo-receiving unit 30. Upon reception of such communication line close request signal, the microcomputer 34 of the photo-receiving unit 30 closes its communication line with the IOP 120. This completes one communication process between the microcomputer 34 of the photo-receiving unit 30 and the IOP 120 of the main unit 1.

As described in the above, in the entertainment device of the present embodiment, when the optical disk is a DVD for video information, a command from the remote controller 40 is incorporated as a DVD operational signal. CPU 100 then controls the reproduction of the DVD based on such incorporated DVD operational signal. This allows the user to perform remote control of DVD reproduction operation executed on the main unit 1 by operating the DVD operational portion 41 of the remote controller 40.

Maintenance of Command Continuity

When the upward prompt button 21a is continuously operated in the progress of a video game, the game scene should be scrolled upward continuously and smoothly. The same will apply to DVD reproduction, and the displayed scene should also be fast forwarded or fast reversed continuously and smoothly by continuously operating the scan button 58, for example.

However when communication failure occurs between the remote controller 40 and the photo-receiving unit 30, which is typified by a case where only a part of the command is received by the photo-receiving unit 30, scrolling, fast forwarding or fast reversing is only attainable in an intermittent manner despite the continuous operation by the user.

Thus in the entertainment device of the present embodiment, a predetermined number of commands received by the photo-receiving unit 30 are compared with each other, and when several commands come into agreement, such agreed commands are continuously supplied over a predetermined time period from the buffer memory 39 to the main unit 1. This ensures identity of the commands read out from the buffer memory 39, and thereby maintain the identity of the commands, fast forwarding or fast reversing effected on the main unit side.

Now on the main unit side, the commands stored in the buffer memory 39 of the photo-receiving unit 30 are incorporated at regular intervals. The incorporation of the commands from the buffer memory 39 is effected within a period that allows the displayed image to maintain the continuity. This is typically within a vertical synchronization period (horizontal synchronization period also allowable). Thus the continuity of the displayed image is not adversely affected even if the commands are intermittently processed in the main unit 1.

More specifically in the entertainment device of the present embodiment, three identical commands (each of which is an SIRCS signal sent from the remote controller 40 to the photo-receiving unit 30) are continuously sent each time the individual buttons on the remote controller 40 are operated.

FIG. 12 is a functional block diagram of the microcomputer 34 for receiving commands from the remote controller 40 via photo receiving element 36. The microcomputer 34 is functionally composed of (1) a delay circuit 81 for delaying each received command by one data length of such command; and (2) delay circuits 82 and 83 for delaying each received command by two data lengths of such command.

The microcomputer 34 further functionally comprises an agreement detection section 84, which compares commands delayed by one command data length with commands delayed by two command data lengths. If the two or more commands agree, such commands as those expressing that the reception was successful are output from agreement detection section 84. However, if the two or more commands did not agree, a dummy command assuming the reception failed is output from agreement detection section 84.

The microcomputer 34 further functionally comprises a delay circuit 85 and delay circuits 86 and 87. These delay circuits operate on the output from agreement detection section 84. Delay circuit 85 delays by one data length the commands for expressing the successful reception, or the dummy command expressing the failed reception. Delay circuits 86 and 87 delay by two data lengths the commands for expressing the successful reception or the dummy command expressing the failed reception.

The microcomputer 34 further functionally comprises an agreement detection section 88 for comparing the commands directly supplied from the agreement detection section 84; the commands delayed by one command length by the delay circuit 81; and the commands delayed by two command data lengths by the delay circuits 82 and 83. Agreement detection section 88 outputs, if the two or more commands expressing the successful reception agree, such agreement detection output and supplies such commands for expressing the successful reception to the buffer memory 39.

The microcomputer 34 starts counting of the vertical synchronization signal ($V_{sync}$) based on when the agreement detection output is supplied from the agreement detection section 88. Microcomputer 34 controls commands output from the buffer memory 39 over typically 8 vertical synchronization periods so that identical commands are output from the buffer memory 39. However, when the agreement detection output is not supplied from the agreement detection section 88 within the 8 vertical synchronization periods, microcomputer 34 clears clearing all commands stored in the buffer memory 39.

In the constitution shown in FIG. 12, when any button on the remote controller 40 is operated, the remote controller 40 typically sends three identical commands in a continuous manner, which are received by the photo-receiving unit 30. As shown in FIG. 12, these three commands are supplied to the agreement detection section 84 directly and after being delayed by one command data length and after being delayed by two command data lengths.

The agreement detection section 84 compares the three commands which were sent (again, corresponding to a single button operation on the remote controller 40) and outputs, when two or more of such commands agree, such commands as those expressing a successful reception, but outputs, when two or more of such commands do not agree, a dummy command expressing a failed reception.

As noted above, such commands, either for expressing the successful reception or the dummy command, are also supplied to the agreement detection section 88 in three forms—directly, delayed by one command data length, and delayed by two command data lengths.

The agreement detection section 88 compares the three commands (i.e., the commands expressing the successful reception or the dummy command), and outputs, when two or more of such commands agree, such agreed commands to the buffer memory 39, and at the same time supplies an agreement detection output expressing the agreement of two or more commands to the output control section 89.

FIG. 13A shows exemplary commands supplied to the agreement detection section 88, and FIG. 13B shows timing whereby the agreement detection output is supplied from the agreement detection section 88. The individual commands A1 to A3 shown in FIG. 13A represent commands for expressing the successful reception. As shown in FIG. 13B, the agreement detection output is supplied from the agreement detection section 88 based on a timing whereby agreement is detected between the commands A1 and A2, between the commands A2 and A3, or between the commands A2 and A3.

The output control section 89 to which such agreement detection output will be supplied is also supplied with a vertical synchronization signal ($V_{sync}$) as shown in FIG. 13C through an input terminal 90 (FIG. 12). Output control section 89 starts counting of the vertical synchronization signal ($V_{sync}$) based on when the agreement detection output is supplied. As such, output control section 89 controls commands output from the buffer memory 39 over typically 8 vertical synchronization periods so that the agreement-detected commands are continuously output from the buffer memory 39 as shown in FIG. 13D. When the agreement detection output is again received within the same 8 vertical synchronization periods, the output control section 89 starts anew, e.g., re-counting of the 8 vertical synchronization periods. On the other hand, when the agreement detection output is not supplied within the 8 vertical synchronization period, the output control section 89 controls the buffer memory 39 so as to clear all commands stored therein.

In other words in such exemplary case, once the agreement of the commands is detected, a period during which such agreement-detected commands are continuously output is ensured (at least as long as 8 vertical synchronization periods). On the other hand, when the agreement detection output was not detected within such 8 vertical synchronization periods, the output control section 89 controls the buffer memory 39 so as to clear all commands stored therein.

FIG. 14 is a schematic diagram illustrating such operation. In the figure, reference character "P" represents a timing whereby the main unit 1 incorporates a command from the buffer memory 39 of the photo-receiving unit 30 for every vertical synchronization period, and reference character "R" represents a timing whereby the user operates a desired button on the remote controller 40 (button pressed status).

In this example, operation of a desired button on the remote controller 40 is repeated four times by the user. Those commands sent by the first, second and fourth button operations were successfully received by the photo-receiving unit 30 (i.e., it was detected that, of three commands sent by every button operation, two or more commands agreed). However, the command sent by the third button operation resulted in a communication failure (i.e., it was detected that, of three commands sent by every button operation, two or more commands did not agree).

Operation of such output control section 89 will be explained referring to the above example. Upon detection of agreement between the command corresponding to the first successful button operation and the command corresponding to the second successful button operation, the output control section 89 starts counting of the vertical synchronization signal, and controls the buffer memory 39 so as to continuously output such agreement-detected commands as definite commands (definite 1–2) over 8 vertical synchronization period.

The definite command (definite 1–2) is continuously output from the buffer memory 39 over 8 vertical synchronization periods as indicated as "1–2 retention period (8 V)" in FIG. 14, and if another definite command occurs within such "1–2 retention period (8 V)", the output control section 89 restarts the counting of the vertical synchronization signal at the point in time such other definite command occurred, and switches the definite commands continuously output from the buffer memory 39 to such other definite command.

In other words, in this example (recalling that agreement detection section 88 detects agreement of two of three commands) the commands sent during the second and third button operations are compared, and the commands sent during the second and fourth button operation are also compared after the definite command (definite 1–2) is generated. Of these, the command sent during the third button operation is a dummy command expressing the failed reception. Consequently, an agreement detection output is supplied from the agreement detection section 88 to the output control section 89 when the commands sent during the second and fourth button operations are compared.

The output control section 89 then controls the buffer memory 39 so as to continuously output such agreement-detected command as a definite command (definite 2–4) over 8 vertical synchronization period at the point of time that the agreement detection output for the commands sent during the second and fourth button operations was supplied.

The result is that, as shown in FIG. 14, the definite command (definite 1–2) is output from the buffer memory 39 typically over a duration of 6 vertical synchronization period from the first retention period (indicated in FIG. 14 as 1–2, 1–2, 1–2, 1–2, 1–2, 1–2), and the definite command (definite 1–2) is output from the buffer memory 39 in the seventh to eighth vertical synchronization periods in such first retention period (indicated in FIG. 14 as 2–4, 2–4, 2–4, 2–4, 2–4, 2–4, 2–4).

If 8 vertical synchronization periods elapse while any buttons on the remote controller 40 remain unoperated by the user (button released status), the output control section 89 controls the buffer memory 39 so as to clear (flush) all commands stored therein (indicated as "00" in FIG. 14).

As described in the above, when agreement of the two of three commands received by the photo-receiving unit 30 is detected, continuous output of such agreement-detected commands for a predetermined period from the buffer memory 39 can successfully compensate for an omitted command even if communication failure accidentally occurred between the remote controller 40 and the photo-receiving unit 30. Based on such continuity-ensured command, controls for scrolling, controls for fast forwarding, fast reversing and so forth executed on the main unit 1 can retain the requisite continuity.

Analytical Operation of Spatial Transmission Format of Other Remote Controllers

While the above description was made assuming that the remote controller 40 is specialized for the entertainment device of the present embodiment, such entertainment device also supports other remote controllers using spatial transmission formats other than the SIRCS format applied to the foregoing remote controller 40.

The entertainment device has a "first analytical mode" whereby all commands having any spatial transmission formats other than the SIRCS format are incorporated without selection and analyzed to be used, and a "second analytical mode" whereby the commands having any spatial transmission formats other than the SIRCS format are incorporated after being culled and analyzed to be used.

The "first analytical mode" and "second analytical mode" are selected randomly by a player and the entertainment device operates depending on the mode selected.

Here, the "first analytical mode" or "second analytical mode" can be designed so as to be selected automatically by the entertainment device depending on the data length of the received command.

First Analytical Mode

FIG. 15 is a time arrow chart showing command send/receive operations and signal processing between the other remote controller and the microcomputer 34 of the photo-receiving unit 30 during the first analytical mode.

As shown in FIG. 15, when the button on the other remote controller is operated by the user, a corresponding infrared signal is sent from the other remote controller to the photo-receiving unit 30.

The photo-receiving unit 30 generates pulse information corresponding to such received infrared signal by real-time waveform shaping of such signal. In this "first analytical mode" the photo-receiving unit 30 stores all of such pulse information in the buffer memory 39 without subjecting such pulse information to culling (compression), calculates the data length of the pulse information, and analyzes the spatial transmission format applied to the other remote controller.

More specifically, the spatial transmission format information corresponding to a plurality of other remote controllers is stored typically in a ROM of the photo-receiving unit 30. As such, the microcomputer 34 of the photo-receiving unit 30 first discriminates whether the spatial transmission format of the command received from the remote controller is the SIRCS format or not. This discrimination is typically based on header information of the received command. If the received command is not in the SIRCS format, microcomputer 34 then detects the spatial transmission format of the received command based on such plurality of spatial transmission format information stored in the ROM.

The command having the spatial transmission format of the other remote controller is converted into a command having the SIRCS format, which is supported by the main unit 1 (format conversion), and is again stored in the buffer memory 39. The command stored in the buffer memory 39 is intermittently incorporated into the main unit 1 as described below.

It should now be noted that the following explanation will illustratively deal with a case where, initially, the received command is stored in buffer memory 39 before detection of the spatial transmission format of the received command. As such, after detection of the spatial transmission format, the received command, after appropriate conversion, is again stored in buffer memory 39. However, it is also possible to detect the spatial transmission format of the received command before storage in buffer memory 39, and then to control the storage of the received command into the buffer memory 39 after subjecting the received command to the appropriate format conversion.

The following explanation will also deal with a case that the format conversion of the command sent from the other remote controller is performed by the microcomputer 34 of the photo-receiving unit 30, (however, such format conversion may also be performed by the main unit 1).

The following paragraphs will describe, referring to FIG. 16, a process flow in which the command sent from the other remote controller, after being subjected to the format conversion and stored in the buffer memory 39 of the photo-receiving unit 30, is incorporated into the main unit 1.

First, in step S31 in the time arrow chart shown in FIG. 16, a communication request is issued by the IOP 120 of the main unit 1 to the microcomputer 34 of the photo-receiving unit 30 at regular intervals such as one vertical synchronization period ($V_{sync}$). Upon reception of such communication request, microcomputer 34 of the photo-receiving unit 30 starts preparation for the succeeding communication with IOP 120.

Next in step S32, IOP 120 serially sends to microcomputer 34 of the photo-receiving unit 30 the individual device IDs for the devices such as the photo-receiving unit 30 and remote controller 40. These device IDs are read out from the MASK-ROM 150 or a storage medium such as DVD and memory card 75.

The microcomputer 34 of the photo-receiving unit 30 serially compares such serially sent device IDs with the device ID of the remote controller 40, and, if there is agreement, returns to the IOP 120, in step S33, a device ID of the photo-receiving unit 30.

Upon the returning of the device ID of the photo-receiving unit 30, IOP 120 then compares the returned device ID with the device ID of the photo-receiving unit 30 read out from a storage medium such as MASK-ROM 150, DVD or memory card 75, and if there is agreement, sends in step S34 an acknowledge data (ACK) to the microcomputer 34.

Upon reception of the acknowledge data (ACK), the microcomputer 34 detects in step S35 the bit length of the command sent from the other remote controller stored in the buffer memory 39, and then sends a data expressing such bit length to IOP 120.

Upon reception of the data expressing the bit length, the IOP 120 sends in step S36 a predetermined dummy data to microcomputer 34.

The CPU 100 recognizes the bit length of the command from the other controller to be incorporated during future communication with the photo-receiving unit 30 by receiving from the IOP 120 such data expressing the bit length, and, thereafter, controls the main unit 1, or the peripheral devices connected thereto, when the format-converted command from the other remote controller is actually incorporated into the main unit 1.

In such communication protocol, the microcomputer 34 of the photo-receiving unit 30 sends the command stored in the buffer memory 39 as being triggered by the dummy data sent from the IOP 120, which should be noted as merely one example.

Upon reception of such dummy data from IOP 120, the microcomputer 34 of the photo-receiving unit 30 then in step S37 sends the command from the other remote controller (illustrated in FIG. 16 as pulse information #0 in this case) stored in the buffer memory 39 to IOP 120.

The IOP 120 receives the command read out from the buffer memory 39 as the command of "first analytical mode", and then sends such command to the CPU 100.

The CPU 100 performs data processing of such command based on the previously-recognized bit length to thereby effect control instructed by the command. This allows the main unit 1 and the peripheral devices thereof to be remote-controlled through the other remote controller.

The IOP 120 monitors whether a predetermined period, such as a single vertical synchronization period ($V_{sync}=1/60$ sec), has elapsed since the communication request was issued in the foregoing step S31, and continues incorporation of the commands of the other remote controller read out from the buffer memory 39 until such predetermined time period elapses as shown in steps S37 to S43.

After the certain time period has lapsed, IOP 120 then in step S44 supplies a communication line close request signal to the microcomputer 34. Upon reception of such communication line close request signal, microcomputer 34 closes its communication line with IOP 120. This completes one communication process between microcomputer 34 of the photo-receiving unit 30 and IOP 120 of the main unit 1.

As described in the above in such entertainment device of the present embodiment, all commands from the other remote controller are incorporated without culling (compression), and the format of such commands from the other remote controller is converted to a format supportable by the main unit 1 and is then stored in the buffer memory 39 of the photo-receiving unit 30. The IOP 120 of the main unit 1 then accesses such buffer memory 39 at a regular interval to thereby incorporate the command stored therein, and the CPU 100 controls operation of the main unit 1 or the peripheral devices connected thereto. This allows the user to remote-control the main unit 1 through the other remote controller.

Second Analytical Mode

The following paragraphs describe the "second analytical mode" whereby the commands having a spatial transmission format other than the SIRCS format are incorporated as being culled, and analyzed before use.

FIG. 17 is a time arrow chart showing command send/receive operations and signal processing between the other remote controller and the microcomputer 34 of the photo-receiving unit 30 during the second analytical mode.

As shown in FIG. 17, when the button on the other remote controller is operated by the user, a corresponding infrared signal is sent to the photo-receiving unit 30.

The photo-receiving unit 30 generates pulse information corresponding to the received infrared signal by real-time waveform shaping of such signal. Since this is the "second analytical mode," commands having any spatial transmission formats other than the SIRCS format are incorporated after being culled and analyzed. The photo-receiving unit 30 culls (compresses) such pulse information synchronous to a predetermined clock, such as vertical synchronization signal and system clock of the main unit 1, and then intermittently stores such culled information into buffer memory 39.

FIGS. 18A to 18C show timing chart representing such culling. FIG. 18A shows a vertical synchronization signal exemplarily used as a clock in the culling, FIG. 18C shows commands received from the other remote controller, and FIG. 18B shows commands from the other remote controller stored in the buffer memory 39 after being culled based on the vertical synchronization signal (see FIG. 18A).

As is clear from FIGS. 18A to 18C, upon receiving the commands from the other remote controller, the microcomputer 34 first fetches the command at the point of time the vertical synchronization signal rises up.

When the latched command is found to be of a low level, the microcomputer 34 then maintains such low level until the point of time when the next edge of the command rises up. Conversely, when the command latched at the point of time the command rises up is found to be of high level, microcomputer 34 maintains such high level until the edge of the command falls down.

Thus as shown in FIG. 8B, the command is successfully culled in a manner synchronous to the signal processing timing in the main unit 1 without seriously ruining the signal form of the received command.

The microcomputer 34 then calculates the data length of the command stored in buffer memory 39, and analyzes the spatial transmission format applied to the other remote controller.

More specifically, in such exemplary case, the spatial transmission format information corresponding to a plurality of other remote controllers is stored typically in a ROM of the photo-receiving unit 30. Microcomputer 34 first discriminates (typically based on the header information of the received command) whether the spatial transmission format of the received command is the SIRCS format or not. If the received command is not in the SIRCS format, microcomputer 34 then detects the spatial transmission format of the received command based typically on the plurality of spatial transmission format information stored in the ROM.

The received command having the spatial transmission format of the other remote controller is converted into a command having the SIRCS format which is supported by the main unit 1 (format conversion), and is again stored in the buffer memory 39. The converted command is stored in the buffer memory 39 and is intermittently incorporated into the main unit 1 as described below.

It should be observed that the above explanation dealt with the case where a received command is culled, stored in buffer memory 39, subjected to a format conversion, and then the received (converted) command is stored again in buffer 39. However, it is also possible to cull a received command, without storing the culled received command in buffer 39 before format conversion.

While the above description dealt with the exemplary case in which the format conversion of the commands from the other remote controller was performed by the microcomputer 34, such format conversion may be performed by the main unit 1.

The next paragraphs will describe a process flow shown in FIG. 19 in which the command sent from the other remote controller, after being subjected to the format conversion and stored in the buffer memory 39, is incorporated into the main unit 1.

First in step S51 of FIG. 19, a communication request is issued by the IOP 120 of the main unit 1 to the microcomputer 34 at a regular interval such as one vertical synchronization period ($V_{sync}$). Upon reception of such communication request, microcomputer 34 starts preparation for the succeeding communication with IOP 120.

Next in step S52, the IOP 120 serially sends to microcomputer 34 the individual device IDs for the devices such as the photo-receiving unit 30 and remote controller 40. These device IDs are read out from the MASK-ROM 150 or a storage medium such as DVD and memory card 75.

Microcomputer 34 serially compares the serially sent device IDs with the device ID of the remote controller 40, and, if there is agreement, returns to IOP 120, in step S53, a device ID of the photo-receiving unit 30.

After the device ID of the photo-receiving unit 30 is returned, the IOP 120 compares the returned device ID with a device ID of the photo-receiving unit 30 (read out from a storage medium such as the MASK-ROM 150, DVD or memory card 75) and then sends, if there is agreement, in step S54, an acknowledge data (ACK) to microcomputer 34.

Upon reception of the acknowledge data (ACK), microcomputer 34 detects in step S55 the bit length of the command sent from the other remote controller stored in the buffer memory 39, and then sends a data expressing such bit length to IOP 120.

Upon reception of such data expressing the bit length, the IOP 120 sends, in step S56, a predetermined dummy data to microcomputer 34.

The CPU 100 recognizes the bit length of the command from the other remote controller to be incorporated during future communication with the photo-receiving unit 30 by receiving from the IOP 120 such data expressing the bit length, and, thereafter, controls the main unit 1, or the peripheral devices connected thereto, when the format-converted command from the other remote controller is actually incorporated into the main unit 1.

In such communication protocol, the microcomputer 34 of the photo-receiving unit 30 sends the command stored in the buffer memory 39 as being triggered by the dummy data sent from the IOP 120, which should be noted as merely one example.

Upon reception of such dummy data from IOP 120, the microcomputer 34, in step S57, sends the command from the other remote controller (illustrated in FIG. 19 as pulse information #0 in this case) stored in the buffer memory 39 to IOP 120.

The IOP 120 receives the command read out from the buffer memory 39 as the command of "second analytical mode", and then sends such command to the CPU 100. The CPU 100 performs data processing of this command based on the previously-recognized bit length to thereby effect control instructed by the command. This allows the main unit 1, and the peripheral devices thereof, to be remote-controlled through the other remote controller.

The IOP 120 monitors whether a predetermined period, such as a single vertical synchronization period ($V_{sync}=1/60$ sec), has elapsed since the communication request was issued in the foregoing step S51, and continues incorporation of the commands of the other remote controller read out from the buffer memory 39 until this predetermined time period elapses as shown in steps S57 to S63.

When the time period lapses, the IOP 120 then in, step S64, supplies a communication line close request signal to the microcomputer 34. Upon reception of the communication line close request signal, the microcomputer 34 closes its communication line with the IOP 120. This completes one communication process between the microcomputer 34 of the photo-receiving unit 30 and the IOP 120 of the main unit 1.

As described above, in such entertainment device of the present embodiment, the commands from the other remote controller are (1) properly culled (based, for example, on a clock such as the vertical synchronization signal used by the main unit 1), (2) converted to a format supportable by the main unit 1, and (3) stored in the buffer memory 39 of the photo-receiving unit 30. The IOP 120 of the main unit 1 then accesses such buffer memory 39 at a regular interval to incorporate the command stored therein, and the CPU 100 controls operation of the main unit 1, or the peripheral devices connected thereto. This allows the user to remote-control the main unit 1 through the other remote controller.

While the description for the above embodiment dealt with the case in which a DVD is reproduced using the photo-receiving unit 30 and remote controller 40, it is also applicable to remote-control of other apparatuses, such as reproducing music CDs or operating an air conditioners, using the photo-receiving unit 30.

In such case, the user can use his or her familiar remote controller of a CD player device or an air conditioner at his or her own home, and the main unit 1 controls such CD player device or the air conditioner after analyzing the foregoing spatial transmission format.

It is thus to be understood that, by attaching the photo-receiving unit 30 to the entertainment device of the present embodiment and by reading with the main unit 1 the individual commands of the remote controllers handled by the user, it is made possible not only to reproduce (or record) any storage media loaded onto the entertainment device of the present embodiment, but also to operate every kind of electronic appliances externally connected to such entertainment system.

The embodiment described in the above is only part of the examples of the present invention. It is therefore to be understood that the present invention may be practiced in any modifications depending on the design, or the like, otherwise than as specifically described herein without departing from the scope and the technical spirit thereof.

What is claimed is:

1. A remote-control signal receiver for connection to an entertainment device having a plurality of functions that include a video game execution function, said remote-control signal receiver comprising:

connection means for providing a connection to a main unit of the entertainment device;

reception means for receiving at least one remote-control signal sent from a remote-control means, the at least one remote-control signal including a plurality of operational commands and being associated with a specific operation of the remote-control means; and signal processing means for supplying the received remote-control signal to the main unit of the entertainment device, said signal processing means including:

first delay means for delaying at least one of the plurality of operational commands of the received remote-control signal, first agreement detection means for comparing the delayed operational command and at least a further one of the plurality of operational commands of the at least one received remote-control signal and for generating a first detection command based on the comparison, the first detection command being a reception successful command when the at least one delayed operational command agrees with the further operational command, thereby indicating that the received remote-control signal was received correctly, and the first detection command being a dummy command when the at least one delayed operational command does not agree with the further operational command, second delay means for delaying at least the first detection command received from said first agreement detection means, second agreement detection means for comparing the delayed first detection command received from said second delay means and at least a further first detection command received from either said second delay means or said first agreement detection means, the further first detection command indicating that another remote-control signal sent by the remote-control means was received correctly, said second agreement detectin means generating a second detection command and an agreement detection signal when the delayed first detection command agrees with the further first detection command, thereby indicating a repeat of a same operation of the remote-control means, storage means for storing the second detection command, and output control means for commencing a predetermined interval upon receipt of the agreement detection signal from said second agreement detection means and for instructing said storage means to continuously output the second detection command for the predetermined interval.

2. The remote-control signal receiver according to claim 1, wherein said connection means is connected to the main unit of the entertainment device through a controller connection terminal provided on the main unit.

3. The remote-control signal receiver according to claim 1, wherein said reception means receives at least one infrared signal from the remote-control means as the at least one remote-control signal.

4. The remote-control signal receiver according to claim 1, wherein said first delay means delays the at least one operational command for a first interval and delays the further operational command for a second interval, and said first agreement detection means compares the at least one operational command and the further operational command.

5. The remote-control signal receiver according to claim 1, wherein the further operational command is not delayed, and said first agreement detection means compares the delayed operational command received from said first delay means and the further operational command.

6. The remote-control signal receiver according to claim 1, wherein said second delay means delays the first detection command for a first interval and delays the further first detection command for a second interval, and said second agreement detection means compares the delayed first detection command and the further first detection command.

7. The remote-control signal receiver according to claim 1, wherein the further first detection command is received from said first agreement detection means without being delayed, and said second agreement detection means compares the delayed first detection command and the further first detection command.

8. The remote-control signal receiver according to claim 1, wherein said output control means terminates the predetermined interval and commences another predetermined interval upon receipt of a further agreement detection signal from said second agreement detection means, and said output control means then instructs said storage means to continuously output another detection command corresponding to the further agreement detection signal for the another predetermined interval.

9. The remote-control signal receiver according to claim 8, wherein the receipt of the further agreement detection signal from said second agreement detection means indicates a further repeat of the same operation of the remote-control means, and the another detection command is identical to the second detection command.

10. A remote-control signal receiver for connection to an entertainment device having a plurality of functions that include a video game execution function, said remote-control signal receiver comprising:

connection means for providing a connection to a main unit of the entertainment device;

reception means for receiving at least one remote-control signal sent from a remote-control means, the at least one remote-control signal including a plurality of operational commands and being associated with a specific operation of the remote-control means;

format information storage means for storing format information that includes a plurality of remote-control signal formats;

determination means for determining a format of the received remote-control signal based on the stored format information;

format conversion means for converting the format of the received remote-control signal into a format supportable by the entertainment device; and signal processing means for supplying the at least one converted remote-control signal to the entertainment device, said signal processing means including:

first delay means for delaying at least one of the plurality of operational commands of the at least one converted remote-control signal, first agreement detection means for comparing the delayed operational command and at least a further one of the plurality of operational commands of the at least one converted remote-control signal and for generating a first detection command based on the comparison, the first detection command being a reception successful command when the delayed operational command agrees with the further operational command, thereby indicating a repeat of a same operation of the remote-control means, and the first detection command being a dummy command when the delayed operational command does not agree with the further operational command, second delay means for delaying at least the first detection command received from said first agreement detection means, second agreement detection means for comparing the delayed first detection command received from said second delay means and at least a further first detection command received from either said second delay means or said first agreement detection means, the further first detection command corresponding to another remote-control signal sent by the remote-control means, said second agreement detection means generating a second detection command and an agreement detection signal when the delayed first detection command agrees with the further detection command, command storage means for storing the second detection command, and output control means for commencing a predetermined interval upon receipt of the agreement detection signal from said second agreement detection means and for instructing said command storage means to continuously output the second detection command for the predetermined interval.

11. The remote-control signal receiver according to claim 10, further comprising compression means for culling portions of the received remote-control signal to compress the information volume of the remote-control signal.

12. The remote-control signal receiver according to claim 10, wherein said format conversion means converts the format of the at least one remote-control signal to a format of commands generated by a controller wired to the main unit when the main unit operates as a video game machine, and wherein said format conversion means converts the format of the at least one remote-control signal into a format of commands for controlling reproduction of audio and/or video content when the main unit operates as a content player.

13. A method of providing a remote-control signal to a remote-control signal receiver of an entertainment device having a plurality of functions that include a video game execution function, said method comprising: providing a connection from the remote-control signal receiver to a main unit of the entertainment device;

receiving at least one remote-control signal at the remote-control signal receiver from a remote-control means, the at least one remote-control signal including a plurality of operational commands and being associated with a specific operation of the remote control means;

delaying at least one operational command of the plurality of operational commands of the received remote-control signal;

comparing the delayed operational command and at least a further one of the plurality of operational commands of the received remote-control signal, and generating a first detection command based on the comparison, the first detection command being a reception successful command when the delayed operational command agrees with the further operational command, thereby indicating that the at least one remote-control signal was received correctly, the first detection command being a dummy command when the at least one delayed operational command does not agree with the further operational command;

delaying at least the first detection command;

comparing the delayed first detection command and at least a further first detection command, the further first detection command indicating that another remote-control signal sent by the remote-control means was received correctly, and generating a second detection command and an agreement detection signal when the delayed first detection command agrees with the further first detection command, thereby indicating a repeat of a same operation of the remote-control means;

storing the second detection command;

commencing a predeteremined time period upon receipt of the agreement detection signal; and continuously outputting the second detection command for the predetermined time period.

14. The method according to claim 13, wherein the at least one operational command is delayed for a first interval, the further operational command is delayed for a second interval, and the at least one operational command and the further operational command are compared.

15. The method according to claim 13, wherein the further operational command is not delayed, and the at least one delayed operational command and the further operational command are compared.

16. The method according to claim 13, wherein the first detection command is delayed for a first interval, the further first detection command is delayed for a second interval, and the delayed first detection command and the further first detection command are compared.

17. The method according to claim 13, wherein the further first detection command is not delayed, and the delayed first detection command and the further first detection command are compared.

18. The method according to claim 13, further comprising terminating the predetermined time period and commencing another predetermined time period upon receipt of a further agreement detection signal, and then continuously outputting another detection command corresponding to the further agreement detection signal for the another predetermined time period.

19. The method according to claim 18, wherein the receipt of the further agreement detection signal indicates a further repeat of the same operation of the remote-control means, and the another detection command is identical to the second detection command.

20. A method of providing a remote-control signal to a remote-control signal receiver of an entertainment device having a plurality of functions that include a video game execution function, said method comprising:

providing a connection from the remote-control signal receiver to a main unit of the entertainment device;

receiving at least one remote-control signal at the remote-control signal receiver from a remote-control means, the at least one remote-control signal including a plurality of operational commands and being associated with a specific operation of the remote control means;

determining a format of the at least one received remote-control signal based on stored format information that includes a plurality of remote-control signal formats;

converting the format of the at least one received remote-control signal into a format supportable by the entertainment device;

supplying the at least one converted remote-control signal to the entertainment device;

delaying at least one of the plurality of operational commands of the at least one converted remote-control signal;

comparing the delayed operational command and at least a further one of the plurality of operational commands of the at least one converted remote-control signal, and generating a first detection command based on the comparison, the first detection command being a reception successful command when the at least one delayed operational command agrees with the further operational command, and the first detection command being a dummy command when the at least one delayed operational command does not agree with the further operational command;

delaying at least the first detection command;

comparing the delayed first detection command and at least a further first detection command, the further first detection command corresponding to another remote-control signal sent by the remote-control means, and generating a second detection command and an agreement detection signal when the delayed first detection command agrees with the further detection command;

storing the second detection command;

commencing a predetermined time period upon receipt of the agreement detection signal; and continuously outputting the second detection command for the predetermined time period.

21. The method according to claim 20, further comprising culling portions of the received remote-control signal to compress the information volume of the received commands.

22. The method according to claim 20, wherein the format of the at least one received remote-control signal is converted to a format of commands generated by a controller wired to the entertainment device when the entertainment device operates as a video game machine, and the format of the at least one received remote-control signal is converted into a format of commands for controlling reproduction of audio and/or video content when the entertainment device operates as a player.

23. A computer-readable storage medium having recorded therein instructions for providing a remote-control signal to a remote-control signal receiver at an entertainment device having a plurality of functions that include a video game execution function, said instructions comprising:

provide a connection from the remote-control signal receiver to a main unit of the entertainment device;

receiving at least one remote-control signal at remote-control signal receiver from a remote-control means, the at least one remote-control signal including a plurality of operational commands and being associated with a specific operation of the remote control means;

delaying at least one operational command of the plurality of operational commands of the received remote-control signal;

comparing the delayed operational command and at least a further one of the plurality of operational commands of the received remote-control signal, and generating a first detection command based on the comparison, the first detection command being a reception successful command when the delayed operational command agrees with the further operational command, thereby indicating that the at least one remote-control signal was received correctly, the first detection command being a dummy command when the at least one delayed operational command does not agree with the further operational command;

delaying at least the first detection command;

comparing the delayed first detection command and at least a further first detection command, the further first detection command indicating that another remote-control signal sent by the remote-control means was received correctly, and generating a second detection command and an agreement detection signal when the delayed first detection command agrees with the further first detection command, thereby indicating a repeat of a same operation of the remote-control means;

storing the second detection command;

commencing a predetermined time period upon receipt of the agreement detection signal; and continuously outputting the second detection command for the predetermined time period.

24. A system, comprising:

an entertainment device; and a remote-control signal receiver connected to the entertainment device;

said entertainment device having a plurality of functions that include a video game execution function, including:

detection means for detecting a type of information stored in a storage medium disposed within said entertainment device, and selection means for selecting one of a plurality of operating modes based on the type of information detected by said detection means, the selected operating mode being a video game player when the type of information stored in the storage medium is video game information, and the selected operating mode being a content player when the type of information stored in the storage medium is audio and/or video information;

said remote-control signal receiver including:

connection means for providing a connection to a main unit of said entertainment device;

reception means for receiving at least one remote-control signal sent from a remote-control means, the at least one remote-control signal including a plurality of operational commands and being associated with a specific operation of the remote-control means; and signal processing means for supplying the received remote-control signal to the main unit of said entertainment device, said signal processing means including:

first delay means for delaying at least one of the plurality of operational commands of the received remote-control signal, first agreement detection means for comparing the delayed operational command and at least a further one of the plurality of operational commands of the at least one received remote-control signal and for generating a first detection command based on the comparison, the first detection command being a reception successful command when the at least one delayed operational command agrees with the further operational command, thereby indicating that the received remote-control signal was received correctly, and the first detection command being a dummy command when the at least one delayed operational command does not agree with the further operational command, second delay means for delaying at least the first detection command received from said first agreement detection means, second agreement detection means for comparing the delayed first detection command received from said second delay means and at least a further first detection command received from either said second delay means or said first agreement detection means, the further first detection command indicating that another remote-control signal sent by the remote-control means was received correctly, said second agreement detection means generating a second detection command and an agreement detection signal when the delayed first detection command agrees with the further first detection command, thereby indicating a repeat of a same operation of the remote-control means, storage means for storing the second detection command, and output control means for commencing a predetermined interval upon receipt of the agreement detection signal from said second agreement detection means and for instructing said storage means to continuously output the second detection command for the predetermined interval.

* * * * *